(12) United States Patent
Lee et al.

(10) Patent No.: US 10,993,095 B2
(45) Date of Patent: *Apr. 27, 2021

(54) METHOD FOR SELECTING, IN SELECTION PERIOD, SUBFRAME EXCLUDING SUBFRAME RELATING TO SUBFRAME IN WHICH TRANSMISSION HAS BEEN PERFORMED DURING SENSING PERIOD IN WIRELESS COMMUNICATION SYSTEM, AND TERMINAL USING SAME

(71) Applicant: LG Electronics Inc., Seoul (KR)

(72) Inventors: Seungmin Lee, Seoul (KR); Hanbyul Seo, Seoul (KR); Hyukjin Chae, Seoul (KR); Youngtae Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/809,982

(22) Filed: Mar. 5, 2020

(65) Prior Publication Data

US 2020/0204968 A1 Jun. 25, 2020

Related U.S. Application Data

(63) Continuation of application No. 16/314,954, filed as application No. PCT/KR2017/003844 on Apr. 7, 2017.

(Continued)

(51) Int. Cl.
*H04W 4/00* (2018.01)
*H04W 4/40* (2018.01)
(Continued)

(52) U.S. Cl.
CPC ............. *H04W 4/40* (2018.02); *H04L 1/0061* (2013.01); *H04L 1/1614* (2013.01);
(Continued)

(58) Field of Classification Search
CPC ......... H04W 4/40; H04W 4/44; H04W 76/28; H04W 28/26; H04W 72/14
See application file for complete search history.

(56) References Cited

U.S. PATENT DOCUMENTS 10,244,538 B2 * 3/2019 Sartori ................. H04W 74/08
10,383,147 B2 8/2019 Rajagopal et al.
(Continued)

FOREIGN PATENT DOCUMENTS

KR 10-2015-0133115 11/2015
KR 10-2016-0009827 1/2016
(Continued)

OTHER PUBLICATIONS

Extended European Search Report in European Application No. 17779396.5 dated Mar. 31, 2020, 9 pages.
(Continued)

*Primary Examiner* — Abdelnabi O Musa
(74) *Attorney, Agent, or Firm* — Fish & Richardson P.C.

(57) ABSTRACT

The present invention provides a vehicle-to-X (V2X) operation method performed by a V2X terminal in a wireless communication system, the method comprising: selecting, in a selection period, a subframe excluding a subframe relating to a subframe in which transmission has been performed during a sensing period; and performing a V2X communication on the basis of the selected subframe.

14 Claims, 39 Drawing Sheets

Related U.S. Application Data

(60) Provisional application No. 62/421,401, filed on Nov. 14, 2016, provisional application No. 62/406,468, filed on Oct. 11, 2016, provisional application No. 62/406,373, filed on Oct. 10, 2016, provisional application No. 62/403,673, filed on Oct. 3, 2016, provisional application No. 62/403,048, filed on Sep. 30, 2016, provisional application No. 62/401,188, filed on Sep. 29, 2016, provisional application No. 62/400,683, filed on Sep. 28, 2016, provisional application No. 62/400,620, filed on Sep. 27, 2016, provisional application No. 62/393,158, filed on Sep. 12, 2016, provisional application No. 62/385,967, filed on Sep. 10, 2016, provisional application No. 62/385,962, filed on Sep. 10, 2016.

(51) Int. Cl.

| | | |
|---|---|---|
| *H04W 4/44* | (2018.01) | |
| *H04W 72/04* | (2009.01) | |
| *H04W 72/02* | (2009.01) | |
| *H04W 74/08* | (2009.01) | |
| *H04W 76/28* | (2018.01) | |
| *H04W 28/26* | (2009.01) | |
| *H04W 72/12* | (2009.01) | |
| *H04W 72/14* | (2009.01) | |
| *H04W 74/00* | (2009.01) | |
| *H04W 76/27* | (2018.01) | |
| *H04L 1/00* | (2006.01) | |
| *H04L 1/16* | (2006.01) | |
| *H04L 5/14* | (2006.01) | |
| *H04W 8/00* | (2009.01) | |
| *H04W 56/00* | (2009.01) | |

(52) U.S. Cl.
CPC ............. *H04L 5/1469* (2013.01); *H04W 4/44* (2018.02); *H04W 8/005* (2013.01); *H04W 28/26* (2013.01); *H04W 56/001* (2013.01); *H04W 72/02* (2013.01); *H04W 72/04* (2013.01); *H04W 72/0446* (2013.01); *H04W 72/0493* (2013.01); *H04W 72/1205* (2013.01); *H04W 72/1263* (2013.01); *H04W 72/14* (2013.01); *H04W 74/002* (2013.01); *H04W 74/08* (2013.01); *H04W 74/0816* (2013.01); *H04W 76/27* (2018.02); *H04W 76/28* (2018.02); *H04W 72/0406* (2013.01)

(56) References Cited

U.S. PATENT DOCUMENTS

| | | | |
|---|---|---|---|
| 10,536,958 B2* | 1/2020 | Lee | H04L 1/00 |
| 10,694,347 B2* | 6/2020 | Lee | H04W 72/04 |
| 10,750,564 B2* | 8/2020 | Zhou | H04W 76/19 |
| 2013/0064191 A1 | 3/2013 | Jeong et al. | |
| 2014/0010179 A1 | 1/2014 | Lee | |
| 2015/0208280 A1 | 7/2015 | Hernando | |
| 2015/0327133 A1 | 11/2015 | Yiu et al. | |
| 2015/0334721 A1 | 11/2015 | Kim et al. | |
| 2015/0334760 A1 | 11/2015 | Sartori et al. | |
| 2016/0044652 A1 | 2/2016 | Xue et al. | |
| 2016/0112962 A1 | 4/2016 | Park | |
| 2016/0174122 A1 | 6/2016 | Sorrentino et al. | |
| 2016/0295624 A1 | 10/2016 | Novlan et al. | |
| 2017/0131114 A1 | 5/2017 | Li et al. | |
| 2017/0188391 A1 | 6/2017 | Rajagopal et al. | |
| 2017/0280385 A1 | 9/2017 | Klacar et al. | |
| 2018/0035276 A1 | 2/2018 | Kang et al. | |
| 2018/0049235 A1* | 2/2018 | Baghel | H04W 76/14 |
| 2018/0160418 A1 | 6/2018 | Luo et al. | |
| 2018/0199174 A1 | 7/2018 | Gozalvez-Serrano et al. | |
| 2018/0224846 A1 | 8/2018 | Kovacs et al. | |
| 2018/0263052 A1 | 9/2018 | Xu et al. | |
| 2018/0317066 A1 | 11/2018 | Xu et al. | |
| 2018/0359777 A1 | 12/2018 | Lei et al. | |
| 2019/0021111 A1 | 1/2019 | Tang | |
| 2019/0045521 A1 | 2/2019 | Hong et al. | |
| 2019/0059071 A1 | 2/2019 | Khoryaev et al. | |
| 2019/0069272 A1 | 2/2019 | Tang | |
| 2019/0082454 A1 | 3/2019 | Shi et al. | |
| 2019/0090173 A1 | 3/2019 | Xiao et al. | |
| 2019/0104551 A1 | 4/2019 | Deenoo et al. | |
| 2019/0132818 A1 | 5/2019 | Yasukawa et al. | |
| 2019/0174463 A1 | 6/2019 | Zeng et al. | |

FOREIGN PATENT DOCUMENTS

| | | |
|---|---|---|
| RU | 2324304 | 5/2008 |
| RU | 2556387 | 7/2015 |
| WO | WO2013034107 | 3/2013 |
| WO | 2015/069040 | 5/2015 |
| WO | WO15/142082 | 9/2015 |
| WO | WO15/147531 | 10/2015 |
| WO | 2016/021942 | 2/2016 |
| WO | WO16/022009 | 2/2016 |
| WO | WO2016/018009 | 2/2016 |
| WO | WO2016108555 | 7/2016 |
| WO | WO17/176096 | 10/2017 |
| WO | WO18/062980 | 4/2018 |
| WO | WO18/081974 | 5/2018 |

OTHER PUBLICATIONS

Intel Corporation,"Remaining sensing and resource selection issues for sidelink V2V communication," R1-1611921, 3GPP TSG Ran WG1 Meeting #87, Reno, USA Nov. 14-18, 2016, 6 pages.
Lenovo, "Mechanisms for V2V resource allocation," R1-161014, 3GPP TSG RAN WG1 Meeting #84, St Julian's, Malta, Feb. 15-19, 2016, 7 pages.
LG Electronics Inc., "UE autonomous resource selection mode in MAC CR," R2-165690, 3GPP TSG-RAN WG2 #95, Gothenburg, Sweden, Aug. 22-26, 2016, 6 pages.
Samsung, "Discussions on resource reservation problem," R2-168064, 3GPP TSG-RAN WG2 Meeting #96, Reno, Nevada, USA, Nov. 14-18, 2016, 4 pages.
Singapore Written Opinion in Singapore Application No. 11201901833Y, dated Apr. 7, 2020, 5 pages.
ZTE, "Discussion on V@V SPS resource scheme," R1-162413, 3GPP TSG-RAN WG1 Meeting #84bis, Busan, Korea Apr. 11-15, 2016, 6 pages.
ZTE, "Resource pool allocation enhancement for V2V," R1-160682, 3GPP TSG-RAN WG1 Meeting #84, St Julian's, Malta, Feb. 15-19, 2016, 6 pages.
Australian Office Action in Australian Application No. 2017248062, dated Nov. 30, 2019, 7 pages.
Catt, "Discussion on UE autonomous resource allocation in PC5-based V2V," 'R1-162267', 3GPP TSG RAN WG1 Meeting #84bis, Busan, Korea Apr. 11-15, 2016, 7 pages.
Ericsson, "Distributed Resource Allocation for V2X over PC5," R1-161070, 3GPP TSG RAN WG1 Meeting #84, Malta, Feb. 15-19, 2016, 10 pages.
Ericsson, "Pool design for V2V," R1-166974, 3GPP TSG RAN WG1 Meeting #86, Goteborg, Sweden, Aug. 22-26, 2016, 3 pages.
Extended European Search Report in European Application No. 17779397.3, dated Jan. 7, 2020, 8 pages.
Extended European Search Report in European Application No. 17779399.9, dated Jan. 3, 2020, 12 pages.
Intel Corporation, "On timing relationship between sensing window, packet arrival, resource reselection trigger, PSCCH and PSSCH transmissions," R1-166513, 3GPP TSG RAN WG1 Meeting #86, Gothenburg, Sweden, Aug. 22-26, 2016, 8 pages.
LG Electronics, "Discussion on UE autonomous resource allocation mechanism for PC5-based V2V," R1-160634, 3GPP TSG RAN WG1 Meeting #84, St Julian's, Malta, Feb. 15-19, 2016, 5 pages.

(56) References Cited

OTHER PUBLICATIONS

LG Electronics, "Summary of V2V offline summary," R1-161405, RAN WG1 Meeting #84, St Julian's, Malta, Feb. 15-19, 2016, 2 pages.

LG Electronics, "Summary of Wednesday V2V offline discussions," R1-168247, 3GPP TSG RAN WG1 Meeting #86, Gothenburg, Sweden, Aug. 22-26, 2016, 3 pages.

MCC Support, Draft Report of 3GPP TSG RAN WG1 #86 v0.1.0 (Gothenburg, Sweden, Aug. 22-26, 2016), R1-16xxxx, 3GPP TSG RAN WG1 Meeting #86bis, Lisbon, Portugal, Oct. 10-14, 2016, 143 pages, XP051158279.

NTT Docomo, "Discussion on details of sensing with semi-persistent transmission," 'R1-163176', 3GPP TSG RAN WG1 Meeting #84bis, Busan, Korea Apr. 11-15, 2016, 8 pages.

NTT Docomo, Inc., "Further details of sensing based semi-persistent resource selection for V2V," R1-167356, 3GPP TSG RAN WG1 Meeting #86, Gothenburg, Sweden, Aug. 22-26, 2016, 5 pages.

Qualcomm Incorporated, "Details of Sensing for V2V," R1-163032, 3GPP TSG-RAN WG1 #84bis, Busan, South Korea, Apr. 11-15, 2016, 9 pages.

United States Notice of Allowance in U.S. Appl. No. 16/283,167, dated Sep. 30, 2019, 13 pages.

United States Notice of Allowance in U.S. Appl. No. 16/316,542, dated Nov. 20, 2019, 12 pages.

United States Office Action in U.S. Appl. No. 16/283,167, dated May 15, 2019, 11 pages.

United States Office Action in U.S. Appl. No. 16/362,109, dated Jun. 10, 2019, 21 pages.

ZTE, "Discussion on V2V SPS resource scheme," 'R1-162413', 3GPP TSG-RAN WG1 Meeting #84bis, Busan, Korea Apr. 11-15, 2016, 8 pages.

Russian Notice of Allowance in Russian Appln. No. 2020115389, dated Jul. 17, 2020, 20 pages (with English translation).

ITL, Details on PSCCH/PSSCH transmission timing in UE autonomous resource selection mode, R1-167751, 3GPP TSG RAN WG1 Meeting #86, Gothenburg, Sweden, Aug. 22-26, 2016, 6 pages.

Korean Notice of Allowance in Korean Appln. No. 10-2018-7035992, dated Jun. 29, 2020, 5 pages, (with English translation).

Sony, Discussion on the remaining issues of transmission UE behavior, R1-167077, 3GPP TSG RAN WG1 Meeting #86, Gothenburg, Sweden Aug. 22-26, 2016, 5 pages.

India Office Action in India Appln. No. 201917004772, dated Aug. 17, 2020, 8 pages.

United States Office Action in U.S. Appl. No. 16/787,776, dated Mar. 18, 2021, 11 pages.

\* cited by examiner

METHOD FOR SELECTING, IN SELECTION PERIOD, SUBFRAME EXCLUDING SUBFRAME RELATING TO SUBFRAME IN WHICH TRANSMISSION HAS BEEN PERFORMED DURING SENSING PERIOD IN WIRELESS COMMUNICATION SYSTEM, AND TERMINAL USING SAME

CROSS-REFERENCE TO RELATED APPLICATIONS

This application is a continuation of U.S. application Ser. No. 16/314,954, filed on Jan. 3, 2019, which is a National Stage filing under 35 U.S.C. 371 of International Application No. PCT/KR2017/003844, filed on Apr. 7, 2017, which claims the benefit of U.S. Provisional Applications No. 62/385,962 filed on Sep. 10, 2016, No. 62/385,967 filed on Sep. 10, 2016, No. 62/393,158 filed on Sep. 12, 2016, No. 62/400,620 filed on Sep. 27, 2016, No. 62/400,683 filed on Sep. 28, 2016, No. 62/401,188 filed on Sep. 29, 2016, No. 62/403,048 filed on Sep. 30, 2016, No. 62/403,673 filed on Oct. 3, 2016, No. 62/406,373 filed on Oct. 10, 2016, No. 62/406,468 filed on Oct. 11, 2016, and No. 62/421,401 filed on Nov. 14, 2016. The disclosures of the prior applications are incorporated by reference in their entirety.

BACKGROUND OF THE INVENTION

Field of the Invention

The present invention relates to wireless communication and, more particularly, to a method for selecting V2X transmission resources performed by a terminal in a wireless communication system and a terminal using the method.

Related Art

The International Telecommunication Union Radio communication sector (ITU-R) is conducting standardization of the International Mobile Telecommunications (IMT)-Advanced which is the next-generation mobile communication system following the 3rd generation mobile communication system. IMT-Advanced aims to support Internet Protocol (IP)-based multimedia services with a data rate of 1 Gbps while a terminal is at fixed positions or moves at low speeds and with a data rate of 100 Mbps while a terminal moves at high speeds.

The 3rd Generation Partnership Project (3GPP) is developing LTE-A, which is an advanced version of the Long Term Evolution (LTE) based on Orthogonal Frequency Division Multiple Access (OFDMA)/Single Carrier-Frequency Division Multiple Access (SC-FDMA) transmission scheme, as a system standard to satisfy the requirements of the IMT-Advanced. The LTE-A is one of strong candidates for the IMT-Advanced.

Recently, there has been a growing interest in the Device-to-Device (D2D) technology which enables direct communication between devices. In particular, D2D communication is getting attention as a communication technology to implement a public safety network. Although commercial communication networks are changing fast to adopt the LTE standard, the current public safety network is still relying on the 2G technology because of collision problems with existing communication standards and cost issues. Such technology gap and the demand for improved services have led to the efforts to improve public safety networks.

The D2D communication may be extended to be used for signal transmission and reception between vehicles, where vehicle-related communication is particularly called Vehicle-to-Everything (V2X) communication. The 'X' in the V2X represents pedestrian (communication between a vehicle and a device carried by individual (for example, handheld terminal carried by a pedestrian, cyclist, driver, or passenger), where, in this case, V2X may be expressed by V2P), vehicle (communication between vehicles, V2V), infrastructure/network (communication between a vehicle and a roadside unit (RSU)/network, where RSU is a transportation infrastructure entity, for example, an entity transmitting speed notifications implemented in an eNB or a stationary UE, V2I/N). A (V2P communication-related) device carried by a pedestrian (or person) is called a "P-UE" while a (V2X communication-related) device installed in a vehicle is called a "V-UE". The term 'entity' in this document may be interpreted as P-UE, V-UE or RSU (/network/infrastructure).

Meanwhile, in V2X communication, it may be problematic to select which resource in which way when a P-UE tries to transmit a V2X signal. P-UEs tend to be sensitive to battery consumption unlike vehicle-mounted terminals. Also, in V2X communication, it may be important to transmit a signal periodically and not to exert interference on other terminals. A method for selecting a transmission resource for a P-UE needs to be determined by taking into account the facts above.

SUMMARY OF THE INVENTION

An object of the present invention is to provide a method for selecting a V2X transmission resource performed by a UE in a wireless communication system and a UE using the method.

In an aspect, a method for performing a vehicle-to-X (V2X) operation in a wireless communication system is provided. The method may be performed by a V2X user equipment (UE) and comprise selecting a subframe excluding a subframe related to a subframe on which a transmission is performed within a sensing duration, within a selection duration and performing a V2X communication based on the selected subframe.

The excluded subframe may be a subframe within the selection duration.

When a subframe corresponding the subframe on which the transmission is performed within the sensing duration based on a specific period overlaps a subframe reserved according to a resource reservation period of the related subframe, the related subframe may be excluded.

The subframe on which the transmission may be performed is a subframe k, and the k is a positive integer, the subframe corresponding the subframe k based on the specific period may be a subframe (k+100*i), and the i may be a positive integer configured by a base station, and if the subframe (k+100*i) overlaps a subframe (y+P*j), the subframe y may be excluded, and the y may be positive integer, the P may be the resource reservation period and the j may be a positive integer.

A range of the j may be determined based on a positive integer value proportional to a counter value randomly determined by the V2X UE.

The counter value may be same or larger than 5 and same or smaller than 15.

The P may be 100 ms.

The sensing period may be 1s, and the selection duration may be 100 ms.

The sensing duration may be a sensing window and the selection duration is a selection window.

The sensing window may be specific to the V2X UE.

In another aspect, a User Equipment (UE) is provided. The UE may comprise a Radio Frequency (RF) unit transmitting and receiving a radio signal and a processor operating being combined with the RF unit. The processor may be configured to select a subframe excluding a subframe related to a subframe on which a transmission is performed within a sensing duration, within a selection duration, and perform a vehicle-to-X (V2X) communication based on the selected subframe.

According to the present invention, resources involved in V2X communication may be reserved in an efficient manner when a UE perform V2X communication. Therefore, since a UE according to the present invention makes use of radio resources efficiently, unnecessary occupation of radio resources is minimized, and thereby efficiency of radio resource is maximized.

DESCRIPTION OF EXEMPLARY EMBODIMENTS

Figure 1:
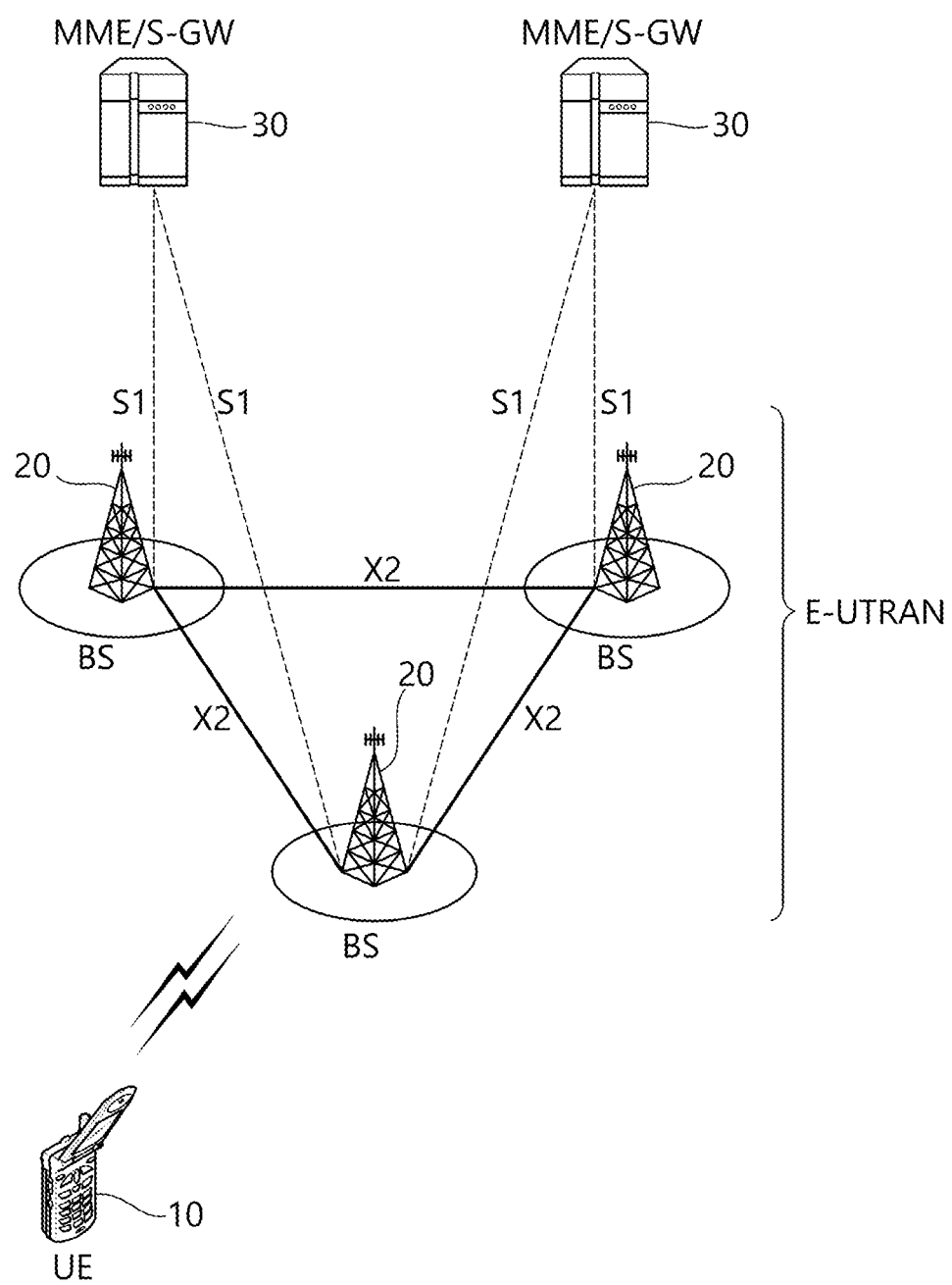
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
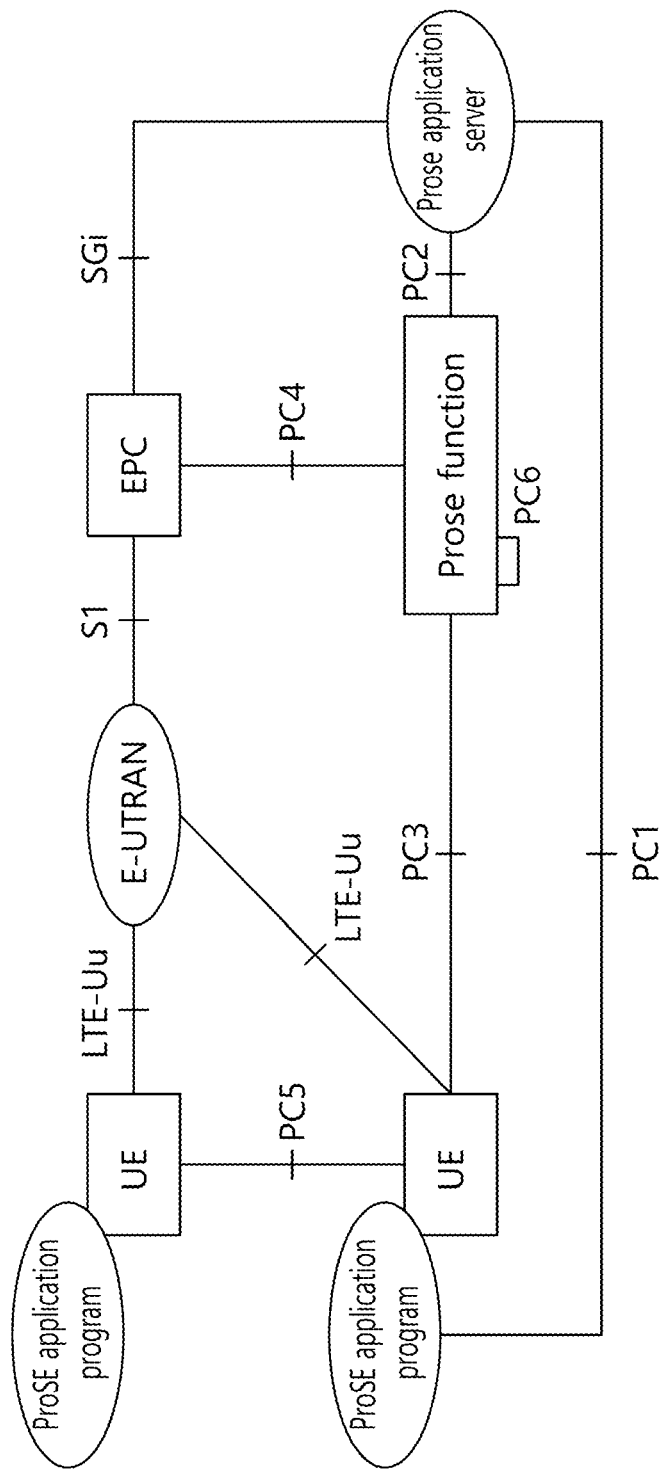
FIG. 2 is a diagram showing a wireless protocol architecture for a user plane.
Figure 3:
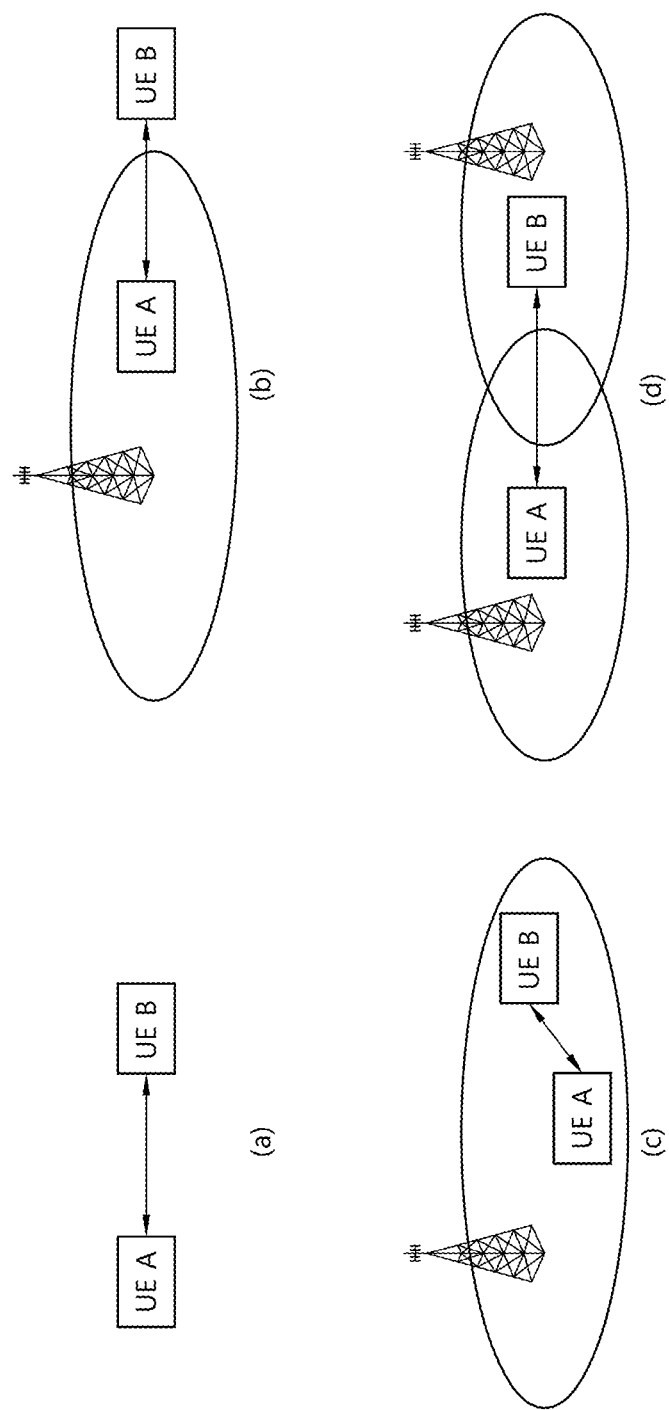
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a procedure of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

Hereinafter, a D2D operation will be described. In the 3GPP LTE-A, a service related to the D2D operation refers to Proximity based Services (ProSe). Hereinafter, the ProSe is an equivalent concept with the D2D operation and the ProSe may be compatibly used with the D2D operation. The ProSe is now described.

The ProSe includes ProSe direct communication and ProSe direct discovery. The ProSe direct communication presents communication performed by two or more adjacent terminals. The terminals may perform communication using a protocol of a user plane. A ProSe-enabled UE means a UE for supporting a process related to requirements of the ProSe. Unless otherwise defined, the ProSe-enabled UE includes both of a public safety UE and a non-public safety UE. The public safety UE represents a UE for supporting both of a public safety specified function and the ProSe process. The non-public safety UE is a terminal which supports the ProSe process but does not support the public safety specified function.

The ProSe direct discovery is a process where the ProSe-enabled UE discovers another ProSe-enabled UE. In this case, only ability of the two ProSe-enabled UEs is used. An EPC-level ProSe discovery signifies a process where an EPC determines whether 2 ProSe enable terminals are closed to each other, and reports the close state thereof the two ProSe enabled terminals.

Hereinafter, the ProSe direct communication may refer to D2D communication, and the ProSe direct discovery may refer to D2D discovery.

Figure 4:
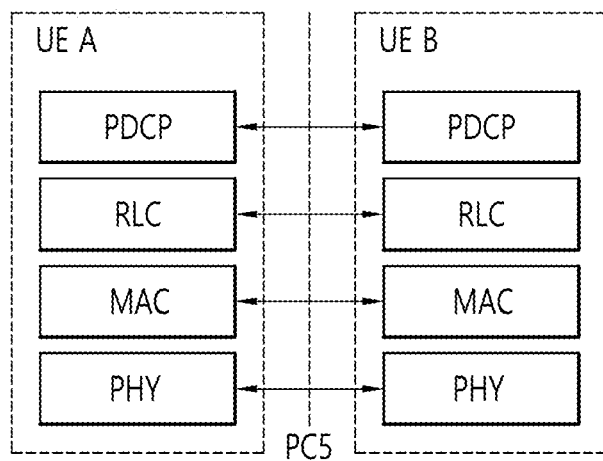
FIG. 4 illustrates a reference structure for a ProSe.

FIG. 4 illustrates a reference structure for a ProSe.

Referring to FIG. 4, the reference structure for a ProSe includes a plurality of terminals having E-UTRAN, EPC, and ProSe application program, a ProSe application (APP) server, and a ProSe function.

An EPC is a representative example of the E-UTRAN. The EPC may include an MME, an S-GW, a P-GW, a policy and charging rules function (PCRF), and a home subscriber server (HSS).

The ProSe application server is a user of ProSe in order to make an application function. The ProSe application server may communicate with an application program in the terminal. The application program in the terminal may use a ProSe ability to make an application function.

The ProSe function may include at least one of following functions but is not limited thereto.

Interworking via a reference point towards the 3rd party applications

Authorization and configuration of the UE for discovery and direct communication)

Enable the function of the EPC level ProSe discovery

ProSe related new subscriber data and handling of data storage, and also handling of ProSe identities Security related function Provide control towards the EPC for policy related function Provide function for charging (via or outside of EPC, e.g., offline charging))

Hereinafter, a reference point and a reference interface will be described in a reference structure for the ProSe.

PC1: a reference point between a ProSe application program in the terminal and a ProSe application program in a ProSe application server. The PC1 is used to define signaling requirements in an application level.

PC2: is a reference point between the ProSe application server and a ProSe function. The PC2 is used to define an interaction between the ProSe application server and a ProSe function. An application data update of a ProSe database of the ProSe function may be an example of the interaction.

PC3: is a reference point between the terminal and the ProSe function. The PC3 is used to define an interaction between the terminal and the ProSe function. Configuration for ProSe discovery and communication may be an example of the interaction.

PC4: is a reference point between an EPC and the ProSe function. The PC4 is used to define an interaction between the EPC and the ProSe function. The interaction lay illustrate when a path for 1:1 communication or a ProSe service for real time session management or mobility management are authorized.

PC5: is a reference point to use control/user plane for discovery, communication, and relay between terminals, and 1:1 communication.

PC6: is a reference point to use a function such as ProSe discovery between users included in different PLMNs.

SGi: may be used for application data and application level control information exchange.

<ProSe Direct Communication (D2D Communication)>.

The ProSe direct communication is a communication mode where two public safety terminals may perform direct communication through a PC 5 interface. The communication mode may be supported in both of a case of receiving a service in coverage of E-UTRAN or a case of separating the coverage of E-UTRAN.

Figure 5:
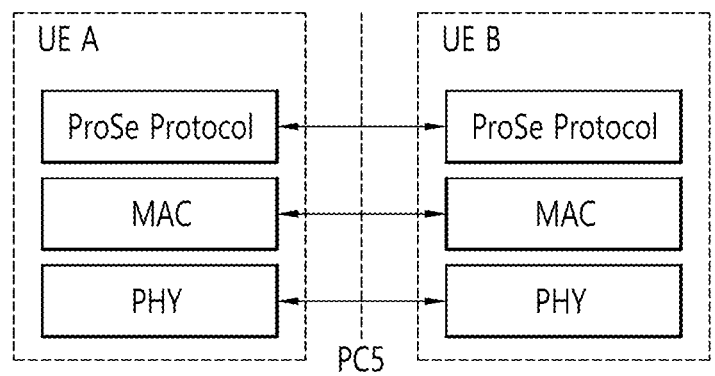
FIG. 5 illustrates arrangement examples of terminals performing ProSe direct communication and cell coverage.

FIG. 5 illustrates arrangement examples of terminals performing ProSe direct communication and cell coverage.

Referring to FIG. 5(a), UEs A and B may be located outside of the cell coverage. Referring to FIG. 5(b), the UE A may be located in the cell coverage and the UE B may be located outside of the cell coverage. Referring to FIG. 5(c), both of UEs A and B may be located in the cell coverage. Referring to FIG. 5(d), the UE A may be located in coverage of a first cell and the UE B may be in coverage of a second cell.

As described above, the ProSe direct communication may be performed between terminals which are provided at various positions.

Meanwhile, following IDs may be used in the ProSe direct communication.

Source layer-2 ID: The source layer-2 ID identifies a sender of a packet in a PC 5 interface.

Purpose layer-2 ID: The purpose layer-2 ID identifies a target of a packet in a PC 5 interface.

SA L1 ID: The SA L1 ID represents an in an ID in a scheduling assignment (SA) in the PC 5 interface.

Figure 6:
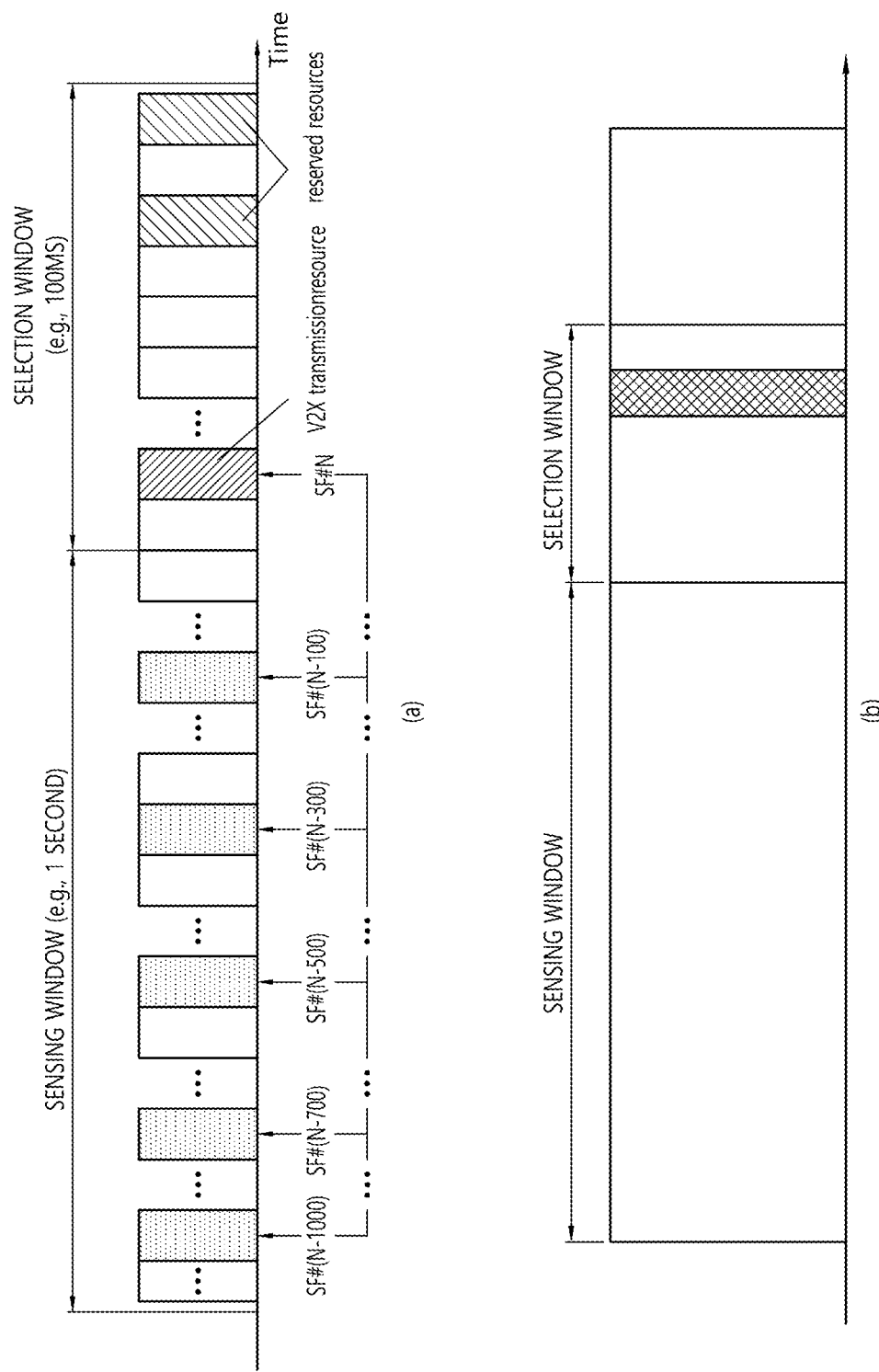
FIG. 6 illustrates a user plane protocol stack for the ProSe direct communication.

FIG. 6 illustrates a user plane protocol stack for the ProSe direct communication.

Referring to FIG. 6, the PC 5 interface includes a PDCH layer, a RLC layer, a MAC layer, and a PHY layer.

There may not be HARQ feedback in the ProSe direct communication. An MAC header may include the source layer-2 ID and the purpose layer-2 ID.

<Radio Resource Assignment for ProSe Direct Communication>.

A ProSe enable terminal may use following two modes with respect to resource assignments for the ProSe direct communication.

1. Mode 1

The mode 2 is a mode for receiving scheduling a resource for the ProSe direct communication from a base station. The terminal should be in a RRC_CONNECTED state according to the mode 1 in order to transmit data. The terminal requests a transmission resource to the base station, and the base station schedules a resource for scheduling assignment and data transmission. The terminal may transmit a scheduling request to the base station and may transmit a Buffer Status Report (ProSe BSR). The base station has data which the terminal will perform the ProSe direct communication and determines whether a resource for transmitting the data is required.

2. Mode 2

The mode 2 is a mode for selecting a direct resource. The terminal directly selects a resource for the ProSe direct communication from a resource pool. The resource pool may be configured by a network or may be previously determined.

Meanwhile, when the terminal includes a serving cell, that is, when the terminal is in an RRC_CONNECTED state with the base station or is located in a specific cell in an RRC_IDLE state, the terminal is regarded to be in coverage of the base station.

If the terminal is located outside of the coverage, only the mode 2 is applicable. If the terminal is located in the coverage, the mode 1 or the mode 2 may be used according to setting of the base station.

If there are no exceptional conditions, only when the base station is configured, the terminal may change a mode from the mode 1 to the mode 2 or from the mode 2 to the mode 1.

<ProSe Direct Discovery (D2D Discovery)>

The ProSe direct discovery represents a process used to discover when the ProSe enabled terminal discovers other neighboring ProSe enabled terminal and refers to D2D direction discovery or D2D discovery. In this case, an E-UTRA wireless signal through the PC 4 interface may be used. Hereinafter, information used for the ProSe direct discovery refers to discovery information.

Figure 7:
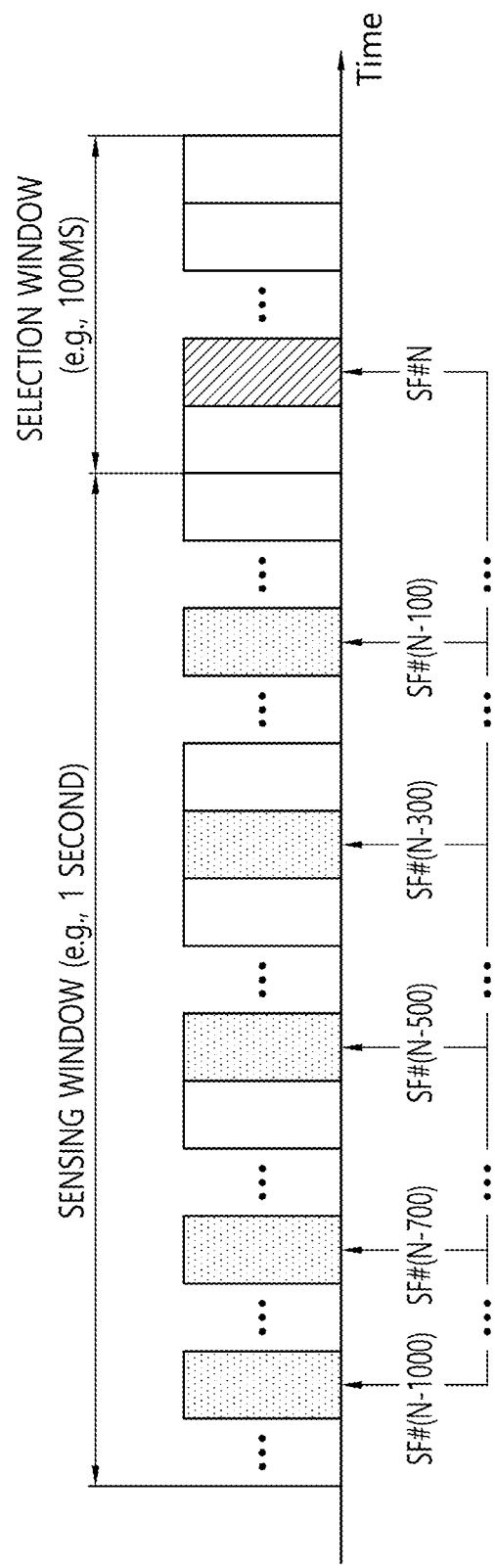
FIG. 7 illustrates a PC 5 interface for D2D discovery.

FIG. 7 illustrates a PC 5 interface for D2D discovery.

Referring to FIG. 7, the PC 5 interface includes an MAC layer, a PHY layer, and a ProSe Protocol layer being an upper layer. Permission for announcement and monitoring of discovery information is handled in the upper layer ProSe Protocol. Contents of discovery information are transparent to an access stratum (AS). The ProSe Protocol allows only valid discovery information to be transferred to the AS for announcement.

An MAC layer receives discovery information from the upper layer ProSe Protocol. An IP layer is not used for transmitting the discovery information. The MAC layer determines a resource used in order to announce the discovery information received from the upper layer. The MAC layer makes and sends a protocol data unit (MAC PDU) to a physical layer. An MAC header is not added.

There are two types of resource assignments for announcing the discovery information.

1. Type 1

The type 1 is a method assigned so that resources for announcing the discovery information are not terminal-specific and the base station provides resource pool configuration for announcing the discovery information to the terminals. The configuration may be included in a system information block (SIB) to be signaled in a broadcast scheme. Alternatively, the configuration may be included in a terminal specific RRC message to be provided. Alternatively, the configuration may be broadcast-signaled or terminal-specific signaled of a different layer from the RRC message.

The terminal selects a resource from an indicated resource pool to announce discovery information using the selected resource. The terminal may announce discovery information through a resource optionally selected during each discovery period.

2. Type 2

The type 2 is a method where resources for announcing the discovery information are terminal-specifically assigned. A terminal in a RRC_CONNECTED state may request a resource for announcing a discovery signal to the base station through a RRC signal. The base station may assign a resource for announcing a discovery signal as an RRC signal. A resource for monitoring the discovery signal in a configured resource pool may be assigned in terminals.

With respect to a terminal in an RRC_IDLE state, a base station may report a type 1 resource pool for announcing the discovery signal as an SIB. Terminals where ProSe direct discovery is allowed use a type 1 resource pool for announcing the discovery information in the RRC_IDLE state. Alternatively, the base station 2) reports that the base station supports the ProSe direct discovery through the SIB but may not provide the resource for announcing the discovery information. In this case, the terminal should enter the RRC_CONNECTED state for announcing the discovery information.

With respect to a terminal in an RRC_CONNECTED state, the base station may configure whether to use a type 1 resource pool or a type 2 resource pool for announcing the discovery information through a RRC signal.

<Vehicle-to-X (V2X) Communication>

As described above, D2D operation generally provides various advantages in that it supports signal transmission and reception between devices adjacent to each other. For example, a D2D UE may perform data communication with a high transmission rate and low latency. Also, D2D operation may disperse traffic concentrated at a base station, and if a UE performing a D2D operation acts as a relay, D2D operation may extend the coverage of the base station. As an extension of the D2D communication, vehicle-related communication including signal transmission and reception between vehicles is particularly called Vehicle-to-X (V2X) communication.

In one example, the 'X' in the V2X represents pedestrian (communication between a vehicle and a device carried by individual (for example, handheld UE carried by a pedestrian, cyclist, driver, or passenger), where, in this case, V2X may be expressed by V2P), vehicle (communication between vehicles, V2V), infrastructure/network (communication between a vehicle and a roadside unit (RSU)/network, where RSU is a transportation infrastructure entity, for example, an entity transmitting speed notifications implemented in an eNB or a stationary UE, V2I/N). Also, in one example, for the convenience of description of the proposed method, a (V2P communication-related) device carried by a pedestrian (or person) is called a "P-UE" while a (V2X communication-related) device installed in a vehicle is called a "V-UE". Also, in one example, the term 'entity' in this document may be interpreted as P-UE, V-UE or RSU (/network/infrastructure).

A V2X UE may perform message (or channel) transmission on a predefined (or signaled) resource pool. Here, a resource pool may refer to a predefined resource(s) which enables a UE to perform a V2X operation (or which is capable of performing a V2X operation). At this time, a resource pool may also be defined in terms of time-frequency aspect.

Meanwhile, various types of V2X transmission resource pools may be defined.

FIG. 6 illustrates types of V2X transmission resource pools.

Referring to FIG. 6(a), V2X transmission resource pool #A may be a resource pool that allows (partial) sensing only. In the V2X transmission resource pool #A, a UE has to select a V2X transmission resource after performing (partial) sensing, and random selection may not be allowed. As shown in FIG. 6(a), a V2X transmission resource selected by (partial) sensing is maintained semi-statically at predetermined intervals.

In order for a UE to perform V2X message transmission on the V2X transmission resource pool #A, a base station may configure a (scheduling assignment decoding/energy measurement-based) sensing operation to be performed (partially). This may be interpreted as not allowing 'random selection' of a transmission resource on the V2X transmission resource pool #A but may be interpreted as (allowing) performing (only) '(partial) sensing' based transmission resource selection. The configuration may be set by the base station.

Referring to FIG. 6(b), the V2X transmission resource pool #B may be a resource pool that allows random selection only. In the V2X transmission resource pool #B, a UE may not perform (partial) sensing but select a V2X transmission resource randomly from a selection window. In one example, different from a resource pool which allows (partial) sensing only, a resource pool which allows only random selection may set (or signaled) so that a selected resource may not be semi-statically reserved.

A base station may set not to perform a (scheduling assignment decoding/energy measurement-based) sensing operation so that a UE may perform a V2X message transmission operation on the V2X transmission resource pool #B. This may be interpreted as performing (/allowing) only 'random selection' of a transmission resource on the V2X transmission resource pool #B and/or not allowing '(partial) sensing'-based transmission resource selection.

Meanwhile, although not shown in FIG. 6, there may exist a resource pool which allows both (partial) sensing and random selection. A base station may inform (the UE) that in such a resource pool, either of the (partial) sensing and random selection may be used to select a V2X resource.

FIG. 7 illustrates a V2X transmission resource (re)selection (/reservation) method according to a partial sensing operation.

Referring to FIG. 7, a UE (which denotes a P-UE in what follows) may determine (or trigger) (re)selection (or reservation) of a resource for V2X signal transmission (depending on whether a predetermined condition is satisfied). For example, suppose the transmission resource (re)selection (or reservation) is determined or triggered at subframe #m. In this case, the UE may (re)select (or reserve) a resource for V2X signal transmission from within a subframe period ranging from the subframe #m+T1 to #m+T2. In what follows, the subframe period ranging from the subframe #m+T1 to #m+T2 is called a selection window. For example, a selection window may comprise 100 consecutive subframes.

A UE may select at least Y subframes within a selection window as candidate resources. In other words, a UE may have to consider at least Y subframes as candidate resources within the selection window. The Y may be a predetermined value or may be determined by the network. It should be noted that how to select Y subframes within a selection window may be subject to issues of implementing a UE. In other words, suppose the Y value is 50. Then the UE may select which 50 subframes to select among 100 subframes comprising a selection window. For example, the UE may select 50 subframes whose subframe number is an odd number from among the 100 subframes. Likewise, the UE may select 50 subframes whose subframe number is an even number. Similarly, 50 subframes may be selected by an arbitrary rule.

Meanwhile, in order to (re)select (or reserve) a specific subframe among the Y subframes, for example, subframe #N (SF #N) as a V2X transmission subframe capable of transmitting a V2X signal, the UE may have to be linked to the subframe #N or sense at least one associated subframe. The (whole) subframe period defined for sensing is called a sensing window, which may comprise 1000 subframes, for example. In other words, a sensing window may span 1000 milliseconds or 1 second. For example, the UE may sense subframes corresponding to subframe #N−100*k (where k may be a set of elements in the range [1, 10] and may be preset or determined by the network) within the sensing window.

FIG. 7 illustrates a case in which k values are {1, 3, 5, 7, 10}. In other words, the UE may sense subframe #N−1000, #N−700, #N−500, #N−300, and #N−100, infer/determine whether the subframe #N is used by other V2X UE (and/or whether relatively high interference (or interference larger than a preset (or signaled) threshold value) exists on the subframe #N), and (finally) select the subframe #N according to the result. Since a P-UE is more sensitive to battery consumption than a V-UE, not all of the subframes within the sensing window are sensed but only part thereof is sensed, namely partial sensing is performed.

In one example, at the time of V2V communication, (A) a sensing operation-based transmission resource selection procedure (or method) and/or (B) a V2V resource pool configuration (or signaling) procedure (or method) may be described as follows.

(A) Sensing Operation-Based Transmission Resource Selection Procedure (or Method)

STEP 1: in the case of PSSCH resource (re)selection, if all of the PSCCH/PSSCH transmissions have the same priority, the entire resources may first be considered as selectable resources.

STEP 2: Meanwhile, the UE may exclude a resource on the basis of at least one of SA decoding and an additional condition.

The UE selects a V2X transmission resource after excluding a specific resource on the basis of scheduling assignment and an additional condition. At this time, if scheduling assignment and data associated therewith are transmitted from the same subframe, a method for excluding a resource on the basis of DM-RS reception power of the PSSCH may be supported. In other words, resources specified or reserved by decoded scheduling assignment and resources the PSSCH Reference Signal Received Power (RSRP) received from data resources associated with the scheduling assignment of which exceeds a threshold value are excluded. More specifically, the PSSCH RSRP may be defined as a linear average of power distribution over Resource Elements (REs) carrying DM-RSs associated with the PSSCH within Physical Resource Blocks (PRBs) indicated by the PSCCH. The PSSCH RSRP may be measured with respect to the antenna connecting unit of the UE. The scheduling assignment may include a 3-bit PPPP

FIELD

The threshold value may be expressed as a function of priority information. For example, the threshold value may be dependent on the priority information of a transmission block and priority information of decoded scheduling assignment. The threshold may be set as a value starting from −128 dBm up to 0 dBm in 2 dBm units. A total of 64 threshold values may be predefined.

It may be assumed that the UE decodes scheduling assignment at the subframe #m+c belonging to the sensing period, and the same frequency resource is reserved by the scheduling assignment at the subframe #m+d+P*i. As described above, P may be a fixed value of 100. i may be selected from the range of [0, 1, . . . , 10], which may be set in a carrier-specific manner by the network or predetermined. If i=0, it indicates that no frequency resources are intended to be reserved. i may be set by a 10-bit bitmap or by a four-bit field within scheduling assignment.

If a candidate semi-static resource X collides with a resource Y reserved by scheduling assignment by another UE at the period P*I and satisfies a condition for exclusion, the UE may exclude the candidate semi-static resource X. The I represents the value of i signaled by scheduling assignment.

If the remaining resources after excluding resources through scheduling assignment decoding, sensing process, and so on is less than 20% of the total resources within a selection window, the UE increases the threshold value (for example, by 3 dB) and again performs the process of excluding resources, where the process may be performed until the remaining resources is more than 20% of the total resources within the selection window. The total resources within the selection window represent the resources that the UE has to consider as possible candidate resources.

Meanwhile, during the process of selecting a V2X transmission resource after a specific resource is excluded, if the UE's counter reaches 0, the current resources may be maintained with a probability of p, and the counter may be reset. In other words, resources may be reselected with a probability of 1-p.

The carrier-specific parameter p may be preset and take a value from [0, 0.2, 0.4, 0.6, 0.8].

The UE measures the remaining PSSCH resources except for specific resources, ranks the remaining PSSCH resources in terms of total received energy, and selects a subset. The subset may be a set of candidate resources having the lowest reception energy. The size of the subset may amount to 20% of the total resources within a selection window.

The UE may select one resource randomly from the subset.

When only one transmission block is transmitted from one subframe, the UE may select M consecutive sub-channels, and the average of energy measured at each sub-channel may become the energy measurement value of each resource.

Meanwhile, when a Transmission Block (TB) is transmitted from two subframes, the following resource selection may be supported.

First, one resource which uses a mechanism defined for the case of a TB transmitted from one subframe may be selected.

And other resources may be selected randomly under the following conditions. A selected resource should be neither the same subframe as the first resource nor a subframe excluded from resource selection. Moreover, SCI should be able to indicate a time gap between two selected resources.

If no resource satisfies a condition for selecting a second resource, a TB may be transmitted by using the first resource only.

STEP 3: the UE may select a V2X transmission resource among the resources not excluded.

(B) V2V Resource Pool Configuration (Signaling) Procedure (or Method)

First, if resources are configured so that SA and data are always transmitted from the same subframe, the UE is not expected to transmit mixed PSCCHs from different subframes.

In a pool where the UE is configured to transmit SA and data always from RBs adjacent to the same subframe, among sub-channels selected for data transmission, the sub-channel having the lowest index may be used for SA transmission.

In the case of a pool in which the UE is configured to transmit SA and data from RBs not adjacent to the same subframe, the number of SA candidate resources in the SA pool may be the same as the number of sub-channels in the associated data pool. Among the SA resources selected for data transmission, the SA resource associated with the lowest index may be used for SA transmission.

The UE may perform resource selection/reselection at TTI m ($\geq$n). Here, TTI m may represent reception time of a TB.

Regarding resource reselection, the UE has to consider candidate resources available in the period of [m+T1, m+T2]. Here T1 is a UE-specific parameter, and T1$\leq$[4]. Also, T2 may be a UE-specific parameter, and 20$\leq$T2$\leq$100. Here the selected T2 has to satisfy the latency requirement.

Also, a sensing window may change as [m−a, m−b). (Here, a=b+1000 and b=1).

In the case of a pool in which the UE is configured to always transmit SA and data from RBs adjacent to the same subframe, a resource pool may comprise one or more sub-channels in the frequency domain. Here, a sub-channel may be composed of a group of RBs adjacent to the same subframe. Moreover, the size of a sub-channel in the resource pool may be set by a base station (for example, eNB) or a predetermined value. Here, candidate resources of a sub-channel may be selected from a subset {5, 6, 10, 15, 20, 25, 50, 75, 100}.

In the case of a pool in which the UE is configured to transmit SA and data from RBs not adjacent to the same subframe, a resource pool may comprise one or more sub-channels in the frequency domain. Here, a sub-channel may be composed of a group of RBs adjacent to the same subframe. Moreover, the size of a sub-channel in the resource pool may be set by a base station (for example, eNB) or a predetermined value. Here, the number of sub-channels may not be more than 200, and the minimum candidate size may not be less than 4.

The UE may select an integer number of adjacent sub-channels for transmission and may not decode more than 100 RBs in one subframe. Moreover, the UE may not decode more than 10 PSSCHs in one subframe.

The SA pool may be overlapped with an associated data pool. Moreover, the SA pool may also be overlapped with a non-associated data pool.

In the case of a pool in which the UE is configured to transmit SA and data from RBs adjacent to the same subframe, a resource pool may be composed of N consecutive PRBs. Here, N may be the same as (size of a sub-channel x number of sub-channels).

The V2V pool may be defined so that bitmaps are repeatedly mapped onto all of the subframes except for skipped SLSS subframes. Here, the length of a bitmap may be 16, 20, or 100. The bitmap may define which subframe is allowed for V2V SA/data transmission and/or reception with respect to a pool.

Meanwhile, if resource reselection is triggered, the UE may reselect resources related to all transmissions corresponding to one TB. Here, SA may schedule transmission corresponding to one TB. Also, PSSCH-RSRP measured in a TTI occurred before reception of associated SA decoded successfully may be applied. Here, the number of transmission for one TB may be 1 or 2. Additionally, each SA may indicate time/frequency resources for all of the data transmission corresponding to the same TB.

In what follows, the present invention will be described.

The proposed methods described below deal with a situation in which a V2X UE(s) (re)reserves (or selects) its own resource(s) related to V2X message transmission. In this situation, the present invention provides (A) a method for efficiently defining boundaries in the time domain in which a sensing operation is performed and (B) a method for efficiently supporting retransmission (RE-TX) of V2X messages(s) omitted (or stopped) as the sensing operation is performed. Here, as one example, the word "sensing" in this document may be interpreted as RSRP measurement operation (for example, S-RSRP) with respect to a (predefined or signaled) Reference Signal (RS) (on the PSSCH scheduled by the PSCCH which has been successfully decoded) and/or energy measurement operation (for example, S-RSSI) with respect to a (sub)channel, or decoding operation with respect to a predefined (signaled) channel (for example, Physical Sidelink Control Channel (PSCCH)). In one example, in the present invention, the word "duration" (and/or "period") may be extended to be interpreted as "range (or window)".

[Proposed Rule #1]

The boundary (or position) of a time region (or period) in which a sensing operation is performed (for each V2X UE(s)) may have the form (or characteristic) of "UE-specific (time) boundary". Here, in one example, the boundary (or position) of the time region (or period) in which a (resource (re)reservation (or selection)-related) sensing operation of a specific V2X UE is performed may be defined as "V2X message TX time (SF #K)" (of the corresponding V2X UE). When this rule is applied, in one example, the V2X UE performs a sensing operation at the remaining (resource) time points except for the (resource) time point at which the V2X UE (actually) performs a V2X message TX operation on the resource period ranging from "SF #(K−D) to SF #K (or the resource period ranging from SF #(K−1−D) to SF #(K−1)) (where, in one example, "D" represents a predefined (or signaled) 'sensing duration')" and then (re)reserves (or selects) its own resource(s) related to V2X message TX. Here, as another example, the V2X UE skips (or stops) (last) transmission (of its V2X message) on the 'SF #K' (according to a predefined rule) (if needed), performs sensing (measurement) of up to (SF #K) resources of the V2X UE (or previously reserved (or selected) resources), and immediately performs optimal re-reservation (or selection) of resources (and/or immediately transmits a V2X message by using the re-reserved (or selected) resources). Here, as a still another example, in the case of a V2X UE performing a sensing operation in the resource period, the V2X UE may perform (sensing result-based) resource (re) reservation (or selection) on the resource period ranging from "SF #(K+1) to SF #(K+1+R) (or a resource period ranging from SF #K to SF #(K+R), where "R" represents a predefined (or signaled) 'TX resource (re)selection duration')".

For the convenience of understanding, that the boundary of a time region in which a sensing operation (for each V2X UE(s)) is performed according to the proposed rule #1 takes the form (or characteristic) of a "UE-specific (time) boundary" may be described with reference to related drawings as follows.

Figure 8:
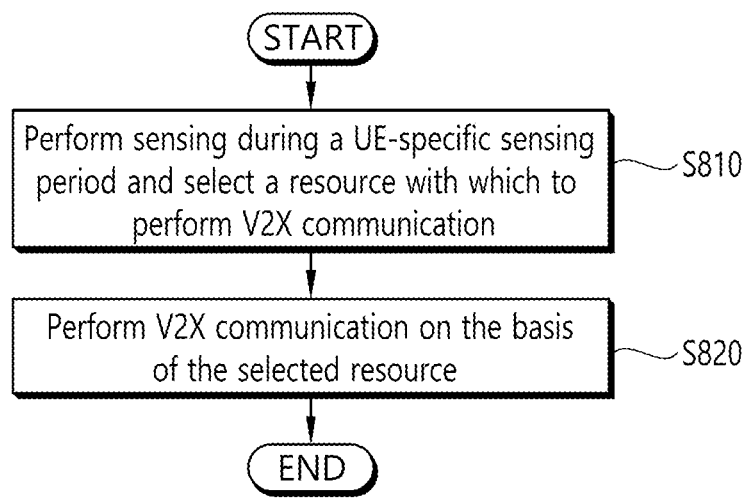
FIG. 8 is a flow diagram illustrating a method for performing V2X communication based on a UE-specific sensing period according to one embodiment of the present invention.

FIG. 8 is a flow diagram illustrating a method for performing V2X communication based on a UE-specific sensing period according to one embodiment of the present invention.

Referring to FIG. 8, a UE may select a resource with which to perform V2X communication by performing sensing during a UE-specific sensing period S810. Here, the UE's performing sensing during a specific period (namely, UE-specific sensing period (or UE-specific sensing window)) and selecting a resource with which to perform V2X communication may be described from a viewpoint that (A) the period during which the UE performs sensing (namely, a sensing window) is UE-specific and from a viewpoint that (B) the period during which the UE performs sensing is 1 second (namely, a period corresponding to 1000 subframes, where each subframe occupies a period of 1 ms) and the 1 second corresponds to up to SPS period (or maximum (possible) resource reservation period) length (namely [N−1000, N−1]).

(A) First, selection of a resource to perform V2X communication may be described as follows from a viewpoint that the period in which a UE performs sensing (namely a sensing window) is UE-specific.

As described above, the UE may select a resource to perform V2X communication by performing sensing, where UEs may have different periods during which sensing is performed (namely UE-specific sensing periods). Here, having a UE-specific sensing period does not mean that sensing time itself is different for each UE but the position of the sensing period (namely a sensing window) is different for each UE.

In other words, the boundary of a time region in which a sensing operation is perform (for each V2X UE(s)) may have the form (or characteristic) of a "UE-specific (time) boundary". In other words, an energy measurement window is UE-specific (in other words, in the case of "[N-A, N-B]" energy sensing (or measurement) period, the N value is UE-specific), which is described with reference to related drawings as follows.

Figure 9:
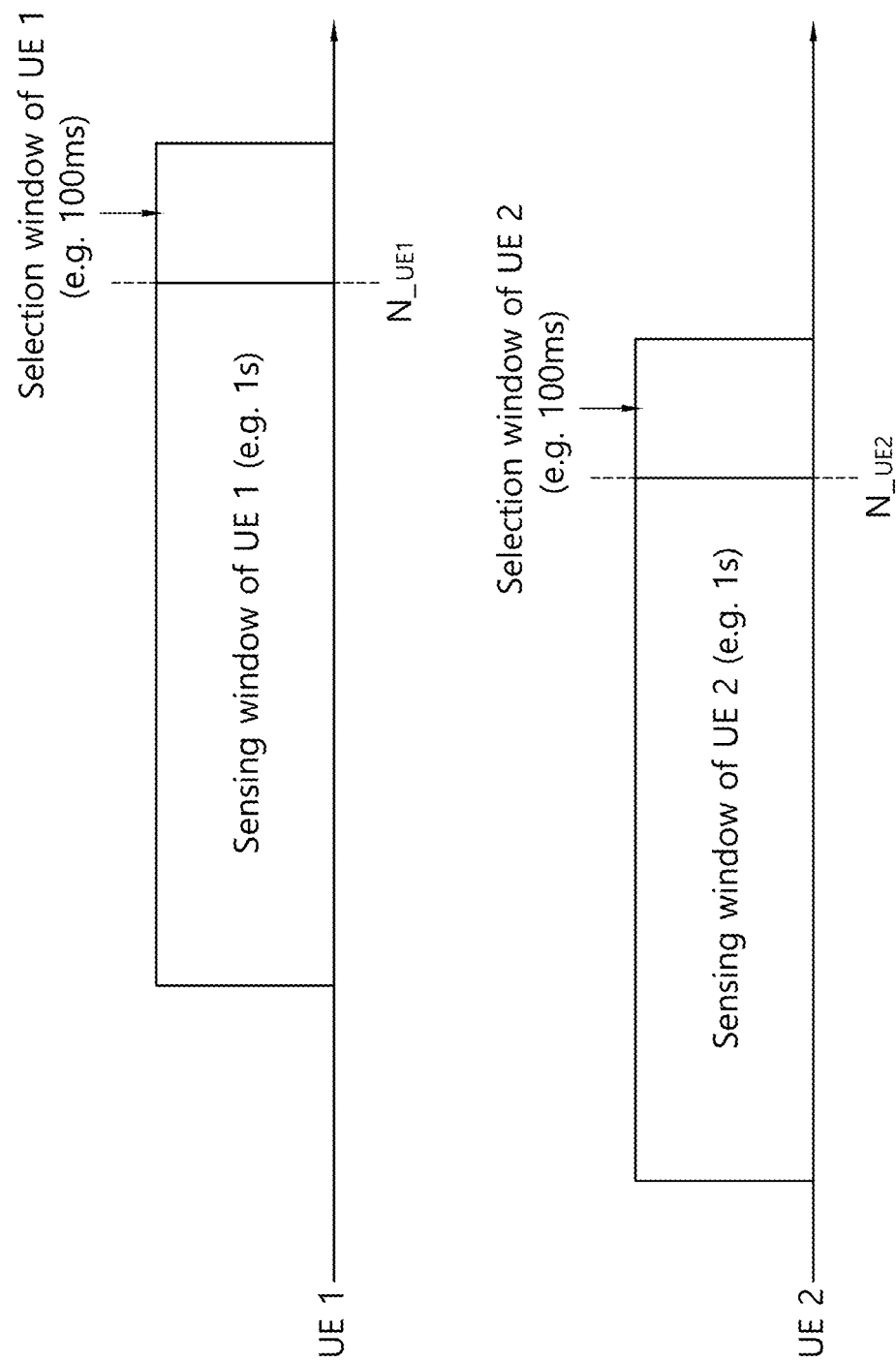
FIG. 9 illustrates an example of a UE-specific sensing window.

FIG. 9 illustrates an example of a UE-specific sensing window.

Referring to FIG. 9, each UE, namely 'UE 1' and 'UE 2' have a sensing window spanning a different time period, and sensing windows may be defined for the respective UEs at different times.

More specifically, if an upper layer of the UE makes a request at a specific subframe (in what follows, subframe N), the UE may determine a set of resources that have to be transmitted to the upper layer in conjunction with V2X message transmission (for example, PSSCH transmission).

Afterwards, the UE monitors during a specific sensing period (excluding subframes in which the UE performs transmission) (for example, subframe N−1000, N−999, N−998, . . . , up to N−1). Here, that the UE monitors a specific sensing period (for example, subframe N−1000, N−999, . . . , up to N−1) with respect to the subframe N determined by the upper layer of the UE itself means that the sensing window in which the UE performs monitoring is determined by the corresponding UE.

To describe an example of FIG. 9, in the case of UE 1, it may be assumed that the upper layer of UE 1 generates a request at $N_{\_UE1}$. In this case, the sensing period of UE 1 (namely, a sensing window) spans the subframe N_UE1-1000, N_UE1-999, . . . , up to N_UE1-1, and the sensing window in this case is specific to the UE 1 as shown in FIG. 9. In the same manner, in the case of UE 2, it may be assumed that the upper layer of UE 2 generates a request at $N_{\_UE2}$. In this case, the sensing period of UE 2 (namely, a sensing window) spans the subframe N_UE2-1000, N_UE2-999, . . . , up to N_UE2-1, and the sensing window in this case is specific to the UE 2 as shown in FIG. 9.

Afterwards, the UE may select a resource with which to perform V2X communication on the basis of S-RSSI measured within the aforementioned subframes, namely N−1000, N−999, N−998, . . . , N−1 and the decoded PSCCH. Here, a specific example in which the UE selects a resource with which to perform V2X communication is the same as described above.

(B) The descriptions given below are based on the viewpoint that the period during which the UE performs sensing is 1 second (namely a period of 1000 subframes) and the 1 second corresponds to the maximum Semi-Persistent Scheduling (SPS) (or maximum (possible) resource reservation period) length (namely [N–1000, N–1]).

In one example, if a V2X UE uses a sensing result obtained by monitoring the period comprising SF #(N–A), SF #(N–A+1), SF #(N–B) (or SC PERIOD #(N–A), SC PERIOD #(N–A+1), . . . , SC PERIOD #(N–B)) (AB (for example, the 'B' value may be a positive integer larger than '0' by taking into account the processing time for resource (re)selection)) for (V2X message TX-related) resource (re) reservation (or selection) in a triggered 'SF #N' (or 'SC PERIOD #N'), the "MONITORING WINDOW SIZE (namely, '(A–B)')" may be set to the maximum value of the times at which resource (re)reservation (or selection) occurs (which may be interpreted as the interval between reserved resources, for example). In one example, the corresponding V2X UE selects its transmission resources from the period of 'SF #(N+C), SF #(N+C+1), SF #(N+D) (or SC PERIOD #(N+C), SC PERIOD #(N+C+1), . . . , SC PERIOD #(N+D)) (DC (for example, the 'C' value may be a positive integer larger than '0' by taking into account the processing time related to PSCCH/PSSCH generation))'. As a specific example, if resource (re)reservation (or selection) is performed every 500 milliseconds, (by taking into account that the time length of a transmission resource (latency requirement) is 100 ms) '(A–B)' may become 400 ms (here, for example, the '400 ms' may be interpreted as the remainder after subtracting one predefined 'SC PERIOD (100 ms)' (latency requirement) from '500 ms'). Also, in one example, the corresponding '400 ms' period may be interpreted as a period ranging from 'SF #(N–500MS)' to 'SF #(N–100MS)'. In other words, the 'SENSING DURATION' (or '(A–B)') may become a function of predefined (or preset) 'resource (re)reservation (or selection) period' (or it may be interpreted as performing a 'sensing operation' during the time period derived from the 'resource (re) reservation (or selection) period). To summarize, in one example, since the same resource will be selected (or used) until 'resource re-reservation (or selection)' is performed, it may be meaningful to sense the resource right before the current ('resource re-reservation (or selection)') period, but it is not required to sense the resource before the time at which the 'resource re-reservation (or selection)' necessarily occurs. Here, in one example, such a rule may be particularly useful when the SA/DATA (pool) is implemented as a 'TDM structure'.

As another example, it is assumed that the V2X UE(s) performs 'SA (or PSCCH)' transmission related to the 'DATA (or PSSCH)' transmission associated with the 'SF #(N+D)' (for example, D≥C) in the 'SF #(N+C)'. Here, in one example, the 'SF #N' may be assumed (or interpreted) as the time at which (according to a predefined rule (or signaling)) the 'RESOURCE (RE)SELECTION' operation is performed and/or the period ranging from the 'SF #(N–A)' to the SF #(N–B)' (for example, A>B>0) may be assumed (or interpreted) as the region which provides a sensing result referenced when 'SA (or PSCCH) ('SF #(N+C)') and/or DATA (or PSSCH) ('SF #(N+D)') RESOURCE (RE)SELECTION operation is performed (or in which sensing is performed). Here, in one example, when 'POTENTIAL DATA (or PSSCH)' transmission related to other TB on the 'SF #(N+E)' is performed in the 'SF #(N+D)' (for example, D<E), the V2X UE may inform of the intent of whether to reuse a '(frequency) resource' (used for 'DATA (or PSSCH)' transmission on the 'SF #(N+D)') through a (predefined (or signaled)) channel (for example, 'SA (or PSCCH)' (SF #(N+C)') (or through 'DATA (or PSSCH)'). Here, in one example, a field to which '(E-C)' value (or '(E-D)' value or 'E' value) is (additionally) transmitted may be (newly) defined on the 'SA (or PSCCH)' ('SF #(N+C)') used for the corresponding use. Here, in one example, '(E-C)' value (E_CGAP) (or '(E-D)' value (E_DGAP)) (or 'E' value (E_GAP)) may be interpreted as an interval between 'SA (or PSCCH)' ('SF #(N+C)') transmission time point and 'NEXT TB' related (POTENTIAL) DATA (or PSSCH) transmission time point (or an interval between the 'DATA (or PSSCH)' transmission time point scheduled from 'SA (or PSCCH)' ('SF #(N+C)') and the (POTENTIAL) 'DATA (or PSSCH) transmission time point related to the 'NEXT TB') or 'V2X MESSAGE GENERATION (or TX) PERIODICITY'. Here, in one example, the 'SENSING WINDOW SIZE' (for example, '(B-A)') of the V2X UE may be determined (or configured) according to the following (partial) rule. Here, in one example, 'E-CGAP' (or E_DGAP or E_GAP) related (maximum (or minimum)) value may be set (or signaled) to 'SINGLE VALUE' or 'MULTIPLE VALUE(s)' (in a 'UE-COMMON' or 'UE-SPECIFIC' manner from the network or a (serving) base station) or may be regarded (or assumed) to be the same as the V2X UE's (maximum (or minimum)) 'MESSAGE GENERATION (or TX) PERIODICITY'.

(Rule #A) (A) 'E_CGAP' (or E_DGAP or E_GAP) related (maximum (or minimum)) value and/or (B) (maximum (or minimum)) 'MESSAGE GENERATION (or TX) PERIODICITY' value may be considered (or determined) as the 'SENSING WINDOW SIZE'. As another example, the 'SENSING WINDOW SIZE' may be set to a predefined (or signaled) (specific) value irrespective of (A) 'E_CGAP' (or E_DGAP or E_GAP) related (maximum (or minimum)) value and/or (B) (maximum (or minimum)) 'MESSAGE GENERATION (or TX) PERIODICITY' value. Here, in one example, if the aforementioned rule is applied, even when the V2X UE performs 'V2X MESSAGE' transmission having a (relatively) long 'MESSAGE GENERATION (or TX) PERIODICITY', a sensing operation may be performed by using a (relatively) small 'SENSING WINDOW SIZE' (which may be interpreted as a kind of 'PARTIAL (or LIMITED) REGION SENSING'). In one example, in the Rule #A, the 'SENSING WINDOW SIZE' may be set in a 'UE-COMMON' (or 'UE-SPECIFIC') manner.

(Rule #B) A predefined (or signaled) '(V2X) SPS PERIODICITY' value may be considered (or determined) as the 'SENSING WINDOW SIZE'. Here, in one example (in which the corresponding rule is applied), if a plurality of different 'SPS configurations (or processes)' are set (or signaled) to the 'SPS PERIODICITY', it may be interpreted (or considered) that a different 'SENSING WINDOW SIZE' is applied to each 'SPS configuration (or process)'. As another example, when a plurality of 'SPS configurations (or processes or (transmission) operations) having different' (V2X) SPS PERIODICITIES' are set (or signaled or permitted), the maximum (or minimum) value among the corresponding '(V2X) SPS PERIODICITIES' is determined (or derived) as the '(COMMON) SENSING WINDOW SIZE', which may also be applied commonly to the plurality of 'SPS configurations (or processes or (transmission) operations). In one example, in the Rule #B, the 'SENSING WINDOW SIZE' may be set in a 'UE-SPECIFIC' (or 'UE-COMMON') manner.

Here, the SPS period may be determined as in the resource reservation fields of Sidelink Control Information (SCI) format 1 of Table 1 as shown below.

TABLE 1

| Resource reservation field in the SCI format 1 | Indicated value X | Condition |
|---|---|---|
| '0001', '0010', ..., '1010' | Decimal number corresponding to the field | The upper layer is different. Resources for transmitting TBs are maintained, and the value of X is such that $1 \le X \le 10$. |
| '1011' | 0.5 | The upper layer is different. Resources for transmitting TBs are maintained, and the value of X is 0.5. |
| '1100' | 0.2 | The upper layer is different. Resources for transmitting TBs are maintained, and the value of X is 0.2. |
| '0000' | 0 | The upper layer is different. Resources for transmitting TBs are not maintained. |
| '1101', '1110', '1111' | Reserved | — |

Here, a receiving UE (RX UE) may figure out the resource reservation period of the final transmitting UE (TX UE) on the basis of the values that may be signaled to the RESOURCE RESERVATION field of the SCI format shown in table 1.

At this time, by multiplying the value of the resource reservation field by 100, the RX UE may determine the "resource reservation period candidate value" that may be configured by the TX UE. For example, if the value of the resource reservation field is '0001', the resource reservation period may be 100 ms while, if the value of the resource reservation field is '0010', the resource reservation period may be 200 ms. In the same manner, if the value of the resource reservation field is '1010', the resource reservation period may be 1000 ms.

To summarize, the RX UE may figure out that the "resource reservation period candidate" values which may be set by the TX UE by multiplying the value of the resource reservation field by 100 are "20, 50, 100, 200, 300, 400, 500, 600, 700, 800, 900, 1000 ms", and accordingly, the maximum value of the SPS period may have the value of 1000 ms (namely 1 s).

As described above, the period in which a UE performs sensing (namely a sensing window of the UE) may have the maximum SEMI-PERSISTENT SCHEDULING (SPS) period (or the maximum (possible) resource reservation period), and accordingly, the period in which the UE performs sensing (namely a sensing window) may be 1000 ms (namely 1s0 which is the maximum value of the SPS period.

Referring again to FIG. 8, the UE may perform V2X communication by using the selected resources S820. As described above (or below), the UE may select a subframe within a selected window on the basis of a sensing result obtained by performing sensing during a UE-specific sensing period, determine transmission reservation resources on the basis of selected subframes, and perform V2X communication on the reserved resources. Since specific example in which the UE performs V2X communication on the basis of selected resources is the same as described above (or below), specific details will be omitted.

Meanwhile, end-to-end latency has to be taken into account for V2X communication. In other words, when the UE transmits a packet generated in the upper layer, not only the time required to send a packet generated in the upper layer down to the physical layer but also the time for the RX UE to receive the packet and send the received packet up to the upper layer of the RX UE has to be considered. Therefore, how to configure a period during which the UE selects a resource for performing a V2X message transmission, namely a selection window to select a transmission resource becomes of importance. In what follows, a method for configuring a selection window will be described with reference to related drawings.

Figure 10:
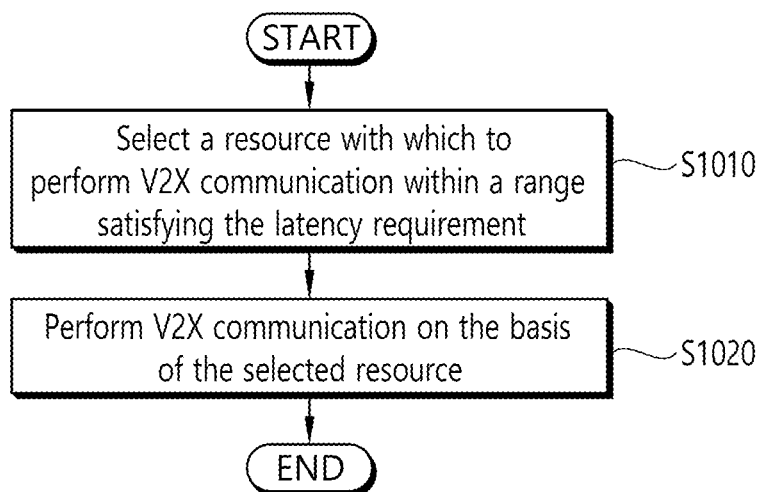
FIG. 10 is a flow diagram illustrating a method for configuring a selection window according to one embodiment of the present invention.

FIG. 10 is a flow diagram illustrating a method for configuring a selection window according to one embodiment of the present invention.

A UE may select a resource (or subframe and in what follow, a resource and a subframe may be used interchangeably for the convenience of description) with which to perform V2X communication within a range satisfying a latency requirement S1010. At this time, the UE may select the resource by configuring a selection window within a range satisfying the latency requirement, the V2X communication may be performed in units of multiple sub-channels, and a resource for performing the V2X communication may be selected on the basis of the sensing result obtained by performing in units of sub-channels the size of which corresponds to the size of the multiple sub-channels. The sensing region in which the sensing is performed may have the size corresponding to that of the plurality of sub-channels. Moreover, the UE may also perform sensing by using the energy measurement average value of sub-channels belonging to the multiple sub-channels.

To summarize, the UE may not only select the resource by configuring a selection window within a range satisfying the latency requirement but also perform sensing in units of multiple sub-channels when the V2X communication is performed in units of multiple sub-channels. A specific example in which sensing is performed in units of multiple sub-channels when the V2X communication is performed in units of multiple sub-channels will be described later.

In what follows, an example in which the UE selects a transmission resource within a range satisfying the latency requirement will be mainly described.

The UE may (configure a selection window and) select a transmission resource (or subframe) within a range satisfying the latency requirement. Here, the UE may assume that a set of neighboring sub-channels (for example, LsubCH) in the V2X resource pool (for example, PSSCH resource pool) belonging to a specific period (for example, [n+T1, n+T2]) correspond to one candidate subframe (resource). At this time, selection of information (for example, T1 and T2) for determining the specific period may depend on how the UE is implemented. T1 may have a value less than or equal to 4 while T2 may have a value not less than 20 and not more than 100. In particular, UE's selection of T2 has to satisfy the latency requirement.

For example, 'SENSING DURATION (D)' and/or 'TX RESOURCE (RE)SELECTION DURATION (R)' may be (implicitly) assumed to be the same as the 'V2X MESSAGE GENERATION PERIOD' (and/or '(SERVICE) LATENCY REQUIREMENT') (and/or depending on the 'V2X MESSAGE GENERATION PERIOD' (and/or '(SERVICE) LATENCY REQUIREMENT' and/or '(V2X MESSAGE (or TB))' or 'PPPP' (for example, when a (partly) different 'PPPP' value is set (or permitted) for each V2X MESSAGE (or TB) having a different '(SERVICE) LATENCY REQUIREMENT'), may be assumed (or changed) differently) and/or assume a predefined (or signaled) specific value (for example, the corresponding rule may be interpreted that 'TX RESOURCE (RE)SELECTION DURATION (R)' is configured to satisfy the '(SERVICE) LATENCY REQUIREMENT'). Here, in one example, (in particular, in the latter case), the 'SENSING DURATION (D)' and 'TX RESOURCE (RE)SELECTION DURATION (R)' may (always) be set (or considered) to have the same value or may be defined to have an independent (or different) value. As another example, the boundary of the time region in which the (resource (re)reservation (or selection)-related sensing operation of a specific V2X UE is performed may be defined as "V2X MESSAGE GENERATION TIME" (of the corresponding V2X UE). As a yet another example, when the '(TX) PROCESSING TIME' (of the V2X UE) is considered, the time point obtained by adding (or subtracting) a predefined (or signaled) offset to (or from) the 'boundary criterion of a time region in which a sensing operation (related to resource (re)reservation (or selection)) is performed' described above (for example, 'V2X MESSAGE TX TIME' and 'V2X MESSAGE GENERATION TIME') may become the final 'boundary criterion of a time region in which a sensing operation is performed'. As a specific example, the V2X UE performs a sensing operation at the remaining (resource) time points except for the (resource) time point at which the V2X UE itself (actually) performs the V2X MESSAGE TX operation in the resource period ranging from "SF #(K−D−S) to SF #(K−S) (or in the resource period ranging from SF #(K−1−D−S) to SF #(K−1−S) (where, in one example, "D" and "S" represent the predefined (or signaled) 'SENSING DURATION' and '(TX) PROCESSING TIME' (of the V2X UE), respectively" and then (re)reserve (or select) a V2X MESSAGE TX-related resource(s) of the V2X UE itself (in the resource period ranging from "SF #(K+1) to SF #(K+1+R) (or from SF #K to SF #(K+R)) (where, in one example, "R" represents the predefined (or signaled) 'TX RESOURCE (RE)SELECTION DURATION')).

Afterwards, the UE may perform V2X communication by using the selected resource S1020. Here, as described above, the selected resource may indicate the resource determined on the basis of a selection window constructed within a range satisfying the LATENCY REQUIREMENT (in other words, a resource on the selection window satisfying the latency requirement). Also, as described above (or below), the UE may select a subframe within the selection window on the basis of a sensing result obtained by performing sensing in a UE-specific sensing period, determine transmission reservation resources on the basis of the selected subframe, and perform V2X communication on the reserved resource. Since a specific example in which the UE performs V2X communication on the basis of a selected resource is the same as described above (or below), specific details will be omitted.

Figure 11:
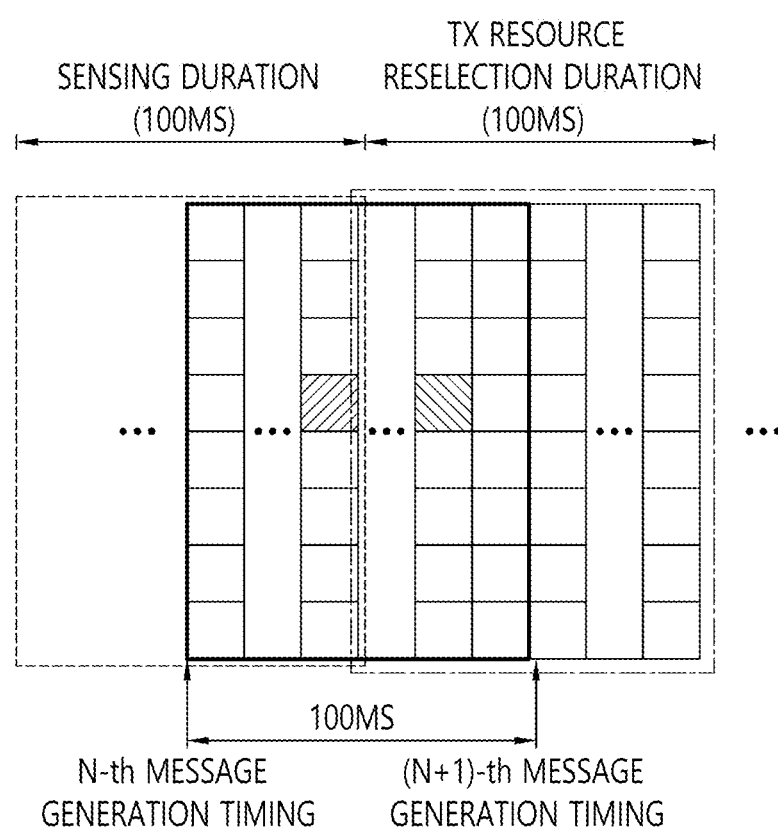
FIGS. 11 and 12 illustrate the proposed rule #1.
Figure 12:
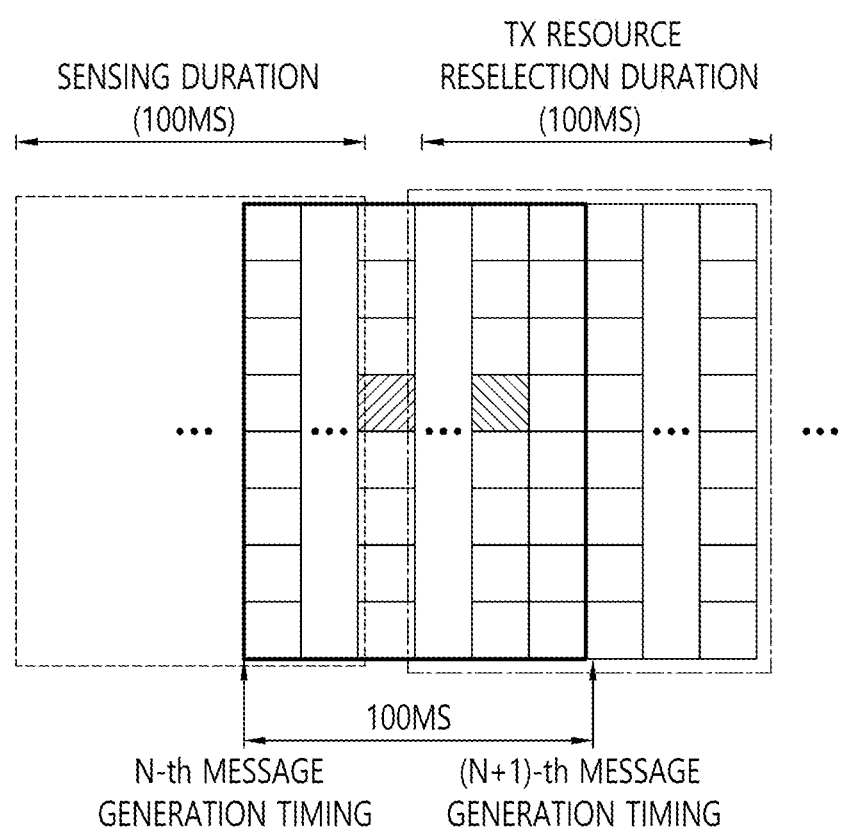

FIGS. 11 and 12 illustrate the proposed rule #1.

FIGS. 11 and 12 assume that (for each V2X UE(s)) a V2X message is generated periodically (for example, '100 ms'). Also, in one example, it is assumed that the 'SENSING DURATION (or TX RESOURCE (RE)SELECTION DURATION)' and 'V2X MESSAGE TX related repetition number' are set to '100 ms' and '1', respectively. In an additional example, FIG. 11 illustrates a case in which a V2X UE performs a sensing operation at the remaining (resource) time points except for the (resource) time point at which the V2X UE (actually) performs a V2X message TX operation on the "resource period ranging from SF #(K−100) to SF #K" and then re-reserves (or selects) the V2X message TX-related resource(s) on the "resource period ranging from SF #(K+1) to SF #(K+101)" by using the corresponding sensing result. FIG. 12 illustrates a case in which a V2X UE performs a sensing operation at the remaining (resource) time points except for the (resource) time point at which the V2X UE (actually) performs a V2X message TX operation on the "resource period ranging from SF #(K−1) to SF #(K−101)" and then re-reserves (or selects) the V2X message TX-related resource(s) on the "resource period ranging from SF #(K+1) to SF #(K+101)" by using the corresponding sensing result. In one example, in FIGS. 11 and 12, 'transmission of the (N+1)-th V2X message' is performed through a reselection resource (for example, SF #(K+Z+100)).

Figure 13:
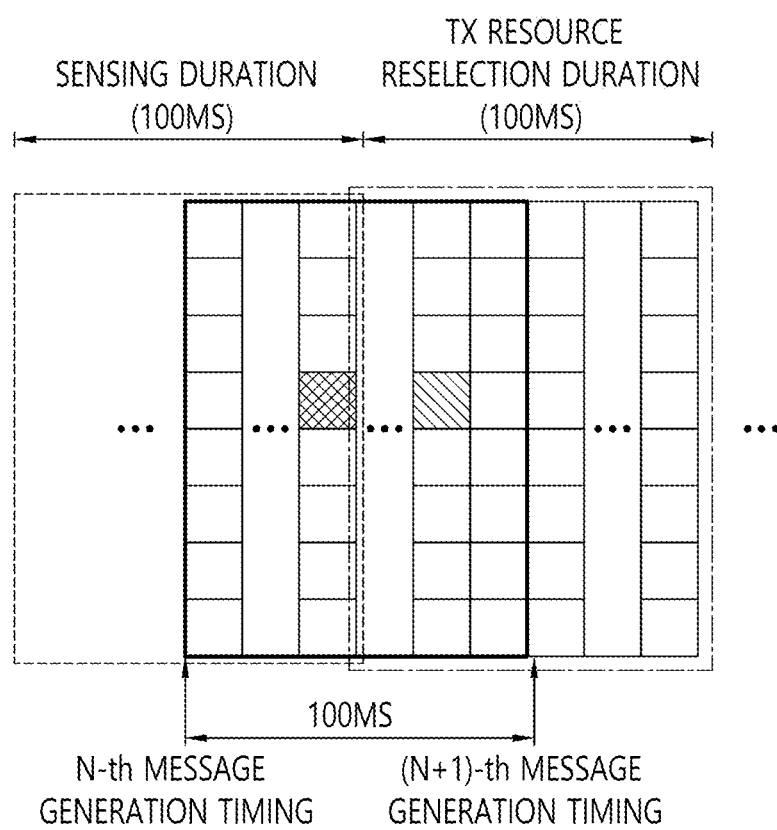
FIGS. 13 and 14 illustrate determining a re-reservation (or selection) resource and performing a V2X message immediately by using the re-reserved (or selected) resource.
Figure 14:
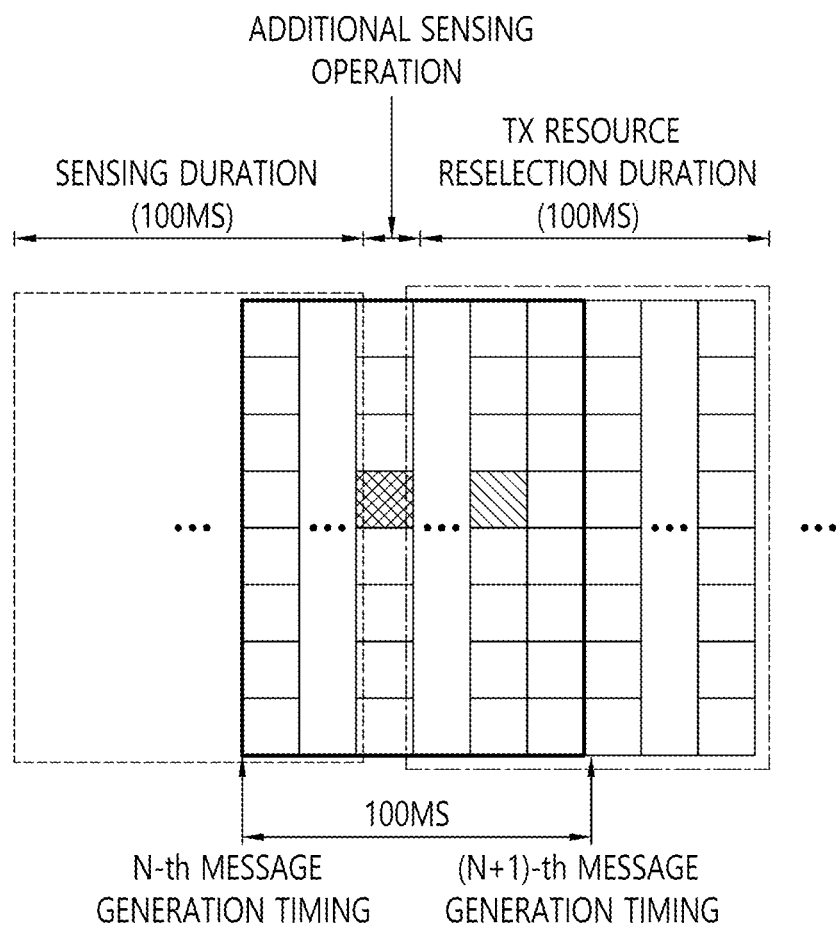

FIGS. 13 and 14 illustrate determining a re-reservation (or selection) resource and performing a V2X message immediately by using the re-reserved (or selected) resource.

More specifically, FIGS. 13 and 14 illustrate respectively a case in which, under the same situation as in FIGS. 11 and 12, a V2X UE skips (or stops) transmission of a V2X message on the 'SF #K' (according to a predefined rule), senses (or measures) up to the resource (SF #K) that has been used by the V2X UE (or reserved (or selected) previously), and determines the optimal re-reserved (or selected) resource and immediately performs transmission of a V2X message by using the re-reserved (or selected) resource. Here, in one example, 'transmission of the (N+1)-th V2X message' is performed through the reselection resource (for example, SF #(K+Z+100)).

[Proposed Rule #2]

For the purpose of sensing (or measuring) a resource used (in the Proposed Rule #1) (or reserved (or selected) previously), a skipped (or stopped) V2X message transmission (for example, in the cases of FIGS. 13 and 14, 'the N-th V2X message transmission') may be re-transmitted according to the following (partial) rule.

Example #2-1

If the '(SERVICE) LATENCY REQUIREMENT' condition may be satisfied when the 'skipped (or stopped) V2X message' is re-transmitted through a re-reserved (or selected) resource after resource re-reservation (or selection) is performed according to a 'sensing (measurement) result' and a 'predefined (re-reservation (or selection)) criterion (or rule)' (without consideration to the retransmission of the 'skipped (or stopped) V2X message), it may be defined so that retransmission of the 'skipped (or stopped) V2X message' is performed (immediately) (by using the corresponding re-reserved (or selected) resource). On the other hand, if the '(SERVICE) LATENCY REQUIREMENT' is not satisfied when retransmission of the 'skipped (or stopped) V2X message' is performed through the re-reserved (or selected) resource, it may be defined so that retransmission of the 'skipped (or stopped) V2X message' (by using the corresponding re-reserved (or selected) resource) is not performed. As a specific example, in the cases of FIGS. 13 and 14, since the '(SERVICE) LATENCY REQUIREMENT (100 ms)' may be satisfied when retransmission of the 'skipped (or stopped) V2X message (SF #K)' is performed through the re-reserved (or selected) resource (SF #(K+Z)), retransmission of the 'skipped (or stopped) V2X message' is performed immediately (through the re-reserved (or selected) resource (SF #(K+Z)).

Example #2-2

It may be defined so that the V2X UE performs resource re-reservation (or selection) by taking into account only the 'candidate resources' which enable retransmission of the 'skipped (or stopped) V2X message' to satisfy the '(SERVICE) LATENCY REQUIREMENT'. When this rule is applied, for example, the V2X UE finally re-reserves (or selects) the optimal resource which satisfies a predefined (re-reservation (or selection)) criterion (or rule) among the corresponding 'candidate resources'. Here, in one example, through the corresponding final re-reserved (or selected) resource, not only retransmission of the 'skipped (or stopped) V2X message' but also transmission of a V2X message(s) (to be generated) afterwards is performed. The rule described above may guarantee retransmission of the 'skipped (or stopped) V2X message' with a high probability. To guarantee the operation described above, the region for 'TX RESOURCE (RE)SELECTION DURATION (R)' may be reduced. Through this scheme, only those resources close to the current (skipped (or stopped)) transmission time may be selected so that the (skipped (or stopped)) V2X message(s) is retransmitted while the '(SERVICE) LATENCY REQUIREMENT' is satisfied. In this case, the region for 'SENSING DURATION (D)' may also be (accordingly) reduced.

Example #2-3

It may be defined so that a resource (or pool) for (only) retransmission of a (previously) 'skipped (or stopped) V2X message' is configured (or signaled) independently (or additionally) or a resource for retransmission of the 'skipped (or stopped) V2X message' may be selected additionally according to the following predefined (or signaled) (partial) rule (or criterion). In one example, (in the latter case) the corresponding resource selected additionally may be used temporarily (or limitedly) only for retransmission of a (previously) 'skipped (or stopped) V2X message'.

Example #2-3-1

It may be defined so that the V2X UE selects an additional (retransmission) resource by taking into account only the 'candidate resources' which enable retransmission of the 'skipped (or stopped) V2X message' to satisfy the '(SERVICE) LATENCY REQUIREMENT'. In another example, it is not retransmission of the 'skipped (or stopped) V2X message' but resource re-reservation (or selection) for transmission of a 'V2X message(s) (to be generated) afterwards' may be performed within a predefined (or signaled) 'TX RESOURCE (RE)SELECTION DURATION'. Here, a resource re-reserved (or selected) for this use may be excluded from candidate resources for retransmission of the 'skipped (or stopped) V2X message' (although the re-reserved (or selected) resource may satisfy the '(SERVICE) LATENCY REQUIREMENT' when retransmission of the 'skipped (or stopped) V2X message' is performed). In other words, the resource for transmission of a 'V2X message(s) (to be generated) afterwards' may be regarded as having a (relatively) higher priority than the resource for retransmission of the 'skipped (or stopped) V2X message' (or transmission of a 'V2X message(s) (to be generated) afterwards' may be interpreted to be performed through the (most) optimal resource which satisfies a predefined (re-reservation (or selection)) criterion (or rule)).

[Proposed Rule #3]

If one V2X message is transmitted 'Q' times (according to the proposed rule #1), the boundary of a time region in which a (resource (re)-reservation (or selection)-related) sensing operation is performed may be defined according to the following (partial) criterion (or rule). Here, the 'Q' value may be a positive integer larger than 1. In what follows, for the convenience of description, it is assumed that (one) V2X message is 'transmitted two times (for example, SF #(N+K1) and SF #(N+K1))'.

Example #3-1

(If it is not the case that (one) V2X message is transmitted (repeatedly) through multiple SFs and/or independent resource allocation is made on each SF) the first (or last) 'repeated transmission timing' (or 'SF') may be defined as the boundary of a time region in which a (resource (re)-reservation (or selection)-related) sensing operation is performed. As a specific example, if the first 'repeated transmission timing' (or 'SF') (for example, SF #(N+K1)) is designated as the boundary of a time region in which a sensing operation is performed, the V2X UE performs a sensing operation at the remaining (resource) time points except for the (resource) time point at which the V2X UE (actually) performs the V2X message TX operation on the "resource period ranging from SF #(N+K1–D) to SF #(N+K1) (or from SF #(N+K1–1–D) to SF #(N+K1–1)) (where "D" represents the predefined (or signaled) 'SENSING DURATION')" and subsequently (re)reserve (or select) a V2X message TX-related resource(s). In another example, if the last 'repeated transmission timing' (or 'SF') (for example, SF #(N+K2)) is designated as the boundary of a time region in which a sensing operation is performed, the V2X UE performs a sensing operation at the remaining (resource) time points except for the (resource) time point at which the V2X UE (actually) performs the V2X message TX operation on the "resource period ranging from SF #(N+K2–D) to SF #(N+K2) (or SF #(N+K2–1–D) to SF #(N+K2–1))" and subsequently (re)reserve (or select) a V2X message TX-related resource(s).

Example #3-2

If part of 'Q' repeated transmissions is skipped (or stopped) in an attempt to sense (or measure) a resource used (or reserved (or selected) previously), the first (or last) 'skipped (or stopped) transmission timing' (or 'SF') may be defined as the boundary of a time region in which a (resource (re)reservation (or selection)-related) sensing operation is performed.

Example #3-3 if one V2X message is transmitted 'Q' times, the following (partial) parameters may be defined (or managed) differently (or independently) for each transmission (or for each different 'REDUNDANCY VERSION (RV)' transmission) (or between the initial transmission and retransmission). Also, in another example, the following (partial) parameters may be defined (or managed) independently (or differently) according to different message 'sizes (or types)' and/or 'transmission (occurrence) periods' and/or 'priorities' (or according to whether predefined (or signaled) 'SECURITY information' is transmitted together with the parameters). As a specific example, a large value may be set to the 'SENSING DURATION' for a message having a low (or high) priority so that resource re-reservation (or selection) frequency is made low while a small value may be set to the 'SENSING DURATION' for a message having a high (or low) priority so that the resource re-reservation (or selection) frequency is made high.

Example #3-3-1

'SENSING DURATION' (and/or a 'probability related to performing resource re-reservation (or selection)' and/or a 'backoff value related to performing resource re-reservation (or selection)' and/or 'MAXIMUM RESERVATION TIME' and/or 'MUTING (or SILENCING or transmission skipping (or stopping)) probability (or period or pattern)'.

In a still another example, it may be defined so that a '(resource (re)reservation (or selection)-related) sensing operation' and/or 'resource re-reservation (or selection)' is performed through the following (partial) rules.

[Proposed Rule #4]

When the V2X UE performs a sensing operation on a resource used by the V2X UE (or previously reserved (or selected)) according to the "RANDOM MUTING (or SILENCING or transmission skipping (or stopping))" (or "predefined (or signaled) probability-based MUTING (or SILENCING or transmission skipping (or stopping))"), MUTING (or SILENCING) is not applied to all of the SF(s) used for (repeated) transmission of (one) V2X message (or all of the 'Q' repeated transmissions related to (one) V2X message are not skipped (or stopped)) but is applied to only part of the SFs (or repeated transmissions) (periodically) (or only part of the SFs is skipped (or stopped)) in an alternate fashion according to a predefined (or signaled) rule (or (hopping) pattern). Here, the corresponding (hopping) pattern may be randomized on the basis of an input parameter(s) such as the '(SOURCE) UE ID' (and/or 'period index of a pool (or resource) (with which the V2X message TX operation is performed)' and/or 'SA period index'). In a yet another example, when "(RANDOM) MUTING (or SILENCING or transmission skipping (or stopping))" is performed, the '(RANDOM) MUTING (or SILENCING or transmission skipping (or stopping)) probability (or period or pattern)' may be defined differently (or independently) between the initial transmission and retransmission. Here, this rule may be interpreted such that the '(RANDOM) MUTING (or SILENCING or transmission skipping (or stopping)) probability (or period or pattern)' is set differently (or independently) between 'RV 0' (initial transmission) and other 'RV' (retransmission) (or it may be interpreted such that the '(RANDOM) MUTING (or SILENCING or transmission skipping (or stopping)) probability (or period or pattern)' is set differently (or independently) for each 'RV'). As a specific example, it may be configured so that the "(RANDOM) MUTING (or SLICING or transmission skipping (or stopping))" is applied to the 'RV 0' (initial transmission) with a relatively smaller probability than to other 'RV' (retransmission).

[Proposed Rule #5]

if (one) V2X message is transmitted (repeatedly) through multiple SFs (or if one (V2X) message is transmitted 'Q' times), it may be configured so that not all of the SFs (or resources related to 'Q' repeated transmissions) are re-reserved (or selected) at once but only predefined (or signaled) 'T' SFs (or resources related to repeated transmission) are re-reserved (or selected) one by one according to a predefined (or signaled) rule (or (hopping) pattern). Here, the 'T' value may be set to '1'. Also, the corresponding (hopping) pattern may be randomized on the basis of an input parameter(s) such as the '(SOURCE) UE ID' (and/or period index of a pool (or resource) (with which the V2X message TX operation is performed)' and/or 'SA PERIOD index'). If the rule above is applied, the interference environment may be prevented from being influenced by an abrupt change due to re-reservation (or selection) of the (whole) resources.

As another example, if (semi-static) (re)reservation (or selection) of a resource(s) related to V2X message TX is performed and a "sensing operation" is performed through decoding of a predefined (or signaled) channel (for example, PSCCH (or Scheduling Assignment (SA))), 'DATA (or Physical Sidelink Shared Channel (PSSCH))' decoding operation may be performed according to the following (partial) rule.

[Proposed Rule #6]

Suppose the V2X UE succeeds SA (or PSCCH) decoding and resource reservation is set (or on). (A) if SA (or PSCCH) is received successfully at the next period, it suffices to perform DATA (or PSSCH) decoding according to the corresponding SA (or PSCCH) (which has been received successfully). (B) (On the other hand) if the V2X UE fails to receive SA (or PSCCH) at the next period, the V2X UE may be configured to attempt DATA (or PSSCH) decoding by reusing various kinds of predefined (or signaled) information (for example, RESOURCE ALLOCATION (RA), MODULATION AND CODING SCHEME (MCS), and RS SEQUENCE SETTING) of the existing (recently received) SA (or PSCCH) (or which has been received most recently).

[Proposed Rule #7]

If 'maximum time' is defined, which specifies the time period for which (re)reserved (or selected) resources may be maintained (for example, in the case where 'RESOURCE RESELECTION TIMER' is defined) or if how long the (re)reserved (or selected) resources are maintained is specified by the 'RESERVATION FIELD' of the PSCCH (or SA) (or on the PSSCH (or DATA)), an RX V2X UE (which has failed to receive SA (or PSCCH)) may be configured to attempt decoding of DATA (or PSSCH) by using the PSCCH (or SA) which has been received most recently during the corresponding period and to make the positions of the corresponding resources occupied (by other V2X UE) avoid 'RESOURCE (RE)ALLOCATION'.

In another example, if a better resource satisfying a predefined (or signaled) criterion (or rule) is found while the V2X UE already has a reserved (or selected) resource, the V2X UE may be made to 're-reserve (or select)' the resource used by the V2X UE (or previously reserved (or selected) resource). In an additional example, to sense (or measure) the resource currently reserved (by the V2X UE), the V2X UE, instead of performing 'MUTING (or SILENCING)', may move to a predefined (or signaled), different resource (or pool) for a while (and/or perform transmission of a V2X message (on the corresponding resource (or pool) to which the V2X UE has moved), which may be interpreted as a kind of 'V2X message TX W/O RESERVATION') and then to perform sensing (or measurement) (of the resource that the V2X UE has reserved), returning (back) to the original resource. Here, the 'time period' during which the V2X UE stays in other resource (or pool) may be predefined (or signaled). If the rule described above is applied, the 'MUTING (or SILENCING) operation' may be used to alleviate the situation where transmission of a V2X message is skipped (or stopped).

In a still another example, 'the boundary of a time region in which a specific V2X UE performs a sensing operation (related to resource (re)reservation (or selection))' may be a "PIVOT SF (or REFERENCE SF)" (SF #P) selected on the basis of a predefined (or signaled) rule. Here, when this rule is applied, the V2X UE performs a sensing operation on a resource period ranging from "SF #(P−Y1) to SF #(P+Y2) (here, 'Y1=FLOOR((D−1)/2)' and 'Y2=CEILING((D−Y1) 2)' (or 'Y1=CEILING((D−1)/2)' and 'Y2=FLOOR((D−Y1)/ 2)')) (or a resource period ranging from SF #(P−D) to SF #P or a resource period ranging from SF #(P−1−D) to SF #(P−1))" and (re)reserves (or selects) a V2X message TX-related resource(s) afterwards. Here, "D" represents predefined (or signaled) 'SENSING DURATION' and 'CEILING(X)' and 'FLOOR(X)' represent a 'function returning the minimum integer larger than or equal to X' and a 'function returning the maximum integer smaller than or equal to X', respectively. Here, the corresponding "PIVOT SF (or REFERENCE SF)" may be selected randomly (on the basis of an input parameter(s) such as '(SOURCE) UE ID' (and/or 'period index of a pool (or resource) period (in which a V2X message TX operation is performed)' and/or 'SA PERIOD index'). Also, the proposed rule may be applied limitedly only to the case where (initial) sensing operation is performed after power-up (of the V2X UE) and/or the case where transmission of a V2X message has never been performed (at all) at the previous time point (or within a (previous) period (or window) which lasts a predefined (or signaled) length of time).

In a yet another example, it is assumed that the V2X UE(s) performs 'SA (or PSCCH)' transmission related to the 'DATA (or PSSCH)' transmission associated with the 'SF #(N+D)' (for example, D≥C) in the 'SF #(N+C)'. Here, in one example, when 'POTENTIAL DATA (or PSSCH)' transmission related to other TB on the 'SF #(N+E)' is performed in the 'SF #(N+D)' (for example, D<E), the V2X UE may inform of the intent of whether to reuse a '(frequency) resource' (used for 'DATA (or PSSCH)' transmission on the 'SF #(N+D)') through a (predefined (or signaled)) channel (for example, SA (or PSCCH)'(SF #(N+C)') (or through 'DATA (or PSSCH)'). Here, for the convenience of description, the '(frequency) resource' indicated (or signaled) as being not 'intended' to be reused by the V2X UE #X (when 'POTENTIAL DATA (or PSSCH)' transmission related to other TB on the 'SF #(N+E)' is performed) is called a 'UN-BOOKING RESOURCE'. Here, when the V2X UE #Y performs a sensing operation based on 'ENERGY MEASUREMENT (and/or SA DECODING)', the '(frequency) resource' indicated as the 'UN-BOOKING RESOURCE' by the V2X UE #X exhibiting high energy (currently (for example, 'SF #(N+D)') or within a sensing period) may be assumed (or processed) according to the following (partial) rule (when the V2X UE performs resource selection (or reservation)). This is so because, the corresponding '(frequency) resource' indicated as the 'UN-BOOKING RESOURCE' by the V2X UE #X will not be selected (or reserved) by the V2X UE #Y due to high energy measured (currently (for example, 'SF #(N+D)') or within a sensing period) even though the corresponding '(frequency) resource' may not be used afterwards with a high probability (for a predetermined time period (including 'SF #(N+E)'). Here, the following rules may be extended to be applied when the V2X UE(s) informs (other V2X UE(s)) of the fact that the V2X UE(s) makes no further use of the resource reserved (or selected) previously (at the resource (re)selection (or reservation) period) (which is also called the 'UN-BOOKING RESOURCE') from since a particular time point, through a predefined (or signaled) channel (for example, 'SA (or PSCCH)' (or 'DATA (or PSSCH)')). Here, the following rules may be applied limitedly only when the V2X UE(s) performs a 'ENERGY MEASUREMENT ONLY'-based sensing operation or a 'COMBINATION OF ENERGY MEASUREMENT AND SA DECODING'-based sensing operation (for example, the rules may not be applied when a 'SA DECODING ONLY'-based sensing operation is performed).

[Proposed Rule #8]

The V2X UE regards (or assumes) the remainder obtained by subtracting the 'RSRP measurement value' (from the energy value measured on the corresponding '(frequency) resource') (or the remainder obtained by subtracting a predefined (or signaled) offset value) as the energy measurement value of a '(frequency) resource' designated as the 'UN-BOOKING RESOURCE' and performs 'RANKING' of energy measurement values for individual resources. Here, the corresponding 'RSRP measurement' may be performed on the basis of a reference signal (for example, 'DM-RS') on a predefined (or signaled) channel (for example, 'PSBCH (or 'PSCCH' or 'PSSCH'). Here, if 'FDM' is applied to the 'SA (or PSCCH)' and 'DATA (or PSSCH)', '(frequency) resource' (or 'SA (or PSCCH)' or 'DATA (or PSSCH)')-related final 'RSRP (measurement) value' may be finally derived (or assumed) (from the actually measured 'RSRP value') by compensating (or adding) a (predefined (or signaled)) 'MPR value' applied (differently) according to a separation distance (on the frequency region) between 'SA (or PSCCH) and 'DATA (or PSSCH)'.

[Proposed Rule #9]

The V2X UE may regards (or assume) a predefined (or signaled) value as the 'energy measurement value' or 'RANKING value' for a '(frequency) resource' designated as the 'UN-BOOKING RESOURCE'. Here, the 'RANKING' value for the '(frequency) resource' designated as the 'UN-BOOKING RESOURCE' may be set (or signaled) as the lowest rank (where, for example, the probability that the corresponding '(frequency) resource' is selected (or reserved) is low) (or as the highest rank (where, for example, the probability that the corresponding '(frequency) resource' is selected (or reserved) is high). In another example, the rule may be defined so that at the time of resource selection (or reservation), the '(frequency) resource' designated as the 'UN-BOOKING RESOURCE' is always excluded (or selected (in the first place)).

Meanwhile, the sensing operation of a V2X UE(s) may be performed as follows.

The proposed methods below describe an (effective) 'sensing method' for a V2X UE(s) to select a 'V2X message TX-related resource'. Here, if a 'sensing operation' is applied, different V2X UE(s) (within a close distance) selects a transmission resource at the same position and thereby alleviates a problem of exchanging interference with each other (when transmission is actually performed). The wording of 'sensing' may be interpreted as (A) an energy (or power) measurement operation and/or (B) a decoding operation for a predefined (or signaled) channel (for example, Physical Sidelink Control Channel (PSCCH)). Here, the 'energy (or power) measurement' may be expressed by (A) Received Signal Strength Indicator (RSSI) (for example, an average value of received power measured from symbols (to which the 'DM-RS' of a predefined (or signaled) antenna port is transmitted or to which data is transmitted) and/or (B) Reference Signal Received Power (RSRP) (for example, an average value of received power measured from Resource Elements (REs) to which the 'DM-RS' (of a predefined (or signaled) antenna port) is transmitted) and/or (C) a combination of 'RSSI' and 'RSRP' according to a predefined (or signaled) rule (or formula) (for example, a form similar to the Reference Signal Received Quality (RSRQ)).

In one example, to alleviate (A) the problem that 'TOPOLOGY' of a V2X UE(s) is changed, and 'sensing' information is made inaccurate and/or (B) the 'HALF DUPLEX' problem, (from a viewpoint of a 'single V2X UE') 'control (or scheduling) information' and 'data (associated with the corresponding control (or scheduling) information)' may be transmitted on the same subframe (SF) according to the Frequency Division Multiplexing (FDM) scheme.

Figure 15:
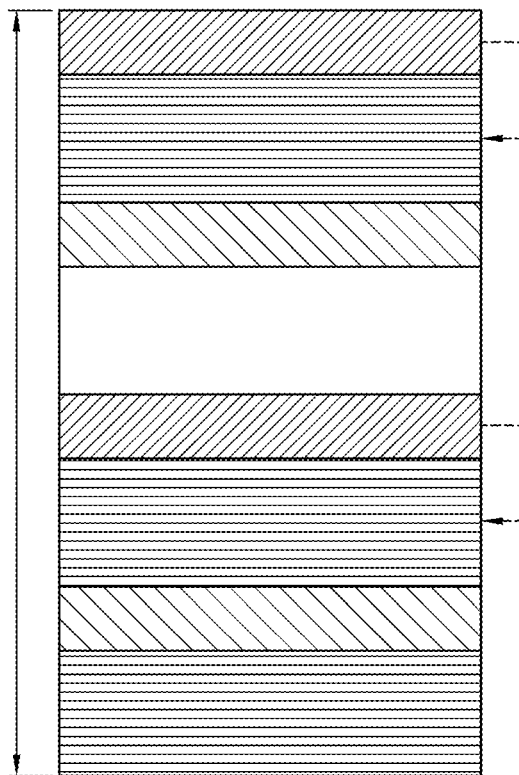
FIGS. 15 and 16 illustrate one example of a case in which (from a viewpoint of a 'single V2X UE') 'control (or scheduling) information' and 'data (associated with the corresponding control (or scheduling) information)' are transmitted on the same SF according to the Frequency Division Multiplexing (FDM) scheme.
Figure 16:
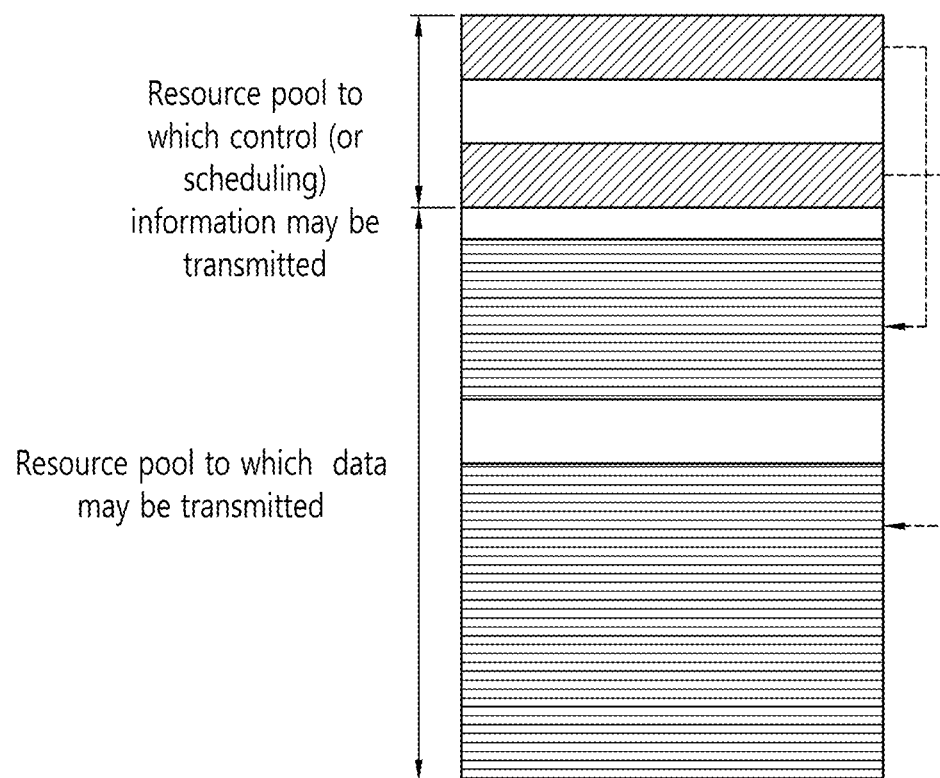

FIGS. 15 and 16 illustrate one example of a case in which (from a viewpoint of a 'single V2X UE') 'control (or scheduling) information' and 'data (associated with the corresponding control (or scheduling) information)' are transmitted on the same SF according to the Frequency Division Multiplexing (FDM) scheme.

FIGS. 15 and 16 illustrate a 'case in which control (or scheduling) information and associated data are transmitted on consecutive resource blocks (RBs)' and a 'case in which control (or scheduling) information and associated data are transmitted on inconsecutive resource blocks (RBs)'. In another example, when 'LINK BUDGET' of the 'control (or scheduling) information' is considered, (from a viewpoint of a 'single V2X UE') transmitting 'control (or scheduling) information' and 'data (associated with the corresponding control (or scheduling) information' on a different SF according to the Time Division Multiplexing (TDM) scheme may be considered.

Figure 17:
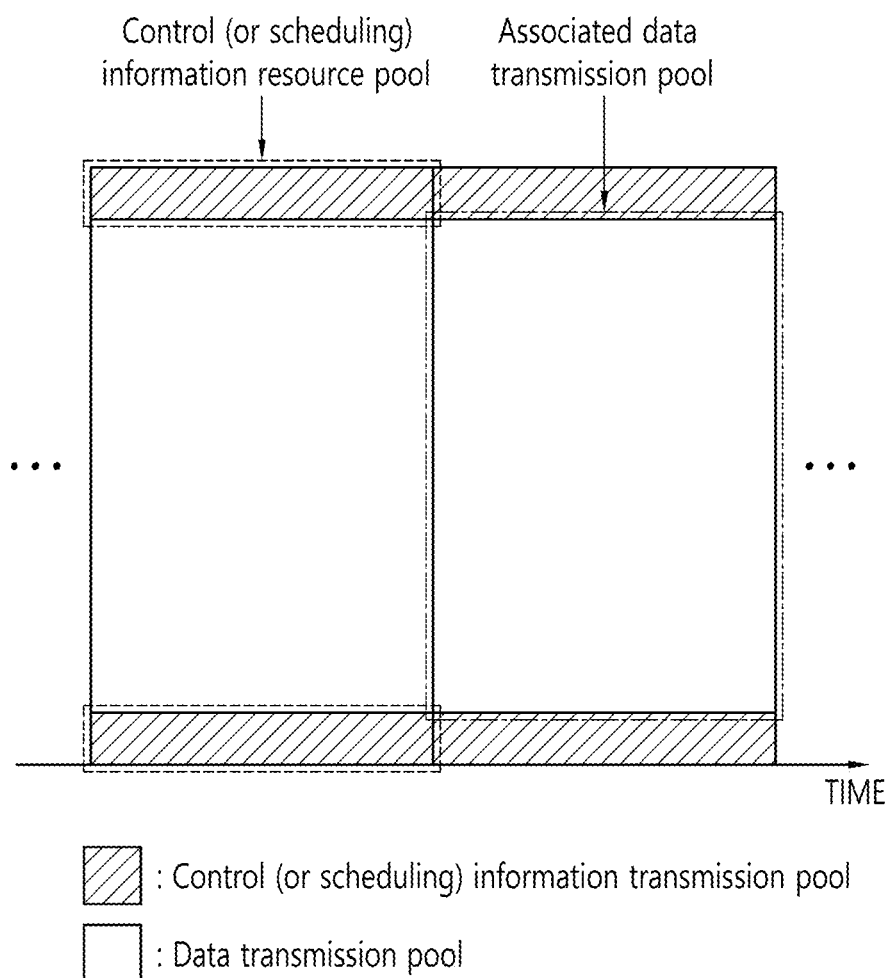
FIG. 17 illustrates one example of a case in which a 'control (or scheduling) information transmission pool' and a 'data transmission pool' are defined (or configured) according to the 'FDM' scheme (from a system point of view).

FIG. 17 illustrates one example of a case in which a 'control (or scheduling) information transmission pool' and a 'data transmission pool' are defined (or configured) according to the 'FDM' scheme (from a system point of view).

In one example, (from a system point of view) a 'control (or scheduling) information transmission pool' and a 'data transmission pool' may be defined (or configured) according to the 'FDM' scheme (A) to satisfy the 'LATENCY REQUIREMENT' of a 'V2X SERVICE' (in an efficient manner) and/or (B) to disperse 'transmission of control (or scheduling) information' on the time domain. FIG. 17 illustrates one example of the aforementioned case. Here, it is assumed that the 'data transmission pool' associated with a specific 'control (or scheduling) information transmission pool' is operated according to the 'TDM' scheme.

Meanwhile, although a UE performs sensing in (each) sub-channel (by default), actual transmission of a V2X message may be performed in units of a plurality of sub-channels. If the UE uses a plurality of sub-channels used for actual transmission of a V2X message (namely, if transmission of a V2X message is performed in units of a plurality of sub-channels), how to perform sensing needs to be taken into account. In this respect, in what follows, described will be a method for performing sensing when a plurality of sub-channels is used for transmission of a V2X message.

[Proposed Method]

In one example, a rule may be defined so that a V2X UE(s) performs a sensing operation in 'units of resource size' to be used (by the V2X UE itself) for 'V2X message TX'. When the corresponding rule is applied, the 'sensing resource unit size' of the V2X UE becomes the same as the 'resource size' to be used (by the corresponding V2X UE) for 'V2X message TX'. For example, when the UE performs energy measurement through a sensing operation, in which unit or size to perform the energy measurement may have to be considered. At this time, the proposed method according to the present invention may set the resource unit or size used by the UE for data transmission, for example, a sub-channel size, as the unit or size of energy measurement. For example, when the UE performs V2X message transmission with a specific sub-channel size, energy measurement for a sensing operation may be performed in units of resources with the specific sub-channel size. In what follows, the proposed method will be described with reference to related drawings.

Figure 18:
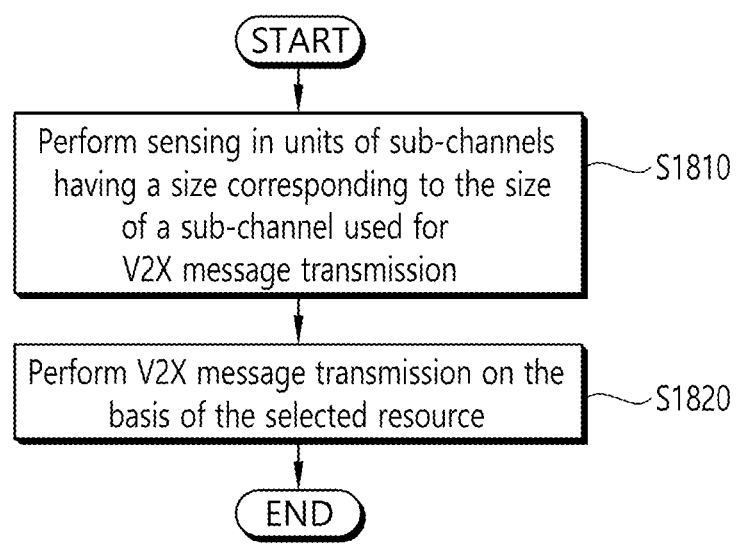
FIG. 18 is a flow diagram illustrating a method for performing sensing when multiple sub-channels are used for transmission of a V2X message according to one embodiment of the present invention.

FIG. 18 is a flow diagram illustrating a method for performing sensing when multiple sub-channels are used for transmission of a V2X message according to one embodiment of the present invention.

According to FIG. 18, the UE performs sensing in units of sub-channel the size of which is equal to the size of a sub-channel used for transmission of a V2X message, thereby selecting a resource with which to perform transmission of a V2X message S1810. At this time, the UE may select the resource by configuring a selection window within a range satisfying the latency requirement, transmission of the V2X message is performed in units of multiple sub-channels, and a resource with which to perform the V2X communication may be selected on the basis of the sensing performed in units of sub-channel the size of which is equal to the size of the plurality of sub-channels. The size of a sensing region used when the sensing is performed may be equal to the size of the plurality of sub-channels. Moreover, the UE may perform sensing by using an energy measurement average value of sub-channels belonging to the plurality of sub-channels.

To summarize, when V2X communication is performed in units of multiple sub-channels, the UE may not only perform sensing in units of multiple sub-channels but also select the resource by configuring a selection window within a range that satisfies the latency requirement. Here, an example of selecting the resource by configuring a selection window within a range that satisfies the latency requirement is the same as described above.

In what follows, described will be an example in which a UE performs sensing in units of multiple sub-channels when transmission of a V2X message is performed in units of multiple sub-channels.

The UE may perform sensing in units of sub-channel the size of which is equal to the size of a sub-channel used for transmission of a V2X message and select a resource with which to perform transmission of a V2X message on the basis of the sensing result. In other words, sensing (for example, ENERGY MEASUREMENT) may be performed with a sub-channel size of data to be transmitted by the UE.

When sensing (for example, ENERGY MEASUREMENT) is performed with the sub-channel size of data to be transmitted by the UE, a linear average value of sub-channels may be used. More specifically, with respect to the remaining candidate single subframe resources $R_{x,y}$ in the set $S_A$ (which is a set of all of the candidate single subframe resources), a sensing region (for example, metric $E_{x,y}$) may be defined as a linear average of S-RSSI measured at sub-channels x+k. Here, k is defined as 0, $L_{subCH}-1$, where $L_{subCH}$ may represent the number of sub-channels required for sending actual packets. For the convenience of understanding, the present operation may be described as follows with reference to related drawings.

Figure 19:
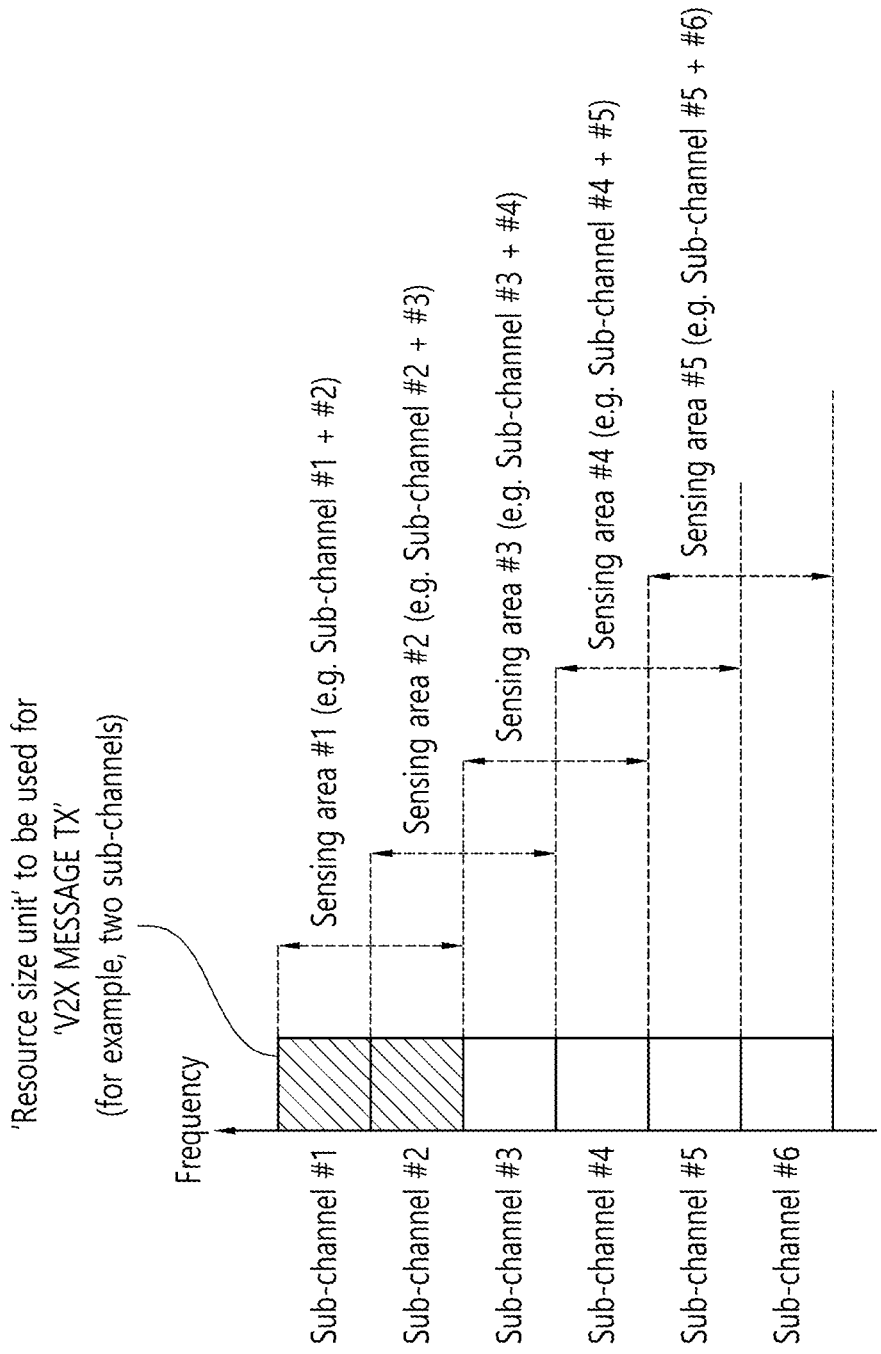
FIG. 19 illustrates one example in which ENERGY MEASUREMENT (namely sensing) is performed with a sub-channel size of data to be transmitted by the UE.

FIG. 19 illustrates one example in which ENERGY MEASUREMENT (namely sensing) is performed with a sub-channel size of data to be transmitted by the UE. FIG. 19 assumes that the sub-channel size of a V2X message (for example, V2X data) to be transmitted by the UE is 2 (namely $L_{subCH}=2$).

In the example of FIG. 19, ENERGY MEASUREMENT may be performed in units of two sub-channels corresponding to the sub-channel size of data transmitted by the UE. First, the UE may determine a sensing value with respect to the sensing region #1 by using the average of energy sensing values with respect to the sensing region #1, namely sub-channel #1 and sub-channel #2. Moreover, the UE may determine a sensing value with respect to the sensing region #2 by using the average of energy sensing values with respect to the sensing region #2, namely sub-channel #2 and sub-channel #3. In the same way, the UE may determine a sensing value with respect to the sensing region #3 by using the average of energy sensing values with respect to the sensing region #3, namely sub-channel #3 and sub-channel #4.

Although FIG. 19 assumes that the sub-channel size of data to be transmitted by the UE is 2, the sub-channel size of data to be transmitted by the UE may have a value of 3 or more. Although not shown in a separate figure, if the sub-channel size of data to be transmitted by the UE is 3, the UE may determine the sensing value with respect to a sensing region by using the average of energy sensing values in the sub-channel #1 to sub-channel #3.

Referring again to FIG. 18, the UE may transmit a V2X message by using the selected resource S1820. As described above (or below), the UE may select a subframe within a selection window on the basis of a sensing result obtained by performing sensing during a UE-specific sensing period, determine transmission reservation resources on the basis of a selected subframe, and perform V2X communication on the reserved resource. Since a specific example in which a UE performs V2X communication on the basis of a selected resource is the same as described above (or below), detailed descriptions thereof will be omitted.

Figure 20:
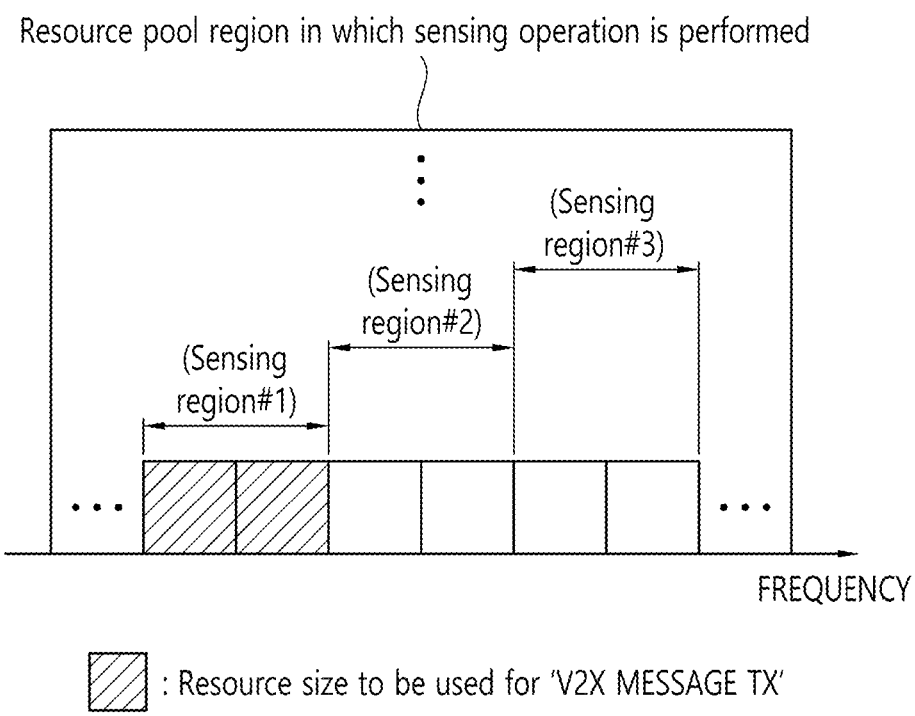
FIGS. 20 and 21 illustrate one example of 'PARTIALLY OVERLAPPED REGION BASED SENSING' (or 'SLIDING WINDOW BASED SENSING').
Figure 21:
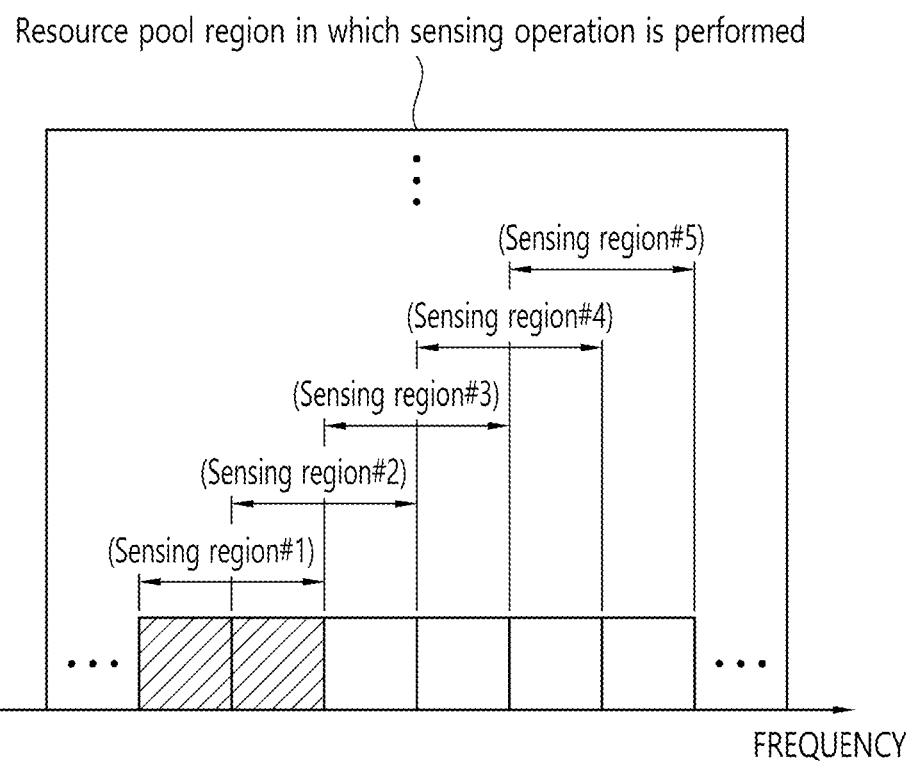

FIGS. 20 and 21 illustrate one example of 'PARTIALLY OVERLAPPED REGION BASED SENSING' (or 'SLIDING WINDOW BASED SENSING').

In one example, a sensing operation may be implemented in the form of (A) 'NON-OVERLAPPED REGION BASED SENSING' (see FIG. 20) and/or (B) 'PARTIALLY OVERLAPPED REGION BASED SENSING' (or 'SLIDING WINDOW BASED SENSING') (see FIG. 21). When the former rule ('(A)') is applied, sensing regions in which a sensing operation is performed (continuously) do not overlap with each other (for example, it may be seen from FIG. 20 that '(sensing region #1)', '(sensing region #2)', and '(sensing region #3)' are not overlapped). (On the other hand) when the latter rule ('(B)') is applied, for example, sensing regions in which a sensing operation is performed (continuously) overlap with each other by a predefined (or signaled) 'ratio' (or 'amount of resources (or size)') (for example, FIG. 21 shows that '(sensing region #1) and (sensing region #2)', '(sensing region #2) and (sensing region #3)', '(sensing region #3) and (sensing region #4)', and '(sensing region #4) and (sensing region #5)' are overlapped with each other by a predefined (or signaled) 'ratio' (or 'amount of resources (or size)'). In one example, the former rule ('(A)') may reduce the 'complexity in performing a sensing operation' compared with the latter rule ('(B)'). In other words, compared with the latter rule ('(B)'), 'the total number of sensing' required for a resource pool of the same size may be relatively small when the former rule ('(A)') is employed. On the other hand, when the latter rule ('(B)') is employed, (although 'the total number of sensing' required for a resource pool of the same size may be larger than that when the former rule ('(A)') is employed,) the 'position of an available resource candidate'-related to 'V2X message TX' may be searched (or selected) in a relatively efficient (or outright) manner.

As another example, the V2X UE may be made to perform a sensing operation (first) with a predefined (or signaled) 'resource unit (size)' (for example, '1 RB'), and a '(weighted) average value' (or 'SUM') of a plurality of sensing (or measurement) values corresponding to the 'resource size (or unit)' to be used for 'V2X message TX' (or the maximum value (or minimum value or median value) among a plurality of sensing (or measurement) values) may be regarded (or assumed) as a representative sensing (or measurement) value for each 'resource size (or unit)' (to be used for 'V2X message TX').

As a still another example, when the V2X UE(s) performs '(V2X) channel or signal transmission (for example, 'MULTI-CLUSTER TX' (or 'DVRB TX')) by using (a plurality of) resources at 'discontinuous positions' on the 'frequency (resource) region', the V2X UE(s) may be made to perform a sensing (or measurement) operation with a predefined (or signaled) 'sensing resource unit (or size)' (for example, in units of K RBs) (or perform 'NON-OVERLAPPED REGION BASED SENSING' or 'PARTIALLY OVERLAPPED REGION BASED SENSING' (or 'SLIDING WINDOW BASED SENSING') in units of RESOURCE BLOCK GROUPs (RBGs)), and to (finally) select 'V2X message TX'-related resources (among resources of which the (energy) measurement is smaller (or larger) than a predefined (or signaled) threshold value).

In another example, it is assumed that, to transmit a '(SINGLE) V2X TB (or message)', the V2X UE(s) performs 'K' repeated transmissions (for example, the 'K' value includes (both of) the number of 'initial transmissions' and the number of 'retransmissions'). Here, for the convenience of description, 'K' value is set to '4'. Now let's assume that 'SA (or PSCCH)' transmission is performed in the 'SF #(N+C)', and associated (four) 'DATA (or PSSCH)' transmissions are performed in the 'SF #(N+D)', 'SF #(N+D+K1)', 'SF #(N+D+K2)', and 'SF #(N+D+K3)', respectively (for example, C≤D, 0<K1<K2<K3). Here, a field for informing of 'positions of time resources' related to (A) 'K' or (B) '(K−1)' repeated transmissions may be defined on the 'SA (or PSCCH)' ('SF #(N+C)'), and to this end, the following (partial) rules may be applied. In the latter case ('(B)'), the corresponding field may be interpreted to inform of the 'time resource positions' related to the 'remaining ('(K−1)') transmissions except for the 'initial (or first) transmission' and/or the 'initial (or first) transmission' is interpreted to be performed (always) at the same time resource (position) as the 'SA (or PSCCH)' ('SF #(N+C)') and/or the 'time resource position' related to the 'initial (or first) transmission' is signaled to (other) field which informs of the interval between the transmission time of 'SA (or PSCCH)' ('SF #(N+C)') and the 'initial (or first) transmission' time.

Example #A

The 'time resource position' related to the 'initial (or first) transmission' is signaled to (other) 'FIELD #F' which informs of the interval between the (predefined) 'SA (or PSCCH)' ('SF #(N+C)') transmission time and the 'initial (or first)' time ('SF #(N+D)'), and the 'time resource positions' related to the 'remaining ('(K−1)') transmissions' (for example, 'SF #(N+D+K1)', 'SF #(N+D+K2)', and 'SF #(N+D+K3)') may be signaled to a (new) 'FIELD #S' having the same size as the maximum interval (MAX_GAP) between the predefined (or signaled) 'first transmission' ('SF #(N+D)') time and the 'K-th transmission' ('SF #(N+D+K3)') time. Here, the 'FIELD #S' may be implemented in the form of a 'bitmap'. The 'FIELD #S' related 'bitmap' may be applied by using the 'initial (or first) (DATA (or PSSCH)) transmission' ('SF #(N+D)') time as a reference (or start point). If the 'MAX_GAP' is set (or signaled) to '10', the 'FIELD #S' is signaled (or set) to '10', and the 'FIELD #S' is signaled (or set) to '0100100100', the 'second transmission', 'third transmission', and 'fourth transmission' are performed on the 'SF #(N+D+2)', 'SF #(N+D+5)', and 'SF #(N+D+8)', respectively. As another example, the 'time resource positions' related to 'K' repeated transmissions (for example, 'SF #(N+D)', 'SF #(N+D+K1)', 'SF #(N+D+K2)', and 'SF #(N+D+K3)' may be signaled to a (new) 'FIELD #Q' having the same size as the maximum interval (MAX_TVAL) between the predefined (or signaled) 'SA (or PSCCH)' ('SF #(N+C)') transmission time and the 'K-th transmission' ('SF #(N+D+K3)') time. Here, the 'FIELD #Q' may be implemented in the form of a 'bitmap'. The 'FIELD #Q' related 'bitmap' may be applied by using the 'SA (or PSCCH)' ('SF #(N+C)') time as a reference (or start point). If the 'MAX_TVAL' is set (or signaled) to '10', and the 'FIELD #Q' is signaled (or set) to '1100100100', the 'first transmission', 'second transmission', 'third transmission', and 'fourth transmission' are performed on the 'SF #(N+C+1)', 'SF #(N+C+2)', 'SF #(N+C+5)', and 'SF #(N+C+8)', respectively. In the corresponding example, if the 'FIELD #F' is defined on the 'SA (or PSCCH)' ('SF #(N+C)'), the 'FIELD #F' value may be set to 1. As another example, due to V2X communication-related 'CONGESTION (or LOAD or MEASUREMENT) CONTROL, the 'pattern (form or number of items)' (or '(maximum (or minimum)) value (or length)') that the 'FIELD #S' (or 'FIELD #Q' (or 'FIELD #F')) may have or 'the number of (maximum (or minimum)) bits that may be set to '1' (on the bitmap)' may be limited. Here, the corresponding (limited) information may be determined by the V2X UE(s) after examining the 'CONGESTION (or LOAD or MEASUREMENT)' situation (according to a predefined (or signaled) rule (or criterion)) or set (or signaled) by a (serving) base station (on the basis of the 'CONGESTION (or LOAD or MEASUREMENT)' information reported by the V2X UE(s) or measured by the (serving) base station. Here, due to the V2X communication-related 'CONGESTION (or LOAD or MEASUREMENT)', the 'MAX_GAP' (or the 'maximum (or minimum) value (or length)' that 'MAX_TVAL' may have) may (also) be limited.

Example #B

The 'time resource positions' related to 'K' repeated transmissions (for example, 'SF #(N+D)', 'SF #(N+D+K1)', 'SF #(N+D+K2)', and 'SF #(N+D+K3)') may be signaled to 'K' 'FIELD #F's defined on the 'SA (or PSCCH)' ('SF #(N+C)') ('(Example #A)') (for example, the '(X-th) FIELD #F' informs of the interval (in the time region) between the 'SA (or PSCCH)' ('SF #(N+C)') transmission time and 'X-th transmission' time).

Example #C (In a situation where the (partial) rules (for example, (Example #A) and (Example #B)) are applied) if 'SA (or PSCCH)' transmission is performed each time 'DATA (or PSSCH)' is transmitted ('K' times (for example, 'SF #(N+D)', 'SF #(N+D+K1)', 'SF #(N+D+K2)', and 'SF #(N+D+K3)'), the following (partial) rule may be applied. Here, the following (partial) rules may be applied limitedly only to the case where '(DATA (or PSSCH)) FREQUENCY HOPPING' is performed.

Example #1

'SF PATTERN' information (or field) on the 'SA (or PSCCH)' ('SF #(N+C)') related to the 'initial (or first) transmission' ('SF #(N+D)') and/or 'frequency resource (position)' information (or field) and/or part of the 'MCS' information (or field) may also be transmitted on the 'remaining ('(K−1)') transmission'-related 'SA (or PSCCH)' in the same manner. To distinguish the aforementioned operation, if one 'TB' is transmitted from multiple SFs, 'COUNTER' information indicating the corresponding ((DATA (or PSSCH) transmission) SF (or information (or field) about to which transmission the 'DATA (or PSCCH) transmission' corresponds or 'RV' information (or field) related to 'DATA (or PSCCH) transmission') may be included in the 'SA (or PSCCH)' which schedules (DATA (or PSSCH)) transmission on each SF. Here, the 'initial (or first) transmission' ('SF #(N+D)')-related 'SA (or PSCCH)' ('SF #(N+C)') may define (at least) 'initial (or first) transmission' related 'frequency resource (position)' information (or field) and/or 'MCS' information (or field) and/or (the aforementioned) 'FIELD #S' (or 'FIELD #Q') (or 'SF PATTERN' information (or field)) and/or 'FIELD #F' (which, for example, may be (further) interpreted as a field informing of the interval between the 'X-th transmission' related 'SA (or PSCCH)' transmission time and the 'X-th transmission' time) and/or information (or field) about which transmission is the '(corresponding) DATA (or PSCCH) transmission' (or '(corresponding) DATA (or PSCCH) transmission' related 'RV' information (or field)) (and/or information (or field) about whether '(DATA (or PSSCH)) FREQUENCY HOPPING' has been applied). If the corresponding rule is applied, 'frequency resource (position)' information related to the 'remaining (K−1) transmissions' may not be (directly) transmitted (or signaled) on a related 'SA (or PSCCH)' and/or 'FIELD #F' values are set to the interval between the 'initial (or first) transmission' related 'SA (or PSCCH)' transmission time and the 'initial (or first) transmission' time; however, even if the V2X UE(s) fails to receive (or decode) 'previous transmission'-related 'SA (or PSCCH)', once the V2X UE(s) succeeds to received (or decode) 'subsequent transmission'-related 'SA (or PSCCH)', the corresponding 'subsequent transmission' related 'frequency resource (position) information' may be found (or derived) (in the form of backtracking) by combining (A) '(DATA (or PSSCH)) FREQUENCY HOPPING pattern' information and/or (B) 'initial (or first) transmission' related 'frequency resource (position)' information on the 'subsequent transmission'-related 'SA (or PSCCH)' and/or (C) 'FIELD #S' (or 'FIELD #Q') information (or 'SF PATTERN' information) and/or information about which transmission is the 'DATA (or PSCCH) transmission' (or 'DATA (or PSCCH) transmission'-related 'RV' information). Here, the 'subsequent transmission' related 'time resource (position) information' may be figured out (or derived) through the 'FIELD #F' on the 'subsequent transmission'-related 'SA (or PSCCH)'. Here, when the proposed rule is applied, (in particular, when the '(DATA (or PSSCH)) FREQUENCY HOPPING' operation is applied) a V2X UE(s) which has succeeded to receive (or decode) the 'initial (or first) transmission'-related 'SA (or PSCCH)' may not attempt to decode (or receive) (part of) the 'remaining ('(K−1)') transmission'-related 'SA (or PSCCH)'. As another example, (from the proposed rule) 'FIELD #F' (which, for example, may be interpreted as 'TIMING GAP' between the 'SA (or PSCCH)' transmission time and the 'associated DATA (or PSSCH)' transmission time) (or a field informing of the 'intent' of whether to reuse '(frequency) resource' employed for previous 'DATA (or PSSCH)' transmission when other 'TB' related 'POTENTIAL DATA (or PSSCH)' transmission is performed afterwards (at particular time)) may be defined (or signaled) independently at each 'SA (or PSCCH)' transmission (or in the same manner (for all 'SA (or PSCCH)' transmission)). Here, when the corresponding rule is applied, the V2X UE(s) may be made to attempt to decode (or receive) (all of the 'K' transmissions) with respect to the 'K' transmission-related 'SA (or PSCCH)'. In a yet another example, (from the proposed rule) (when one 'TB' is transmitted from multiple SFs) a V2X TX UE may perform 'RESOURCE RESELCTION' operation (in the middle of operation) according to a predefined (or signaled) rule (which includes, for example, a case where 'SA (or PSCCH)' (or 'DATA (or PSSCH)') having a 'HIGHER PRIORITY' transmitted by other V2X UE(s) is detected and a case where 'CURRENT RESOURCE ALLOCATION' does not satisfy the predefined (or signaled) 'REQUIREMENT' (for example, LATENCY, RELIABILITY, PRIORITY, FAIRNESS, and QoS)). Therefore, the V2X RX UE may be made to follow the 'subsequent SA (PSSCH)' when (the corresponding 'TB' related) 'subsequent SA (or PSSCH)' performs scheduling different from the 'previous SA (or PSCCH)'.

Example #2

(In the (Example #1)) when 'SA (or PSCCH)' related to the 'X-th transmission' (for example, 'X>1') is transmitted, 'FIELD #S' (or 'FIELD #Q') may be configured by regarding the corresponding 'X-th transmission' as if the 'initial (or first) transmission'. In another example, when 'frequency resource (position)' information (or field) is defined on the 'SA (or PSCCH)' and '(DATA (or PSSCH)) FREQUENCY HOPPING' operation is performed, the 'frequency resource (position)' information (or field) value itself may be set differently for each 'SA (or PSCCH)' transmission (by taking into account the '(DATA (or PSSCH)) FREQUENCY HOPPING pattern'). This is so because, after '(DATA (or PSSCH)) FREQUENCY HOPPING' is applied to the 'frequency resource (position)' scheduled by the 'N-th transmission'-related 'SA (or PSCCH)', the '(N+1)-th transmission'-related 'SA (or PSCCH)' has to designate (or signal) the (corresponding) changed 'frequency resource (position)'.

In a yet another example, the V2X UE(s) may be made to reselect a (transmission) resource reserved (or selected) by the V2X UE(s) (during a predetermined period of time (or repetition period)) each time a predefined (or signaled) condition is met. Here, the V2X UE(s) may be made to select a COUNTER value from a predefined (or signaled) range ("C_RANGE") and if the corresponding counter becomes '0' (or a value smaller than '0'), to reselect the (transmission) resource reserved (or selected) by the V2X UE(s) (during a predetermined period of time (or repetition period)). Here, the corresponding counter may be (A) reduced (or increased) to a predefined (or signaled) value (for example, '1') for each (new) TB transmission (for example, 'TB transmission' may be interpreted to indicate only 'actually (successfully) performed TB transmission' and/or (due to a 'sensing result' and/or 'collision with transmission of a message (of other V2X UE(s)) having a relatively high priority) the 'TB transmission' may be interpreted to include 'skipped TB transmission') or (B) reduced (or increased) to a predefined (or signaled) value (for example, '1') every predefined (or signaled) (period) values (for example, '100 ms'). Here, an operation of (re)selecting a counter value from a predefined (or signaled) range (or an operation 'RESETTING' the counter value) may be defined as a case in which '(ALL) SEMI-PERSISTENTLY SELECTED RESOURCE(S)'-related '(RESOURCE(S)) RESELECTION' has been triggered. Here, the 'C_RANGE' value may be set (or assumed) (partly) differently according to the following (partial) parameters. The 'C_RANGE' value (according to the range of a (specific) parameter) may be predefined or signaled from the network.

Example #1

'V2X UE VELOCITY'. In the case of fast 'V2X UE VELOCITY' (which is relatively fast or faster than a predefined (or signaled) threshold value), a (relatively) long (or short) 'C_RANGE' value may be applied.

Example #2

'(TRANSMISSION) SYNCHRONIZATION REFERENCE TYPE' (for example, 'eNB', 'GNSS', 'UE'). Here, when '(TRANSMISSION) SYNCHRONIZATION REFERENCE TYPE' is GNSS (or eNB or UE), a (relatively) long (or short) 'C_RANGE' value may be applied. (The 'C_RANGE' value is (relatively) long (or short) compared with the case in which '(TRANSMISSION) SYNCHRONIZATION REFERENCE TYPE' is eNB (or UE or GNSS).)

Example #3

'V2X MESSAGE TRANSMISSION (and/or GENERATION) PERIODICITY'. In the case of long 'V2X MESSAGE TRANSMISSION (and/or GENERATION) PERIODICITY' (which is relatively long or longer than a predefined (or signaled) threshold value), a (relatively) long (or short) 'C_RANGE' value may be applied.

Example #4

'V2X MESSAGE (and/or SERVICE) TYPE' (for example, 'EVENT-TRIGGERED MESSAGE', 'PERIODIC MESSAGE' (or a 'message with (relatively) small LATENCY REQUIREMENT (and/or (relatively) high reliability (or QoS) REQUIREMENT and/or (relatively) high priority'), 'a message with (relatively) long LATENCY REQUIREMENT (and/or (relatively) low reliability (or QoS) REQUIREMENT and/or (relatively) low priority'). Here, in the case of 'EVENT-TRIGGERED MESSAGE', a (relatively) long (or short) 'C_RANGE' value may be applied. (The 'C_RANGE' value is (relatively) long (or short) compared with the case of 'PERIODIC MESSAGE'.)

Example #5

'V2X MESSAGE (and/or SERVICE) PRIORITY (and/or LATENCY REQUIREMENT and/or RELIABILITY REQUIREMENT and/or QoS REQUIREMENT)'. Here, in the case of (relatively) low 'V2X MESSAGE (and/or SERVICE) PRIORITY (and/or LATENCY REQUIREMENT and/or RELIABILITY REQUIREMENT and/or QoS REQUIREMENT)', a (relatively) long (or short) 'C_RANGE' value may be applied.

In another example, a V2X TX UE(s) may be made to perform a (V2X message) transmission resource (re)reservation (or selection) operation according to the following (all or part of) rules. The (corresponding) transmission resource (re)reservation (or selection) operation may be (at least) triggered when the (transmission resource (re)reservation) counter value (SEL_CNTVAL) selected randomly within a predefined (or signaled) range (for example, "5-15") by the V2X TX UE(s) becomes "0" (and/or a "negative integer value"). In one example, after it is regarded (or assumed) that for each (actual) transmission of a Transport Block (TB) (or packet) (and/or irrespective of (actual) TB (or packet) transmission), as many transmission resources (having a resource reservation (interval) period "P") as the (selected) counter value (and/or the value derived from the (selected) counter value) have been reserved (or selected), the (selected) counter value may be made to be reduced by a predefined (or signaled) value (for example, "1") each time the corresponding reserved (or selected) transmission resource is passed (on the time region) and/or if a TB (or packet) (to be transmitted or generated (or received)) on a (LOW LAYER) buffer (and/or PDCP LAYER) exists (and/or does not exist). In the present invention, the term "(re)reservation (or selection)" may be (generally) interpreted as (A) re-reserving (or selecting) a transmission resource (different from (or the same as) the existing resource) on the basis of a sensing result when the V2X TX UE(s) determines not to maintain (or reuse) a (transmission) resource selected previously on the basis of a (predefined (or signaled)) probability value (KEEP_P) (for example, the "aforementioned STEP 3") (for example, it is assumed that a previously selected (transmission) resource is maintained only when a value selected randomly between 0 and 1 is less than or equal to the KEEP_P) (or irrespective of the corresponding probability value (KEEP_P)) and/or (B) the V2X TX UE(s)'s maintaining (or reusing) a (transmission) resource selected previously on the basis of a (predefined (or signaled)) probability value (KEEP_P) (or irrespective of the corresponding probability value (KEEP_P)) and/or (C) reserving (or selecting) (again) a finite number (or a predefined (or signaled) (other) number (which, for example, is interpreted to be larger than (or larger than or equal to) SEL_CNTVAL value (and/or a value derived from the SEL_CNTVAL value)) of subframes which are the same as existing subframes (or the same resources (as the existing ones)). If the '(re)reservation (or selection)' operation is performed (in general), the (transmission resource (re)reservation) counter value may be made to be selected (randomly) (or (instead of newly (randomly) selecting the counter value), the (transmission resource (re)reservation) counter value may use (or maintain or apply) an existing value (SEL_CNTVAL) (or the remaining value (or a predefined (or signaled) (other) value)).

Example #1

When the V2X TX UE(s) performs transmission resource (re)reservation (or selection), after the V2X TX UE(s) (first) reserves (or selects) an infinite number of subframes (or resources) (having a resource reservation (interval) period "P"), the V2X TX UE(s) may be made to use the (corresponding) reserved (or selected) resources until the transmission resource (re)reservation (or selection) operation is triggered. However, if the corresponding rule is applied, a "SYSTEM FRAME NUMBER (SFN) WRAP AROUND" problem may occur.

In what follows, for the convenience of understanding, a situation in which the "SYSTEM FRAME NUMBER (SFN) WRAP AROUND" problem occurs will be described with reference to related drawings.

Figure 22:
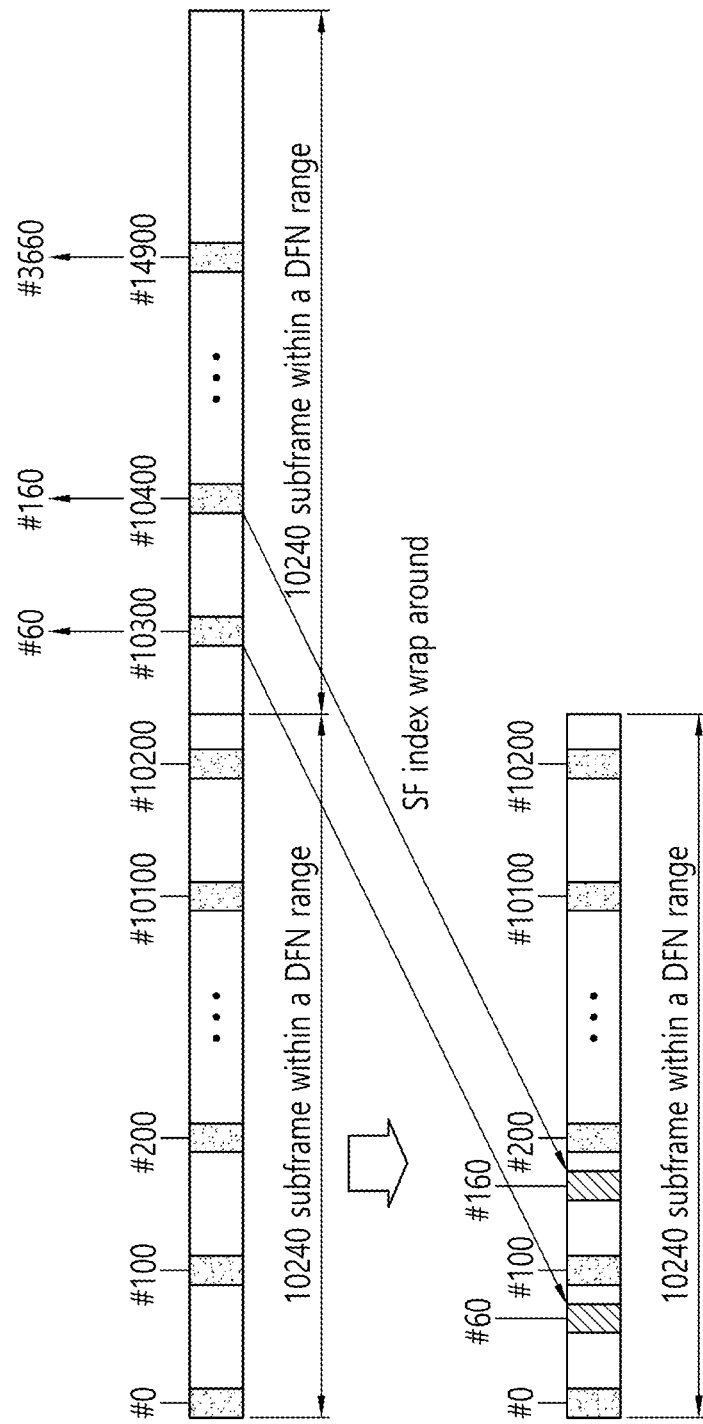
FIG. 22 illustrates a situation in which the "SYSTEM FRAME NUMBER (SFN) WRAP AROUND" problem occurs.

FIG. 22 illustrates a situation in which the "SYSTEM FRAME NUMBER (SFN) WRAP AROUND" problem occurs.

FIG. 22 assumes that a V2X TX UE #X attempts to perform transmission resource (re)reservation (or selection) with a resource reservation (interval) period of "100 ms" at SUBFRAME #0 time point. It is further assumed that all of 1024 subframes are set (or signaled) as a V2X resource (pool). In this case, when the V2X TX UE #X needs to select SUBFRAME #0, SUBFRAME #100, SUBFRAME #10200, and SUBFRAME #10300, the V2X TX UE #X selects SUBFRAME #60 (due to the constraint on the SFN). As a result, when the V2X TX UE #X finishes selecting (all of) the subframes, a second transmission opportunity comes before the SUBFRAME #100.

Meanwhile, to solve the corresponding problem, the V2X TX UE(s) may be made to (first) reserve (or select) a finite number (FINI_SFNUM) of subframes (or resources) (having a resource reservation (interval) period "P") when transmission resource (re)reservation (or selection) is performed. In what follows, an example in which a UE reserves a finite number of resources (namely 10*SL_RESOURCE_RESELECTION_COUNTER) according to a predefined rule will be described with reference to related drawings.

Figure 23:
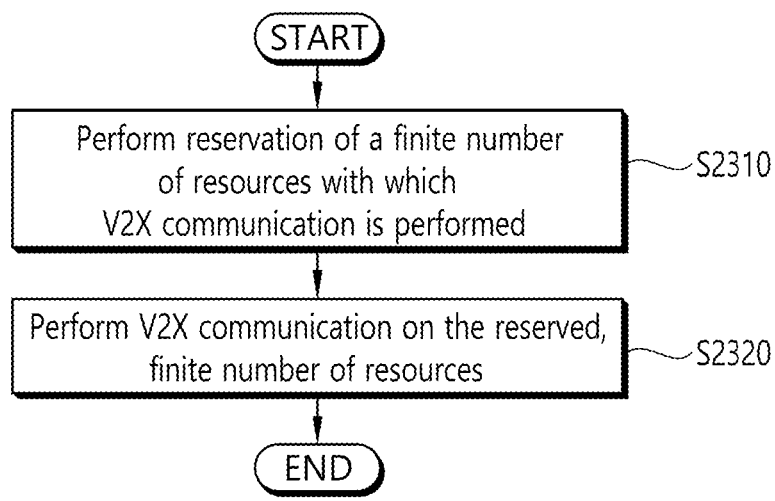
FIG. 23 is a flow diagram illustrating a method for reserving a finite number of resources according to one embodiment of the present invention.

FIG. 23 is a flow diagram illustrating a method for reserving a finite number of resources according to one embodiment of the present invention.

Referring to FIG. 23, the UE may perform reservation of a finite number of resources by which V2X communication is performed S2310. The UE may select a resource on a selection window and perform reservation of repeated resources on the basis of a specific period by using the selected resource, where the number of reserved resource(s) is finite. At this time, the finite number may be proportional to a counter value (for example, SL_RESOURCE_RESELECTION_COUNTER) selected (or determined) randomly, where the counter value may have a positive integer. Moreover, the finite number may have a value ten times the counter value selected randomly by the UE. In what follows, an example where the UE reserves a finite number of resources will be descried in detail.

The UE may reserve a plurality of resources with which V2X communication is performed, and the number of reserved resources may be finite. When the UE reserves a finite number of resources, a predefined rule (for example, 10*SL_RESOURCE_RESELECTION_COUNTER) may be applied.

As a specific example of a predefined rule, the number of subframes in one set of time and frequency resource with respect to the transmission opportunity of PSSCH may be set to a specific value (for example, $C_{resel}$). At this time, Cresel may be defined as 10*SL_RESOURCE_RESELECTION_COUNTER (when a specific counter (for example, SL_RESOURCE_RESELECTION_COUNTER) is configured), otherwise (namely when SL_RESOURCE_RESELECTION_COUNTER has not been configured), $C_{resel}$ may be set to 1. Here, SL_RESOURCE_RESELECTION_COUNTER may be set to a random value of 5 or more and 15 or less.

For example, when SL_RESOURCE_RESELECTION_COUNTER is 5, a total of 50 subframes may be reserved for transmission of PSSCH while, when SL_RESOURCE_RESELECTION_COUNTER is 15, a total of 150 subframes may be reserved for transmission of PSSCH.

The (corresponding) finite number may be defined by (A) the total number (TNUM_V2XSF) of subframes (or resources) set (or signaled) as a V2X resource (pool) (where TNUM_V2XSF value may be interpreted to be a positive integer of 10240 or less (including '0')) (or "FLOOR (TNUM_V2XSF/resource reservation (interval) period (P))" (or "CEILING (TNUM_V2XSF/resource reservation (interval) period (P))" or "FLOOR (10240/resource reservation (interval) period (P))" or "CEILING (10240/resource reservation (interval) period (P))") (where FLOOR(X) and CEILING(X) represent a function returning the greatest integer less than or equal to X and a function returning the least integer greater than or equal to X, respectively) or (a value less than (or less than or equal to) (predefined (or signaled)) TNUM_V2XSF (or 10240)) and/or (B) a (specific) value (predefined (or signaled) by a (serving) eNB (or from the network)). Here, the (corresponding) finite number (and/or TNUM_V2XSF value) may be interpreted to be larger (or larger than or equal to) than SEL_CNTVAL value (and/or a value derived from the SEL_CNTVAL value) (and/or the (corresponding) finite number (and/or TNUM_V2XSF value) may be interpreted as the maximum number of subframes (or resources) (of a kind) that may be reserved (or selected)). By applying the corresponding rule, the problem that (all of) the reserved (or selected) subframes (or resources) are passed (in the time region) even though the (selected) counter value is a positive integer may also be alleviated. Here, although the V2X TX UE(s) defines the (corresponding) finite number (which, for example, may be interpreted as the maximum number of subframes (or resources) (of a kind) that may be reserved (or selected)), if the SEL_CNTVAL value (and/or a value derived from the SEL_CNTVAL value) is less than the (corresponding) finite number, the V2X TX UE(s) may be made to (exceptionally) reserve (or select) SEL_CNTVAL (and/or a value derived from the SEL_CNTVAL value and/or a value smaller than the SEL_CNTVAL) subframes (or resources).

The UE may perform V2X communication on the finite number of resources S2320. The UE performs V2X communication on a reserved resource in the same way as described above.

Meanwhile, the UE does not perform V2X transmission indefinitely on a reserved resource. In other words, the UE may reselect a reserved transmission resource, and as described above, the (corresponding) transmission resource (re)reservation (or selection) operation may be triggered (at least) when the (transmission resource (re)reservation) counter value (SEL_CNTVAL) selected randomly within a predefined (or signaled) range (for example, "5-15") by the V2X TX UE(s) becomes 0 (and/or a "negative integer value").

At this time, when there is no more reserved resource lest, the V2X UE may perform resource reselection on in a selection window. Also, when the V2X UE does not perform V2X transmission for 1 continuous second, resource reselection may be performed in the selection window while, when the V2X UE does not perform V2X transmission continuously for a predetermined number of transmission opportunities, resource reselection may be performed in the selection window. In one example, while the (corresponding) finite number (and/or TNUM_V2XSF) of reserved (or selected) subframes (or resources) are (all) passed (in the time region) (and/or a predefined (or signaled) subframe index (for example, 10240 (or TNUM_V2XSF) passes), if the (selected) counter value does not become "0" (and/or a "negative integer value"), the V2X TX UE(s) may be made to perform the transmission (re)reservation (or selection) operation but to newly (randomly) select a (transmission resource (re)reservation) counter value (or instead of newly (randomly) selecting a (transmission resource (re)reservation) counter value), an existing value (SEL_CNTVAL) (or the remaining value (or predefined (or signaled) (other) value)) may be used (or maintained or applied).

A specific example in which a UE reselects a transmission resource will be described later.

The (corresponding) term "transmission resource (re) reservation (or selection) operation" may be interpreted as (A) (re)reserving (or selecting) a transmission resource (different from (or the same as) the existing resource) on the basis of a sensing result when the V2X TX UE(s) determines not to maintain (or reuse) a (transmission) resource selected previously on the basis of a (predefined (or signaled)) probability value (KEEP_P) (or irrespective of the corresponding probability value (KEEP_P)) and/or (B) the V2X TX UE(s)'s maintaining (or reusing) a (transmission) resource selected previously on the basis of a (predefined (or signaled)) probability value (KEEP_P) (or irrespective of the corresponding probability value (KEEP_P)) and/or (C) reserving (or selecting) (again) a finite number (or a predefined (or signaled) (other) number (which, for example, is interpreted to be larger than (or larger than or equal to) SEL_CNTVAL value (and/or a value derived from the SEL_CNTVAL value)) of subframes which are the same as existing subframes (or the same resources (as the existing ones)).

Example #2

(When (Example #1) is applied) a V2X TX UE #X (for example, resource reservation (interval) period "P_X") may be made to determine (for example, the aforementioned "STEP 2") whether a transmission resource having a resource reservation (interval) period "P Y" reserved (or selected) by other V2X TX UE #Y collide (or is overlapped) with a candidate resource that may be reserved (or selected) by the V2X TX UE #X according to whether collision (or overlap) occurs when the (finite) number (NUM_EXTX) of transmissions assumed (or considered) by the V2X TX UE #X is assumed (or considered) to be performed (on the corresponding candidate resource) (or when it is assumed (or considered) that transmission is performed as many times as the finite number of subframes (or resources) (having a resource reservation (interval) period "P_X") reserved (or selected) by the V2X TX UE #X). Here, in one example (of a case in which the corresponding rule is applied), if it is found (from (SUBFRAME #(N−10)) PSCCH decoding) that the V2X TX UE #Y (having a resource reservation (interval) period of "100 ms") has reserved (or selected) a transmission resource on the SUBFRAME #(N−10) and SUBFRAME #(N+990) with a resource reservation (interval) period of "1000 ms", the V2X TX UE #X may be made to perform monitoring "SUBFRAME #(N+90), SUBFRAME #(N+190), SUBFRAME #(N+290), SUBFRAME #(N+390), SUBFRAME #(N+490), SUBFRAME #(N+590), SUBFRAME #(N+690), SUBFRAME #(N+790), SUBFRAME #(N+890) (, SUBFRAME #(N+990))" (and/or "SUBFRAME #(N+(990−100*9)), SUBFRAME #(N+(990−100*8)), SUBFRAME #(N+(990−100*7)), SUBFRAME #(N+(990−100*6)), SUBFRAME #(N+(990−100*5)), SUBFRAME #(N+(990−100*4)), SUBFRAME #(N+(990−100*3)), SUBFRAME #(N+(990−100*2)), SUBFRAME #(N+(990−100)) (,SUBFRAME #(N+990))") to determine whether a candidate resource (at the same (frequency) position as the V2X TX UE #Y) may be selected on the SUBFRAME #(N+90) (within a predefined (or assumed) "(TX RESOURCE) SELECTION WINDOW") when transmission resource (re) reservation (or selection) is performed at the SUBFRAME #N (current time). The corresponding monitoring performed by the V2X TX UE #X may determine whether a candidate resource (SUBFRAME #Z (for example, "Z=(N+90)") at the same (frequency) position reserved (or selected) by the V2X TX UE #Y (within the predefined (or assumed) "(TX RESOURCE) SELECTION WINDOW") is selectable from whether the time point (for example, SUBFRAME #G (for example, "G=(N+990)")) (which, for example, may be interpreted as a kind of "UPPER BOUND") of a resource (or subframe) reserved (or selected) by the (corresponding) V2X TX UE #Y (on the basis of "P__Y") (additionally) is overlapped with SUBFRAME #(Z+P_X*K) (here, for example, "0≤K≤(the greatest (integer) M value satisfying a condition that "(Z+P_X*M)" value is less than or equal to "G" value") (and/or SUBFRAME #Z and SUBFRAME #(G-P_X*R) (here, for example, "0≤R≤(the greatest (integer) H value satisfying a condition that "(G-P_X*H)" value is greater than or equal to the minimum subframe index value within the (predefined (or assumed)) "(TX RESOURCE) SELECTION WINDOW") are overlapped with each other). When the proposed rule (of (Example) #2) is applied, the number of resources reserved (or selected) by the V2X TX UE(s) (for example, (Example #1)) may differ from the number of resources whose future behavior has to be monitored to determine collision (or overlap) (for example, (Example #2)). At this time, as another example (of a case in which the corresponding rule is applied), when it is found (from (SUBFRAME #(N−10)) PSCCH decoding) that the V2X TX UE #Y has reserved (or selected) a transmission resource on the SUBFRAME #(N−10) and SUBFRAME #(N+990) with a resource reservation (interval) period of "1000 ms", and the V2X TX UE #X (having a resource reservation (interval) period of "100 ms") performs (re)reservation(or selection) of a transmission resource at the SUBFRAME #N (the current time), the candidate resource on the SUBFRAME #(N+90) (at the same (frequency) position of the V2X TX UE #Y) may be (finally) selected according to whether the candidate resource collides (or is overlapped) with the reserved (or selected) transmission resource (for example, SUBFRAME #(N+990)) of the V2X TX UE #Y when a (finite) number (for example "9") (for example, the corresponding (finite) number may be set by the (greatest) (integer) value while the maximum value of the monitoring subframe index does not exceed the time point for the reserved (or selected) transmission resource (for example, SUBFRAME #(N+990)) of the V2X TX UE #Y) of transmissions (for example, SUBFRAME #(N+90), SUBFRAME #(N+190), SUBFRAME #(N+290), SUBFRAME #(N+390), SUBFRAME #(N+490), SUBFRAME #(N+590), SUBFRAME #(N+690), SUBFRAME #(N+790), SUBFRAME #(N+890)) assumed (or considered) by the candidate resource is performed. Since no collision (or overlap) occurs in the corresponding example, the candidate resource may be (finally) selected. In one example, NUM_EXTX value and FINI_SFNUM value (see (Example #1)) may be set (or signaled) independently (or differently) (or in the same manner). The FINI_SFNUM value may be set (or signaled) by a common value (or independent value) among the V2X UE (GROUP) ((sharing a V2X resource pool) on the same carrier (or frequency)) (and/or NUM_EXTX value may be set (or signaled) by an independent value (which is set by the upper layer of the UE, for example) among the V2X UE (GROUP) ((sharing a V2X resource pool) on the same carrier (or frequency)) (or a common value)).

Example #3

When a (selected) counter value is decreased by a predefined (or signaled) value (for example, "1") every (actual) TB (or packet) transmission, if a TB (or packet) to be transmitted to the V2X TX UE #M does not exist (for a long time) (in a (LOW LAYER) buffer (and/or PDCP LAYER)) (and/or if no (actual) TB (or packet) transmission is performed), decrease of the (selected) counter value will be stopped, and when a TB (or packet) to be transmitted is again generated (after a long time period) (and/or when (actual) TB (or packet) transmission is performed), the (corresponding) V2X TX UE #M regards (or assumes) that (previously) reserved (or selected) resources are still available (since the (selected) counter value is a positive integer value) and thereby does not use the (corresponding) resources properly.

The UE is able to reselect a reserved transmission resource, and the (corresponding) transmission resource (re)reservation (or selection) operation may be (at least) triggered when the (transmission resource (re)reservation) counter value (SEL_CNTVAL) selected randomly within a range (for example, "5-15") predefined (or signaled) by the V2X TX UE(s) becomes "0" (and/or a "negative integer value"). Here, when the UE actually performs transmission, the counter value may be decreased by '1', and when the counter value becomes 0, the UE may perform a resource re-reservation operation. In other words, in this case, the transmission resource re-reservation may be made (triggered) only when the UE actually performs transmission (on a (previously) reserved resource).

As described above, the counter value (which triggers resource re-reservation) is decreased only when the UE actually performs packet transmission (on a (previously) reserved resource). While a (finite) number of (previously) reserved resources are all passed (on the time region), if the corresponding counter value does not become "0" (and/or a "negative integer value"), a deadlock problem (a situation in which resource re-reservation is never triggered) may occur.

Therefore, to solve the aforementioned problem, in what follows, a method for performing resource re-reservation (namely resource reselection) (even when the counter value does not become 0) will be described with reference to related drawings.

Figure 24:
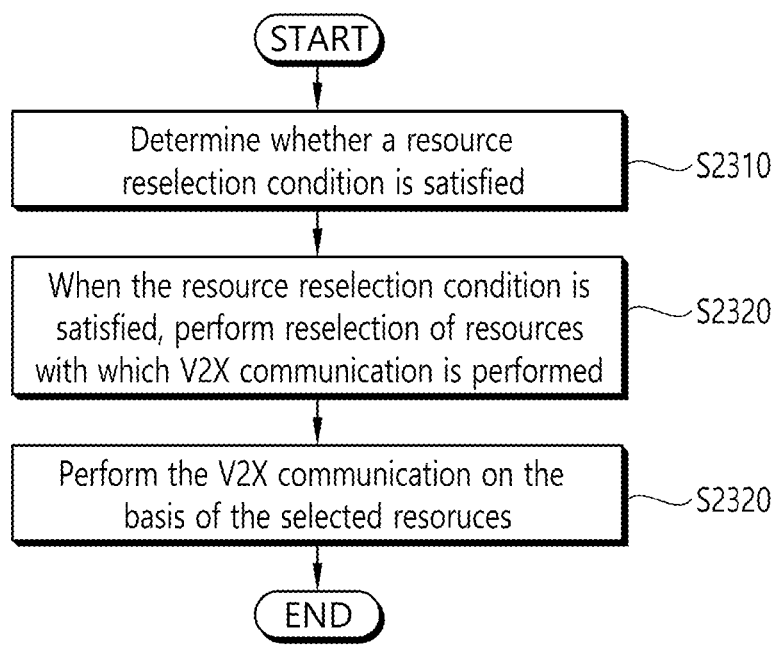
FIG. 24 is a flow diagram of a method for a UE to reselect a resource according to one embodiment of the present invention.

FIG. 24 is a flow diagram of a method for a UE to reselect a resource according to one embodiment of the present invention.

Referring to FIG. 24, the UE determines whether a resource reselection condition is satisfied 52410. The resource reselection may depend on a plurality of conditions. If at least one condition is satisfied among the plurality of resource reselection conditions, the UE may perform resource reselection. In one example, (to solve the corresponding problem), if there is not a TB (or packet) to be transmitted for more than a predefined (or signaled) threshold (time) value (in the (LOW LAYER) butter (and/or PDCP LAYER)) (and/or if (actual) TB (or packet) transmission is not performed (continuously)) (and/or if the (current) subframe index exceeds 10240 (or TNUM_V2XSF) and/or if the (finite number of) subframes (or resources) reserved (or selected) by the V2X TX UE #M are (all) passed (in the time region), the V2X TX UE #M (whose (selected) counter value is a positive integer value) may be made to perform a transmission resource (re)reservation (or selection) operation, but the (transmission resource (re)reservation) counter value may be made to be selected (randomly) (or (instead of newly (randomly) selecting the counter value), the (transmission resource (re)reservation) counter value may use (or maintain or apply) an existing value (SEL_CNTVAL) (or the remaining value (or a predefined (or signaled) (other) value)).

To summarize, resource reselection conditions for a UE may include (A) a case in which there is no more resources left for V2X transmission (for example, as described above, a case where 'the subframes (or resources) reserved (or selected) by the UE are (all) passed'), (B) a case in which the UE does not perform packet transmission for 1 continuous second (for example, as described above, a case where '(continuous) TB (or packet) transmission is not performed for more than a predefined (or signaled) threshold time value'), and (C) a case in which the UE skips a predetermined number of consecutive transmission opportunities (for example, as described above, a case where 'TB (or packet) transmission is not performed (continuously) for more than a predefined (or signaled) threshold value'). In what follows, a specific example of the aforementioned resource reselection condition will be described.

(A) the Case where No More Resources are Left for v2X Transmission

When no more resources related to a configured sidelink grant are left, the UE may perform resource reselection. In other words, if no more resources related to a configured sidelink grant are left but there is a new MAC PDU to be transmitted to the UE, resource reselection may be triggered (in other words, in the aforementioned case, the UE may perform resource reselection).

In one example, while the (corresponding) finite number of (and/or TNUM_V2XSF) reserved (or selected) subframes (or resources) are (all) passed (in the time region) (and/or a predefined (or signaled) subframe index (for example, 10240 (or TNUM_V2XSF)) passes), if the (selected) counter value does not become "0" (and/or a "negative integer value"), the V2X TX UE(s) may be made to perform a transmission resource (re)reservation (or selection) operation, but the (transmission resource (re)reservation) counter value may be made to be selected (randomly) (or (instead of newly (randomly) selecting the counter value), the (transmission resource (re)reservation) counter value may use (or maintain or apply) an existing value (SEL_CNTVAL) (or the remaining value (or a predefined (or signaled) (other) value)).

(B) The Case where the UE does not Perform Packet Transmission for One Continuous Second If transmission or retransmission is not performed (by an MAC entity) on a resource indicated by a configured sidelink grant for (last) 1 second, the UE may perform resource reselection. In other words, when the UE does not perform transmission or retransmission for a continuous transmission opportunity lasting 1 second, resource reselection may be triggered.

(C) The Case where the UE Skips a Predetermined Number of Consecutive Transmission Opportunities If the UE is configured with a predetermined value and the number of unused transmission opportunities (on a resource indicated by a configured sidelink grant) is the same as the predetermined value, the UE may perform resource reselection. In other words, if a specific value is set for the UE and the UE skips as many transmission opportunities as the specific number continuously, the UE may perform resource reselection.

In other words, if the UE skips N (which is a positive integer) consecutive transmission opportunities, resource reselection may be triggered. Here, when the aforementioned condition is applied, the N is set for the UE, where N may take a value from [1, 2, 3, 4, 5, 6, 7, 8, 9].

For example, if the UE skips '5' consecutive transmission opportunities and is configured to perform resource reselection, the UE may perform resource reselection when not performing transmission for 5 consecutive transmission opportunities.

Afterwards, if the resource reselection condition is satisfied, the UE may perform reselection of a resource with which V2X communication is performed S2420. In other words, if the resource reselection condition is satisfied, the UE may reselect a resource with which V2X communication is performed, after which the UE may perform V2X communication on the selected resource. For example, as described above, when (A) a case in which there is no more resources left for V2X transmission (for example, as described above, a case where 'the subframes (or resources) reserved (or selected) by the UE are (all) passed'), (B) a case in which the UE does not perform packet transmission for 1 continuous second (for example, as described above, a case where '(continuous) TB (or packet) transmission is not performed for more than a predefined (or signaled) threshold time value'), or (C) a case in which the UE skips a predetermined number of consecutive transmission opportunities (for example, as described above, a case where 'TB (or packet) transmission is not performed (continuously) for more than a predefined (or signaled) threshold value'), the UE may reselect a resource with which V2X communication is performed and perform V2X communication on the selected resource.

Afterwards, the UE may perform V2X communication by using the selected resource S2430. Here, as described above, the selected resource may indicate the resource determined on the basis of a selection window constructed within a range satisfying the LATENCY REQUIREMENT (in other words, a resource on the selection window satisfying the latency requirement). Also, as described above (or below), the UE may select a subframe within the selection window on the basis of a sensing result obtained by performing sensing in a UE-specific sensing period, determine transmission reservation resources on the basis of the selected subframe, and perform V2X communication on the reserved resource. Since a specific example in which the UE performs V2X communication on the basis of a selected resource is the same as described above (or below), specific details will be omitted.

Here, in one example, the term of the (corresponding) "transmission resource (re)reservation (or selection) operation" may be interpreted as (A) re-reserving (or selecting) a transmission resource (different from (or the same as) the existing resource) on the basis of a sensing result when the V2X TX UE(s) determines not to maintain (or reuse) a (transmission) resource selected previously on the basis of a (predefined (or signaled)) probability value (KEEP_P) (or irrespective of the corresponding probability value (KEEP_P)) and/or (B) the V2X TX UE(s)'s maintaining (or reusing) a (transmission) resource selected previously on the basis of a (predefined (or signaled)) probability value (KEEP_P) (or irrespective of the corresponding probability value (KEEP_P)) and/or (C) reserving (or selecting) (again) a finite number (or a predefined (or signaled) (other) number (which, for example, is interpreted to be larger than (or larger than or equal to) SEL_CNTVAL value (and/or a value derived from the SEL_CNTVAL value)) of subframes which are the same as existing subframes (or the same resources (as the existing ones)).

Example #4

In one example, (when the V2X TX UE #U performs (re)reservation (or selection) of a transmission resource and/or determines the position of a selected (or reserved) subframe (or resource) of other V2X TX UE #Z) if a finite (or infinite) number of (reserved (or selected)) subframes (or resources) having a resource reservation (interval) period of "P" exceed the (previous) 10240-th subframe (for example, the "Z"-th subframe (here, in one example, "Z" is a positive integer value larger than "10240")), the V2X TX UE #U may be made to consider (or assume) that reservation (or selection) (of a subframe (or resource)) is performed with the resource reservation (interval) period "P" (again) from the "MOD (Z, 10240)"-th subframe within the next (or following) 10240 subframes.

Example #5

(in the case of (Example #1) and/or (Example #2) and/or (Example #3) and/or (Example #4)) reservation (or selection) (of a finite (or infinite) number of subframes (or resources)) itself may be performed (by the V2X UE(s)) while the reservation (or selection) is allowed to exceed the SFN range (or TNUM_V2XSF range) (by applying SFN WRAP AROUND), and the V2X UE(s) may be made to perform to skip strange (time point) subframes (or resources) (from valid transmission subframes (or resources)) (and/or to extend the SFN range (or TNUM_V2XSF range) for reservation (or selection) of (a finite (or infinite) number of) subframes (or resources)) while maintaining the resource reservation (interval) period "P" of the V2X UE(s).

Example #7

In one example, the following describe a method for supporting an efficient (V2X message (or TB)) transmission operation of the V2X TX UE(s). In what follows, it is assumed that the UE reserves 10*C subframes at the intervals of the resource reservation period P, where C may represent SL_RESOURCE_RESELECTION_COUNTER determined by the MAC.

(A) As described above, the UE's reserving 10*C subframes at the intervals of the resource reservation period P may raise largely two problems.

First, although the UE reserves a finite number of subframes, SL_RESOURCE_RESELECTION_COUNTER may be decreased only when the MAC PDU is transmitted. Therefore, when the upper layer stops packet generation for a specific time period and transmission is skipped in a large number of reserved subframes, reserved resources for the UE may become no longer valid, and no more resources may be available for transmission of a newly arrived packet.

Also, if the time period of a set of reserved subframes exceeds a D2D FRAME NUMBER (DFN) range (namely, $10*C*P > T_{max}$, where $T_{max}$ is 10240 or 10176), a subframe number in the second DFN range may not be divided by 100 (namely, division by 100 may give a remainder).

For example, as shown in FIG. 22, if a V2X subframe has an index range of 10240, and the UE reserves subframes having an index of {0, 100, ..., 10200, 10300, ..., 14900}, the subframe number from 10300 to 14900 exceeds the DFN range; therefore, only the subframes having an index of {0, 100, ..., 10200, 60, 160, ..., 3660} may be reserved.

(B) In this regard, a method for solving the aforementioned two problems will be provided in what follows.

First of all, to solve the first problem, when SL_RE-SOURCE_RESELECTION_COUNTER is still larger than 0 even if no more resources reserved by the UE are left, the UE may extend resource reservation.

To solve the second problem, the number of reserved subframes may be configured independently from the counter value. Moreover, the number of reserved subframes may be configured to be smaller than the counter value. For example, when resource reservation is triggered, the UE may reserve a set of subframes up to the boundary of the DFN range.

Figure 25:
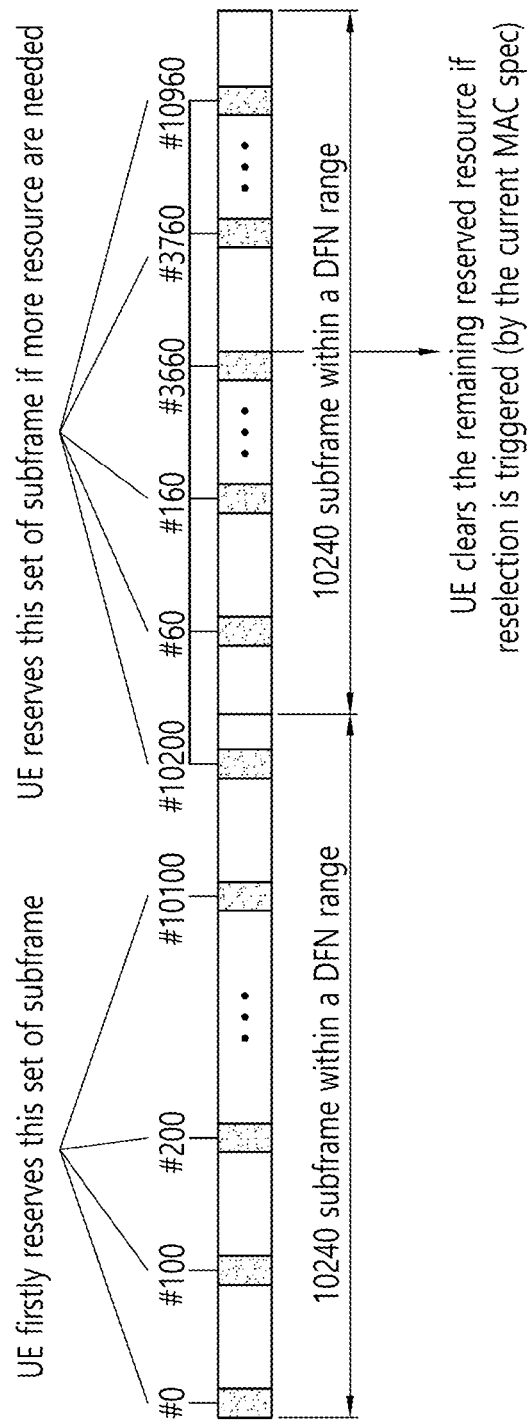
FIG. 25 illustrates one example of a method for performing resource reservation by taking into account the proposal described above.

FIG. 25 illustrates one example of a method for performing resource reservation by taking into account the proposal described above.

According to FIG. 25, by considering the aforementioned two proposals together, the UE may first determine a set of subframes terminated before the DFN boundary and repeat resource reservation at the same resource reservation intervals if more resources are required.

(C) The aforementioned proposal may be summarized as follows.

Proposal 1: when SL_RESOURCE_RESELECTION_COUNTER is still larger than 0 even when the UE does not have reserved resources any more, the UE may extend resource reservation.

Proposal 2: when resource reservation is triggered, the UE may reserve a set of subframes up to the boundary of a current DFN range.

One example of a transmission resource (re)reservation (or selection) operation of the V2X TX UE(s) may be described as shown in Table 2.

TABLE 2

2. Description of one example of the transmission resource (re)reservation (or selection) operation of the V2X TX UE(s)

2.1. UE procedure for determining subframes and resource blocks for transmitting Physical Sidelink Shared CHannel (PSSCH) and reserving resources for sidelink transmission mode 4)

The number of subframes in one set of time and frequency resources for transmission opportunities of the PSSCH is given as $C_{resel}$. At this time, if $C_{resel}$ is configured, $C_{resel}$ may be given as [10*SL_RESOURCE_RESELECTION_COUNTER], otherwise (namely $C_{resel}$ is not configured), $C_{resel}$ may be set to 1.

If time and frequency resource related to PSSCH transmission corresponding to a sidelink grant for which a set of sub-channels at the subframe $t^{SL}_m$, the same set of sub-channels at subframes $t^{SL}_{m + P_{rsvp}*j}$ may be determined with respect to PSSCH transmissions corresponding to the same sidelink grant. Here, j = 1, 2, ..., and the resource reservation interval between $C_{resel}$-1 and $P_{rsvp}$ may be determined by upper layers.

2.2. UE procedure for transmitting the PSCCH

With respect to the sidelink transmission mode 4, the UE may configure the content of the SCI format 1 as follows.

If SL_RESOURCE_RESELECTION_COUTNER is larger than 1, the UE configures a resource reservation field as a resource reservation period determined by upper layers separated from each other by $P_{step}$. Here $P_{step}$ may be 100. Otherwise, the UE sets the resource reservation field to 0.

TABLE 2-continued 2.3. UE procedure for determining the subset of resources to be excluded in PSSCH resource selection in sidelink transmission mode 4

If requested by upper layers at the subframe n, the UE determines a set of resources to be excluded from PSSCH transmission according to the following steps. The upper layer may determine the parameter corresponding to the number of sub-channels used for PSSCH transmission in a subframe $L_{subCH}$, parameter corresponding to a resource reservation interval determined by the upper layer $P_{rsvp\_Tx}$ and parameter corresponding to a priority transmitted by the UE according to the associated SCI format 1 prio$_{TX}$.

STEP 1) The candidate single subframe resource $R_{x,y}$ with respect to PSSCH transmission may be determined as a set of sub-channels $L_{subCH}$ adjacent to the subframe $t^{SL}_y$ together with a sub-channel x + j, where j = 0,..$L_{subCH}$−1.

STEP 2) The UE monitors subframes n−1001, n−1000, n−999, ..., n−2 except for a subframe at which the UE performs transmission. Based on the decoded PSCCH of monitored subframes and measured S-RSSI, the UE may perform the operation corresponding to the following steps.

STEP 3) Parameter $Th_{a,b}$ may be set to the value started by the i-th SL-ThresPSSCH-RSRP field in the SL-ThresPSSCH-RSRP-List-r14. At this time, i = a*8 + b + 1.

STEP 4) A set $S_A$ may be initialized to a combination of all of candidate single subframe resources. A set $S_B$ may be initialized to an empty set.

STEP 5) If the following condition is satisfied, the UE excludes a candidate single subframe resource $R_{x,y}$ from the set $S_A$.

The UE may receive the SCI format 1 from the subframe $t^{SL}_m$. And the 'resource reservation' field and the 'priority' field may specify $P_{rsvp\_Tx}$ and prio$_{RX}$ from the received SCI format 1, respectively.

The measurement of PSSCH-RSRP according to the received SCI format 1 may be larger than $Th_{prioTX,prioRX}$.

The same SCI format 1 supposed to have been received from the subframe $t^{SL}_{m+P_{step} \cdot P_{rsvp\_RX}}$ may be determined according to resource blocks and a set of subframes overlapped with $R_{x,y\ P_{rsvp\ TX}*j}$, where j = 0, 1, ..., $C_{resel}$−1.

STEP 6) If the number of candidate single subframe resources remaining in the set $S_A$ is 2 M smaller than 0.2·$M_{total}$, the STEP 4 may be repeated by using the $Th_{a,b}$ which has been increased by 3 dB.

STEP 7) With respect to the candidate single subframe resource $R_{x,y}$ remaining in the set $S_A$, the metric $E_{x,y}$ may be defined as a linear average of S-RSSI measured in the sub-channel x + k, where k = 0,..$L_{subCH}$−1, with respect to the subframes monitored in the STEP 2.

STEP 8) The UE may move the candidate single subframe resource $R_{x,y}$ from the set $S_A$ to the set $S_B$ together with the least metric $E_{x,y}$. The present step may be repeated.

STEP 9) A set $S_C$ may be defined together with a set of all of candidate single subframe resources not belonging to the set $S_B$.

Example #6

In one example, the V2X TX UE(s) may be made to perform transmission resource (re)reservation (or selection) operation according to Table 2 (for example, the aforementioned (or following) "STEP 2 or 3"). Here, the "RESOURCE RESERVATION FIELD (RR_FIELD)" value in the SCI format may be set by the quotient (or value) (I_VALUE) obtained by dividing the "RESOURCE RESERVATION INTERVAL (RR_INV)" value (set (or signaled) by the upper layer (of the UE)) by a predefined (or signaled) value (P_STEP) (for example, "P_STEP=100"). Here, I_VALUE may be set (or signaled) to have a range of (maximum) "1≤I_VALUE≤10". Here, selection of (or allowing) a specific I_VALUE may be determined in the form of "CARRIER (or POOL)-SPECIFIC NETWORK (PRE)CONFIGURATION" (through predefined signaling (for example, the X-th bit of a 10-bit bitmap indicates whether the X-th I_VALUE is selectable (or allowed)). Here, restriction of selection of a specific I_VALUE (I_RESVAL) may be interpreted that (A) the RR_INV value of "I_RESVAL*P_STEP" value is not set (or signaled) (by the upper layer (of the UE)) and/or (B) that a different I_VALUE (rather than I_RESVAL) capable of expressing the most approximate value to the RR_INV (actually) desired (by the upper layer (of the UE)) has to be set (or signaled).

Meanwhile, when the UE performs transmission while sensing is conducted (in a sensing window), namely, a UE may not be able to perform sensing (due to the half-duplex problem) for a subframe within the sensing window in which V2X transmission is performed. At this time, when the UE performs V2X message transmission on a subframe corresponding to the subframe unable to perform sensing at specific periods, the UE is led to transmit a V2X message on the basis of the subframe which failed to perform sensing.

In this regard, in what follows, to solve the problem of a UE's transmitting a V2X message on the basis of a subframe which has failed to perform sensing, a method for excluding a subframe (from a selection window) related to the subframe in which the UE has failed to perform sensing will be described with reference to related drawings.

Figure 26:
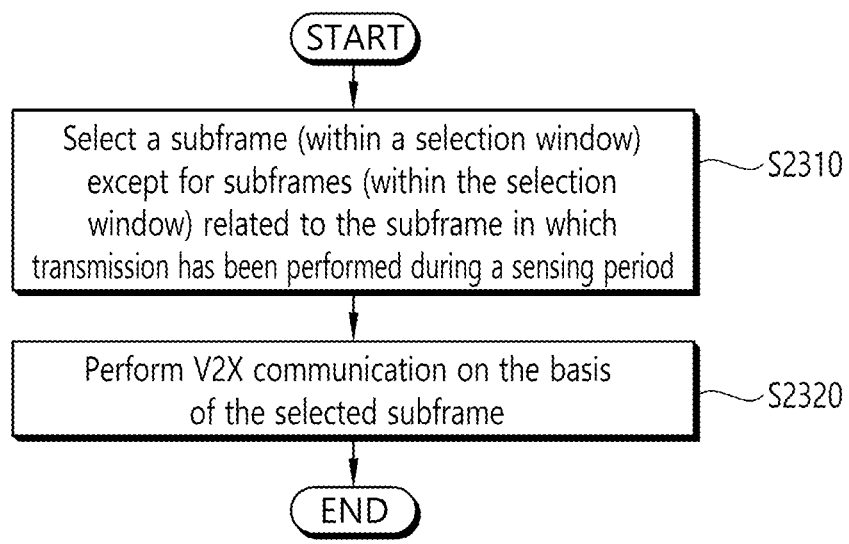
FIG. 26 is a flow diagram of a method for excluding a subframe (from a selection window) related to the subframe in which the UE has failed to perform sensing according to one embodiment of the present invention.

FIG. 26 is a flow diagram of a method for excluding a subframe (from a selection window) related to the subframe in which the UE has failed to perform sensing according to one embodiment of the present invention.

Referring to FIG. 26, the UE selects a subframe (from a selection window), excluding a subframe (in the selection window) related to a subframe in which transmission has been performed during a sensing period S2610. In other words, excluding a subframe in the selection window related to a subframe in which transmission has been performed during the sensing period among a plurality of subframes in the selection window, the UE may select a subframe from the plurality of subframes except for the excluded subframe in the selection window.

Here, the subframe in the selection window related to a subframe in which transmission has been performed during a sensing period may be overlapped with a subframe corresponding to the subframe in which the UE is unable to perform sensing according to a resource reservation period of a selected subframe selected by the UE selects within the selection window. For the convenience of understanding, the present descriptions will be further elaborated with reference to a related drawing.

Figure 27:
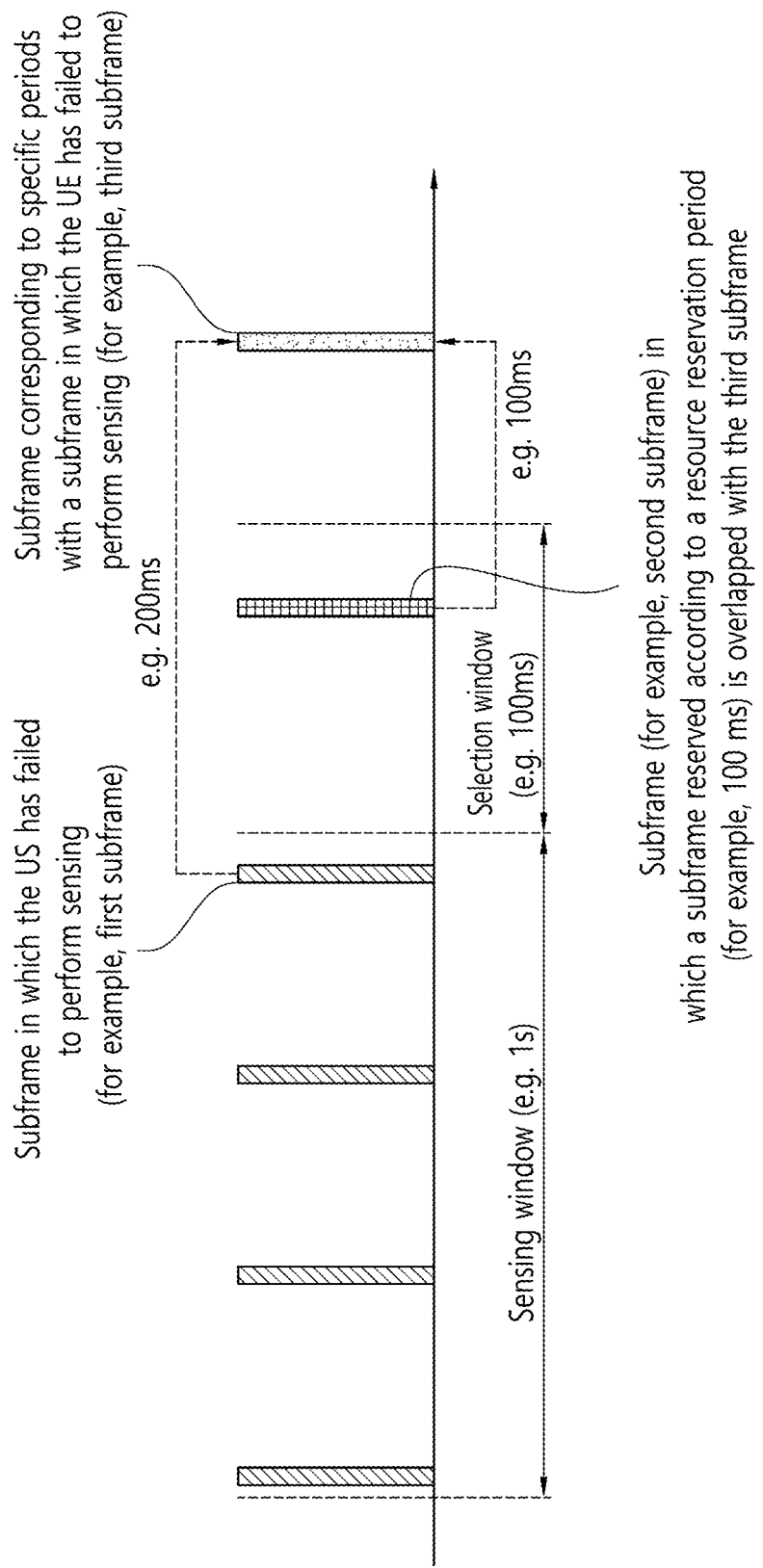
FIG. 27 illustrates an example in which a subframe (from a selection window) related to a subframe in which the UE has failed to perform sensing.

FIG. 27 illustrates an example in which a subframe (from a selection window) related to a subframe in which the UE has failed to perform sensing.

Referring to FIG. 27, for example, a first subframe may be the subframe in which the UE has failed to perform sensing. A subframe corresponding to the first subframe at a specific period may be assumed to be a third subframe.

Here, when a second subframe is selected from the selection window, a plurality of subframes may be reserved according to a resource reservation period for the selected second subframe, and if one (or more) subframe among the reserved subframes overlaps the third subframe, the UE may not select the second subframe within the selection window (namely, the second subframe may be excluded from selection).

Referring again to FIG. 26, to generalized the aforementioned operation, for example, if the UE has failed to perform sensing (as a V2X message transmission is performed) in the subframe #k (within the sensing window) and the subframe #(y+P*j) and the subframe #(K+100*i) are overlapped with each other, the UE may exclude the subframe #y within the selection window from resource reservation selection. Here, as described above, the subframe #k corresponds to the subframe in which the UE has failed to perform sensing, and the subframe #y may indicate a subframe within the selection window. Also, the P may represent the resource reservation period of the UE, where, for example, P may have a value of 100 ms. The j may assume a value of 0, 1, 2, . . . , $C_{\_resel}$−1. As described above, $C_{\_resel}$ may represent a value proportional to a specific counter value (for example 10*SL_RESOURCE_RESELECTION_COUNTER). Since descriptions about a specific counter (namely SL_RESOURCE_RESELECTION_COUNTER) are the same as described above, specific descriptions thereof will be omitted. Also, i may represent an element in a set which is restricted by a carrier-specific setting. In other words, the i may represent a value allowed for reservation by the eNB and represent a value related to a specific period (for example, if i is 2, the specific period (for example, 1 hop) is 100*i=200 ms). At this time, i may have a value of 2, 4, 6, 8, for example.

In one example, in the STEP 5 of Table 2, if SUBFRAME #($T_M^{SL}$) has not been monitored from the V2X message transmission operation of the V2X TX UE(s) in the STEP 2 (and/or if PSCCH decoding related to other V2X TX UE(s) and (associated) PSSCH DM-RS RSRP (and/or S-RSSI) measurement operation has not been performed on the SUBFRAME #($T_M^{SL}$) due to the V2X message transmission operation) and $R_{X,Y+RR\_INVTX*j}$ among $R_{X,Y}$ belonging to SA overlaps SUBFRAME #($T_{M+I\_CANVAL*P\_STEP}^{SL}$) (and/or (partial)resource(s) that may be selected (or reserved) by other V2X TX UE(s) on the SUBFRAME #($T_{M+I\_CANVAL*P\_STEP}^{SL}$) the V2X TX UE(s) may be made to exclude $R_{X,\ Y}$ (additionally) from the set SA. Here, in one example, "J" may be defined to be "0, 1, . . . , or ($C_{RESEL}$−1) (refer to Table 2)". Here, "RR_INVTX" may represent "RESOURCE RESERVATION INTERVAL" (set (or signaled) from the upper layer) of the V2X TX UE(s), and "I_CANVAL" may be regarded (specifically) as the value(s) belonging to the selectable (or allowable) "I_VALUE SET" designated (previously) in the form of "CARRIER(/POOL)-SPECIFIC NETWORK (PRE)CONFIGURATION". Here, if the aforementioned rule is applied, and whether to (additionally) exclude $R_{X,\ Y}$ from the set $S_A$ is determined (as a resource (for example SUBFRAME #($T_M^{SL}$)), is not monitored from the V2X message transmission operation of the V2X TX UE(s) in the STEP 2), only the "I_VALUE SET" (and/or "RESOURCE RESERVATION INTERVAL") (actually) selectable (or allowable) (from a specific carrier (or pool)) may be taken into account.

Afterwards, the UE may perform V2X communication on the basis of the selected subframe S2620. As described above, the selected subframe (or resource) may indicate a resource determined on the basis of the selection window constructed within a range satisfying the LATENCY REQUIREMENT (namely a resource on the selection window satisfying the LATENCY REQUIREMENT). Also, as described above (below), the UE may select a subframe within the selection window on the basis of a sensing result obtained by performing sensing during a UE-specific sensing period, determine transmission reservation resources on the basis of the selected subframe, and perform V2X communication on the reserved resource. As described above, the UE's performing V2X communication on the subframe may indicate that V2X communication is performed on the subframe reserved in conjunction with the subframe selected by the UE. A specific example in which the UE performs V2X communication on the basis of a selected resource is the same as described above (or below), detailed descriptions thereof will be omitted.

As another example, in the STEP 5 of Table 2, if SUBFRAME #($T_M^{SL}$) has not been monitored from the V2X message transmission operation of the V2X TX UE(s) in the STEP 2 (and/or if PSCCH decoding related to other V2X TX UE(s) and (associated) PSSCH DM-RS RSRP (and/or S-RSSI) measurement operation has not been performed on the SUBFRAME #($T_M^{SL}$) due to the V2X message transmission operation) and $R_{X,Y+RR\_INVTX*j}$ among $R_{X,Y}$ belonging to $S_A$ overlaps SUBFRAME #($T_{M+I\_CANVAL*P\_STEP}^{SL}$) (and/or (partial) resource(s) that may be selected (or reserved) by other V2X TX UE(s) on the SUBFRAME #($T_{M+I\_CANVAL*P\_STEP}^{SL}$)), the V2X TX UE(s) may be made to exclude Rx, Y (additionally) from the set $S_A$. Here, "I_CANVAL_X" may be set (or signaled) to the maximum value (or minimum value or a specific value) among the value(s) belonging to the selectable (or allowable) "I_VALUE SET" designated (previously) in the form of "CARRIER(/POOL)-SPECIFIC NETWORK (PRE)CONFIGURATION". Here, as another example, in the STEP 5 of Table 2, if SUBFRAME #($T_{Y-I\_CANVAL*P\_STEP}^{SL}$) has not been monitored from the V2X message transmission operation of the V2X TX UE(s) in the STEP 2 (and/or if PSCCH decoding related to other V2X TX UE(s) and (associated) PSSCH DM-RS RSRP (and/or S-RSSI) measurement operation has not been performed on the SUBFRAME #($T_{Y-I\_CANVAL*P\_STEP}^{SL}$) due to the V2X message transmission operation), the V2X TX UE(s) may be made to exclude RX, Y (additionally) from the set $S_A$. Here, in one example, "(N−1001)≤(Y−I_CANVAL*P_STEP)≤(N−2)" (where, in one example, the SUBFRAME #N time point may be interpreted as the time at which a (transmission) resource (re)reservation (or selection) is set (or signaled) to be performed (by the upper layer)) (and/or "P_STEP=100"). In another example, in the STEP 5 of Table 2, if SUBFRAME #($T_{Y-I\_CANVAL\_Q*P\_STEP*K}^{SL}$) has not been monitored from the V2X message transmission operation of the V2X TX UE(s) in the STEP 2 (and/or if PSCCH decoding related to other V2X TX UE(s) and (associated) PSSCH DM-RS RSRP (and/or S-RSSI) measurement operation has not been performed on the SUBFRAME #($T_{Y-I\_CANVAL\_Q*P\_STEP*K}^{SL}$) due to the V2X message transmission operation), the V2X TX UE(s) may be made to exclude Rx, Y (additionally) from the set $S_A$. Here, in one example, "(N−1001)≤(Y−I_CANVAL_Q*P_STEP*K)≤ (N−2)" (where, in one example, the SUBFRAME #N time point may be interpreted as the time at which a (transmission) resource (re)reservation (or selection) is set (or signaled) to be performed (by the upper layer)) (and/or "P_STEP=100") and/or it may be defined so that "K=NON-NEGATIVE INTEGER". Here, "I_CANVAL_Q" may be set (or signaled) to a value(s) belonging to the selectable (or allowable) "I_VALUE SET" (designated (previously) in the form of "CARRIER(/POOL)-SPECIFIC NETWORK (PRE)CONFIGURATION") (and/or the minimum value (or maximum value or a specific value) among the value(s) belonging to the selectable (or allowable) "I_VALUE SET"). Here, if the aforementioned (partial) rule is applied and whether to (additionally) exclude Rx, Y from the set $S_A$ is determined, (A) J value is assumed to have (only) a previously set (or signaled) specific value(s) (for example, "J=1 (or 0)") (and/or the J value (or a value(s) smaller than (or larger than) or equal to the corresponding, derived J value) at which "RR_INVTX*J" (or "P_STEP*J") becomes the same as the (actually) selectable (or allowable) maximum (or minimum) "RESOURCE RESERVATION INTERVAL" (or previously set (or signaled) specific "RESOURCE RESERVATION INTERVAL") (on a specific carrier (or pool)) and/or (B) RR_INVTX value is assumed to have (only) a previously set (or signaled) specific value(s) (for example, "RR_INVTX=1000 ms") (and/or an (actually) selectable (or allowable) maximum (or minimum) "RESOURCE RESERVATION INTERVAL" (on a specific carrier (or pool)) (or a value(s) smaller than (or larger than) or equal to the corresponding maximum (or minimum) "RESOURCE RESERVATION INTERVAL")). Here, the proposed method may be applied limitedly only when the priority related to a message (or packet) to be transmitted by the V2X TX UE(s) (and/or a CONGESTION LEVEL value related to the (corresponding) carrier (or pool)) is smaller (or larger) than a predefined (or signaled) threshold value.

Example #8

In one example, a method for effectively reflecting a resource (or subframe) not monitored (or sensed) due to the transmission operation (of the V2X UE(s)) in the "RESOURCE EXCLUSION PROCEDURE" (BASED ON PSSCH-RSRP MEASUREMENT)" will be described below.

When single transmission of a TB is performed by other UEs at the subframe #k, it may be difficult to obtain accurate information of PSSCH-RSRP on the skipped subframe #k. Therefore, if the subframe #(y+P*j) overlaps the subframe #(k+100*i), the UE #A may consider to exclude the subframe #k existing within the selection window of the UE. At this time, as described above, P may represent the resource reservation interval of the UE, and j may assume 0, 1, . . . , 10*SL_RESOURCE_RESELECTION_COUNTER−1. Also, i may indicate a (possible) element in a set restricted by a carrier-specific network (pre)setting.

Here, in one example, (when a V2X UE(s) having a "SHORTER RESOURCE RESERVATION PERIOD (or INTERVAL)" on a predefined (or signaled) (specific) resource pool (and/or a V2X UE(s) performing transmission of a V2X message (or traffic) having a (relatively) short period) (SHORTP_UE(s)), and a V2X UE(s) having a "(RELATIVELY) LONGER RESOURCE RESERVATION PERIOD (or INTERVAL)" (and/or a V2X UE(s) performing transmission of a V2X message (or traffic) having a (relatively) long period) (LONGP_UE(s)) exist together, the value of "100" in the "SUBFRAME #(K+100*I)" may be set to a (predefined (or signaled)) different value (A) if a SHORTP_UE(s) performs a sensing operation and/or (B) if a LONGP_UE(s) performs a sensing operation (with respect to the SHORTP_UE(s)).

Along with the aforementioned method, the UE #A may exclude all of the resources (within the selection window of the UE) overlapped with transmission of other UE that may be scheduled from a skipped subframe #k. In what follows, the operation above will be described with reference to related drawings.

Figure 28:
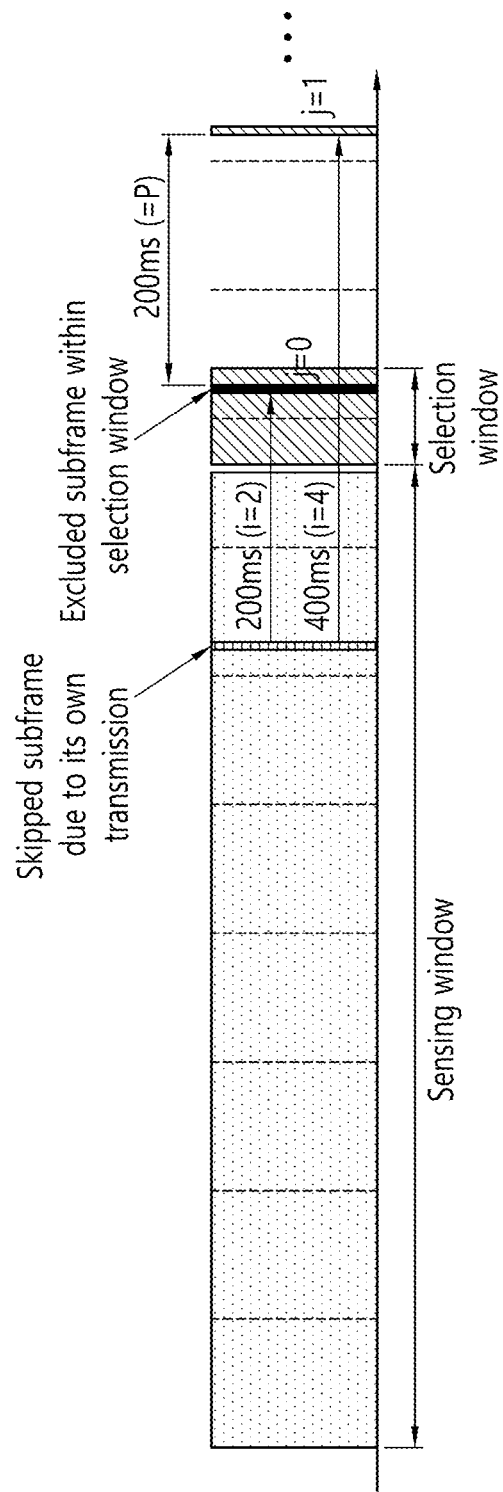
FIGS. 28 to 30 illustrate an example reflecting a resource in the "RESOURCE EXCLUSION PROCEDURE (BASED ON PSSCH-RSRP MEASUREMENT).
Figure 29:
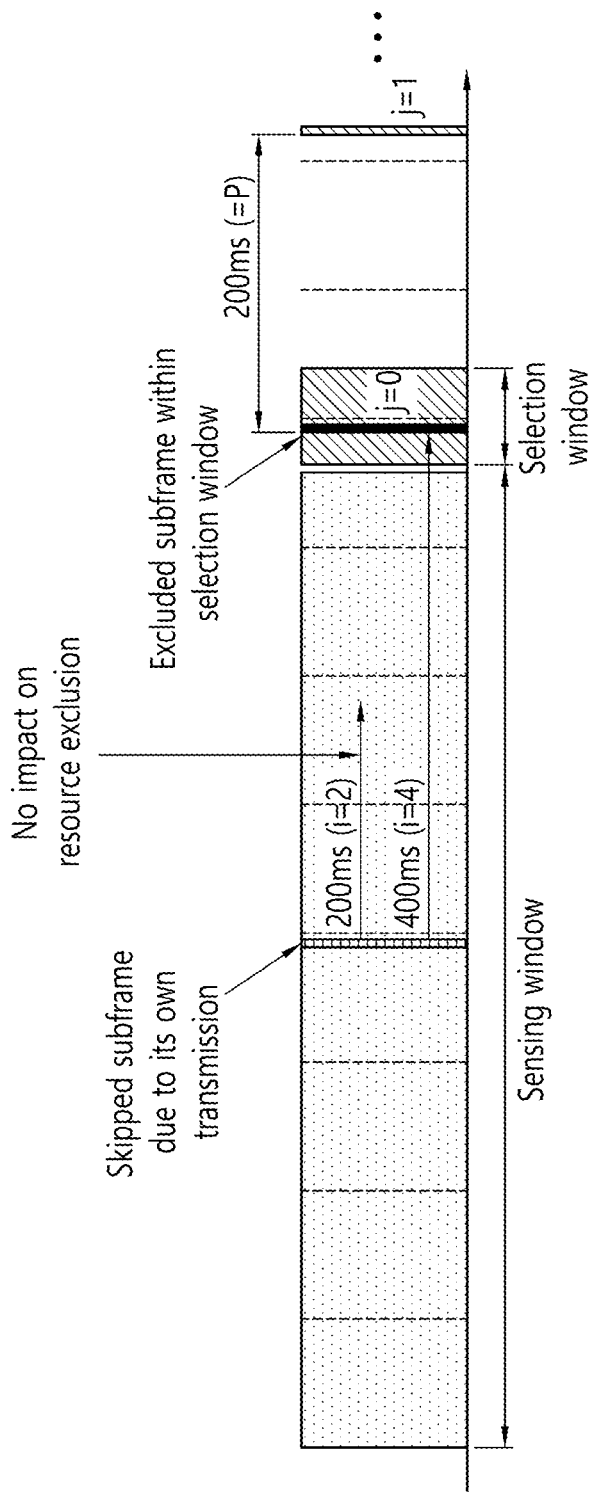
Figure 30:
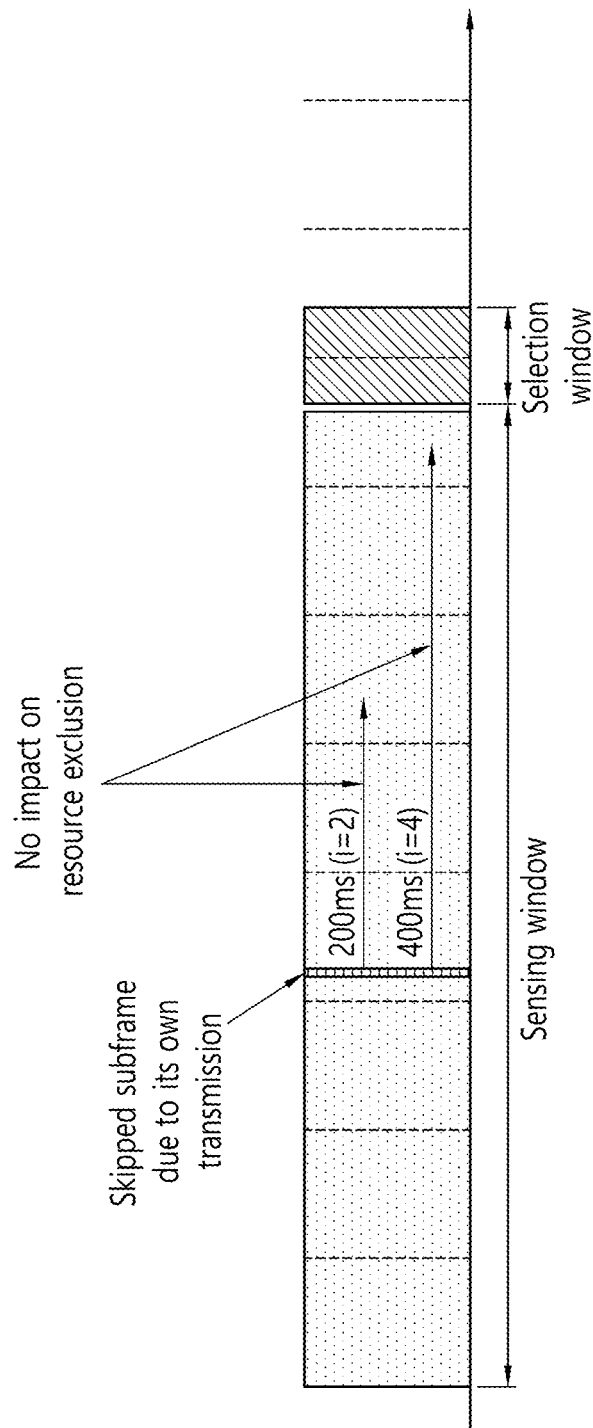

FIGS. 28 to 30 illustrate an example reflecting a resource in the "RESOURCE EXCLUSION PROCEDURE (BASED ON PSSCH-RSRP MEASUREMENT.

Referring to FIGS. 28 to 30, i may be restricted to a set such as {2, 4}, and P and SL_RESOURCE_RESELECTION_COUNTER may be set to 200 ms and 5, respectively.

In the case of FIG. 28, due to "subframe #(k+100*2) (namely, i=2) and subframe #(y+200*0) (namely, j=0)", and "subframe #(k+100*4) (namely, i=4) and subframe #(y+200*1) (namely, j=1)", the subframe #k (within the selection window) may be excluded from selection.

In the case of FIG. 29, due to "subframe #(k+100*4) (namely, i=4) and subframe #(y+200*0) (namely, j=0)", the subframe #k may be excluded from selection (within the selection window).

However, in the case of FIG. 30, since there exists no subframe belongs to the selection window in which the aforementioned overlap occurs, no subframe within the selection window may be excluded from selection.

As a result, the following method is provided.

Proposal: To process the subframe #k skipped (due to transmission by the V2X UE(s)) in the resource exclusion procedure, the following solution may be proposed. if the subframe #(y+P*j) may be overlapped with the subframe #(k+100*i), the UE #a may have to exclude the subframe #y within the selection window of the UE #a. Here, P may represent the resource reservation interval of the UE, j=0, 1, . . . , (10*SL_RESOURCE_RESELECTION_COUNTER−1), and i may represent all of the (possible) elements of a set limited by network (pre) setting for each carrier.

As another example, if a bitmap having a predefined (or signaled) (specific) length (for example, "16", "20", "100") is applied repeatedly for V2X resource pool configuration, (in particular, as subframes set (or signaled) to be used for SLSS transmission are excluded from (candidate) subframes which may be set (or signaled) as a V2X resource pool) a problem may be caused, where (application of) the corresponding bitmap is "TRUNCATED" at the "DFN RANGE END". Here, to solve the corresponding problem, the (existing) "DFN RANGE" value (for example, "10240" or "10176") may be increased (which, for example, may be interpreted in a so-called HYPER-SFN (or HYPER-DFN) form). Here, the (increased) "(maximum) DFN RANGE" value may be defined in the form of "10240 (or 10176) *H_VAL" (or "10240 (or 10176)*H_MAXVAL") (and/or "MAX DFN RANGE*H_VAL" (or "MAX DFN RANGE*H_MAXVAL")). Here, in one example, (A) a (currently applied) H_VAL value (or index), (B) H_VAL (index) range that may be configured (or used) and/or (C) the maximum value (or maximum index) of H_VAL (H_MAXVAL) (and/or minimum value (or minimum index) (H_MINVAL)) may be predefined (or signaled) by the network (or a serving cell) through predefined (upper (or physical) layer) signaling (and/or through a (newly defined) field on the PSBCH by the (SYNCH. SOURCE) UE (or through predefined D2D channel or signal)) (in the "CARRIER (or POOL or CELL)-SPECIFIC (PRE)CONFIGURATION") form and/or as one of "V2X POOL (PRE)CONFIGURATION").

Figure 31:
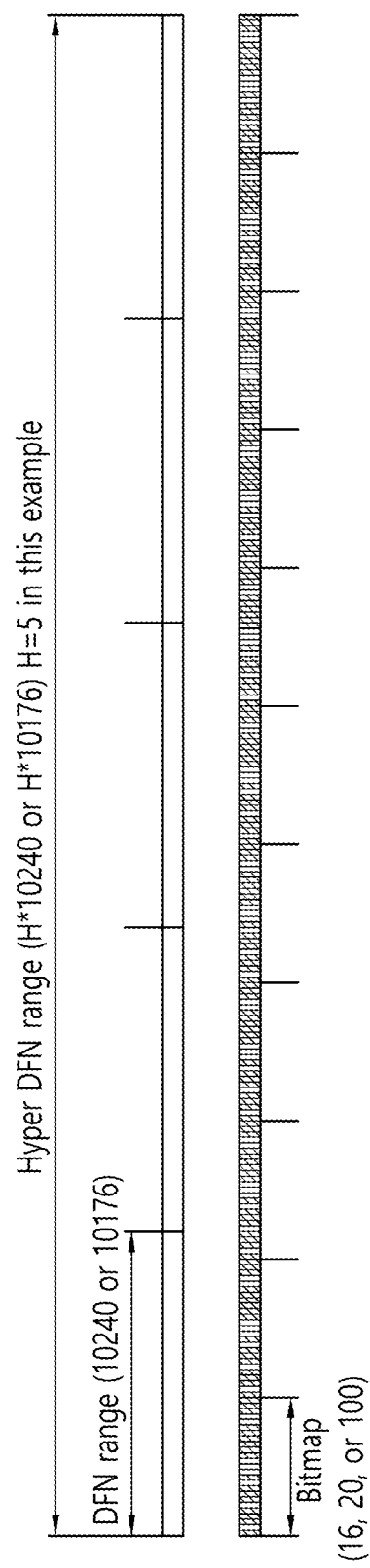
FIG. 31 illustrates one example of a case in which the (existing) "DFN RANGE" value (for example, "10240" or "10176") is increased.

FIG. 31 illustrates one example of a case in which the (existing) "DFN RANGE" value (for example, "10240" or "10176") is increased. Here, it is assumed that H_VAL (and/or H_MAXVAL) value is set to "5" (which, for example, is denoted as "H"). Here, the H_VAL value (and/or H_MAXVAL) (and/or V2X resource pool configuration (or signaling) related bitmap value) may be set (or signaled) (in a restrictive manner) so that the (increased) "(maximum) DFN RANGE" value may be divided by the V2X resource pool configuration-related (set (or signaled)) bitmap length (without a remainder) (and/or so that (on the (whole) subframes set (or signaled) as a V2X resource pool) ((on a specific carrier (or pool)) a period corresponding to the multiple of (actually) selectable (or allowable)) (maximum (or minimum) or predefined (or signaled)) "RESOURCE RESERVATION INTERVAL" (for example, "100 ms") may be "WRAPPED AROUND" (properly)). If the aforementioned rule is applied, the V2X UE(s) increases the H_VAL value by a predefined (or signaled) value (for example, "1") each time "the (maximum) DFN RANGE" value (for example, "1024 (or 10240)") is reached and uses (or considers) a (V2X) subframe in the ascending order of index starting from a relatively small value within a (V2X) subframe (set) based on the same H_VAL value for (V2X message) transmission (and/or V2X communication). As another example, in the sensing operation, the "SUBFRAME INDEX" uses the "LOGICAL INDEX" within the (V2X) resource pool. Here, in one example, when the "TDM" scheme is applied to a (predefined) other signal and a (V2X) resource pool, a physical time interval may become relatively large. In this case, the V2X TX UE(s) may make a smaller value be used for the "RESOURCE RESERVATION INTERVAL".

Meanwhile, when the aforementioned rule is applied (for example, as described above, when the (existing) "DFN RANGE" value (for example, "10240" or "10176") is increased (which, for example, may be interpreted as a kind of HYPER-SFN (or HYPER-DFN) method)), V2X communication may be performed as follows.

(A) (For example, when a bitmap for a V2V subframe is not repeated an integer number of times during a DFN period of [RAN1, RAN2]), V2V may be performed by being multiplexed with other signal or channel.

(B) Currently, the DFN range for V2V, namely Tmax which represents the number of subframes that may be allocated for V2V may be 10240 or 10176 depending on SLSS resource configuration.

Meanwhile, the length of a bitmap representing a V2V subframe for a resource pool may be 16, 20, or 100. Therefore, as described above (for example, in the case of FIG. 22), there may be a case in which the DFN range is not divided exactly by the bitmap length unit.

A fundamental solution to solve the problem may be to change the DFN range (namely, Tmax) so that the DFN range may be always divided exactly by the bitmap length. This may involve extending the DFN range so that it may be a multiple of the bitmap length. Therefore, to extend the SFN range, a concept of "Hyper SFN (H-SFN)" may be introduced.

Here, if H-SFN is provided by SystemInformationBlock-Type1-BR, the boundary between the BL UE within CE and a modification period for a UE may be defined by the SFN value, which is expressed as (H-SFN*1024+SFN) mod m=0. Here, H-SFN may always be provided with respect to NB-IoT, and the modification period boundary may be defined by the SFN value which is expressed as (H-SFN*1024+SFN) mod m=0. The modification period may be configured by system information.

In order to enable notification of system information update to the RRC_IDLE UE which has an eDRX period longer than or equal to the modification period, an eDRX acquisition period may be defined. The boundary of the eDRX acquisition period may be determined by the H-SFN value which is expressed as H-SFN mod 256=0. In particular, in the case of NB-IoT, the boundary of an eDRX acquisition period may be determined by the H-SFN value which is expressed as H-SFN mod 1024=0.

Figure 32:
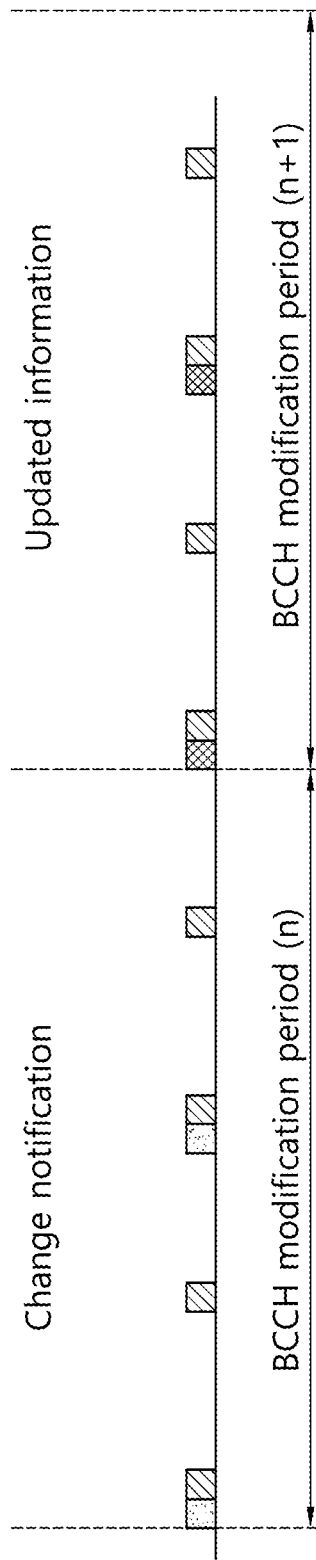
FIG. 32 illustrates one example of transmitting updated system information.

FIG. 32 illustrates one example of transmitting updated system information.

Referring to FIG. 32, if the network changes (part of) system information, the network may first notify UEs of this change. At the next modification period, the network may transmit updated system information. If update notification is received, the UE may obtain new system information immediately from the start of the next modification period by using a DRX cycle shorter than or equal to the modification period.

The system information transmitted, namely SystemInformationBlockType1 may be defined as shown in Table 3 below.

TABLE 3

```
SystemInformationBlockType1-v1310-IEs ::=SEQUENCE {
    hyperSFN-r13        BIT STRING (SIZE (10)) OPTIONAL, -- Need OR
    eDRX-Allowed-r13    ENUMERATED {true}      OPTIONAL, -- Need OR
```

Here, 'hyperSFN' represents a hyper SFN which is increased by one each time the SFN is wrapped around, and existence of the 'eDRX-Allowed' field represents whether DRX with an extended idle mode is allowed in a cell. If eDRX is not allowed, the UE has to stop using the DRX in the extended idle mode.

By applying a similar principle, the DFN range may be extended by defining a "hyper DFN". (In other words, except for the SLSS sub-frame), the V2V subframe index in the logical domain may be given by (H-DFN*$T_{max}$+DFN).

$H_{max}$, which is the maximum value of the H-DFN, may be configured so that it may be divided exactly by the length of a bitmap amounting to $H_{max}*T_{max}$ which is a total number of potential V2V subframes.

Figure 33:
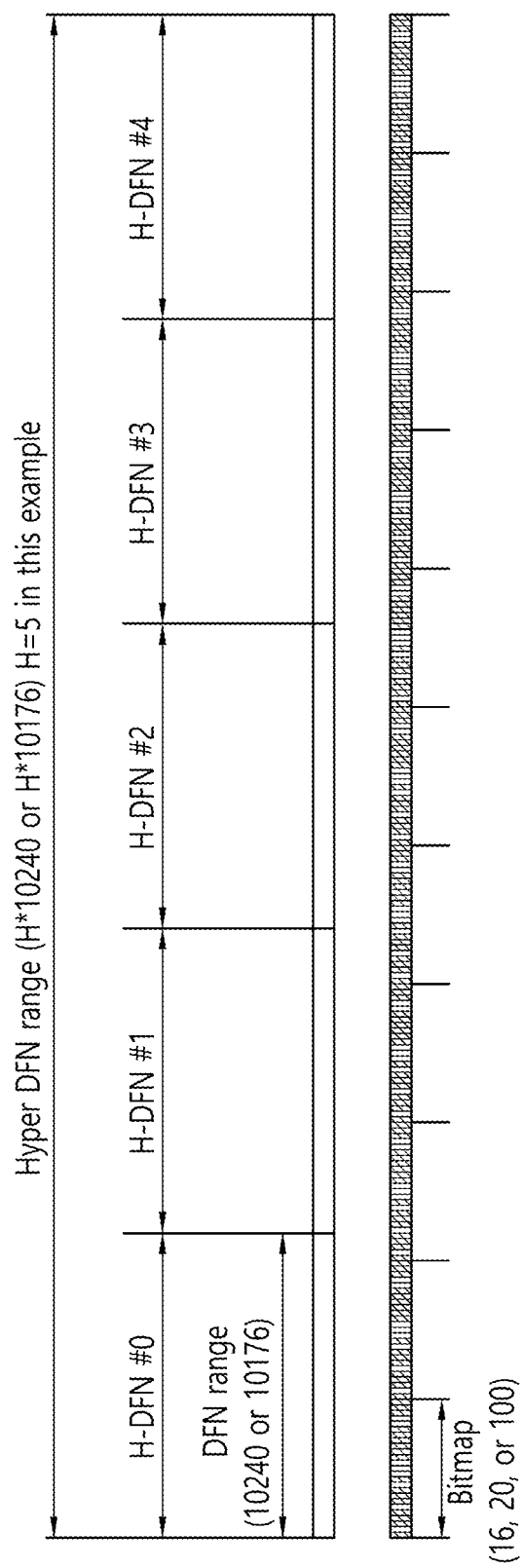
FIG. 33 illustrates one example of a hyper DFN.

FIG. 33 illustrates one example of a hyper DFN.

In the present example, $H_{max}$ may be set to 5. (In other words, H-DFN #5 is reset to H-DFN #0.) To support the hyper DFN, the current H-DFN index needs to be synchronized not only among UEs sharing the same resource pool but also between an eNB and a UE. The H-DFN index may be signaled as part of elements constituting a resource pool between the eNB and the UE and signaled through the PSBCH. When GNSS is a synchronization reference, the H-DFN index may be derived from the current UTC value.

(C) To conclude,

The hyper DFN may be proposed as follows to process discontinuity in the repetition of a subframe bitmap.

Proposal 1: The hyper DFN may be defined to increase the DFN range as much as the amount of $H_{max}$. The V2V subframe index of the logical domain may be provided by (H–DFN*$T_{max}$ DFN) according to which the H-DFN is increased after $T_{max}$ subframe, where H-DFN=0, 1, . . . , $H_{max}$–1.

Proposal 2: $H_{max}$ may be set to the value obtained by dividing $H_{max}*T_{max}$ by the length of the V2V subframe bitmap of a resource pool.

Proposal 3: The current H-DFN may be signaled as part of elements constituting a resource pool from the eNB. And the current H-DFN may also be signaled through the PSBCH.

As another example, in the aforementioned example, $H_{max}$ value (without additional signaling) may be fixed (on the specification) as a predefined value. Here, the $H_{max}$ value may be fixed to "25" (or "a multiple of 25"). Table 4, 5, and 6 show analysis data related to the descriptions above.

TABLE 4

| 1 SLSS SF | | 10176 Bit-map length candidates | | |
|---|---|---|---|---|
| | | 16 | 20 | 100 |
| H_max | 1 | 0 | 16 | 76 |
| | 2 | 0 | 12 | 52 |
| | 3 | 0 | 8 | 28 |
| | 4 | 0 | 4 | 4 |
| | 5 | 0 | 0 | 80 |
| | 6 | 0 | 16 | 56 |
| | 7 | 0 | 12 | 32 |
| | 8 | 0 | 8 | 8 |
| | 9 | 0 | 4 | 84 |
| | 10 | 0 | 0 | 60 |
| | 11 | 0 | 16 | 36 |
| | 12 | 0 | 12 | 12 |
| | 13 | 0 | 8 | 88 |
| | 14 | 0 | 4 | 64 |
| | 15 | 0 | 0 | 40 |
| | 16 | 0 | 16 | 16 |
| | 17 | 0 | 12 | 92 |
| | 18 | 0 | 8 | 68 |
| | 19 | 0 | 4 | 44 |
| | 20 | 0 | 0 | 20 |
| | 21 | 0 | 16 | 96 |
| | 22 | 0 | 12 | 72 |
| | 23 | 0 | 8 | 48 |
| | 24 | 0 | 4 | 24 |
| | 25 | 0 | 0 | 0 |
| | 26 | 0 | 16 | 76 |
| | 27 | 0 | 12 | 52 |
| | 28 | 0 | 8 | 28 |
| | 29 | 0 | 4 | 4 |
| | 30 | 0 | 0 | 80 |
| | 31 | 0 | 16 | 56 |
| | 32 | 0 | 12 | 32 |
| | 33 | 0 | 8 | 8 |
| | 34 | 0 | 4 | 84 |
| | 35 | 0 | 0 | 60 |
| | 36 | 0 | 16 | 36 |
| | 37 | 0 | 12 | 12 |
| | 38 | 0 | 8 | 88 |
| | 39 | 0 | 4 | 64 |
| | 40 | 0 | 0 | 40 |
| | 41 | 0 | 16 | 16 |
| | 42 | 0 | 12 | 92 |
| | 43 | 0 | 8 | 68 |
| | 44 | 0 | 4 | 44 |
| | 45 | 0 | 0 | 20 |
| | 46 | 0 | 16 | 96 |
| | 47 | 0 | 12 | 72 |
| | 48 | 0 | 8 | 48 |
| | 49 | 0 | 4 | 24 |
| | 50 | 0 | 0 | 0 |
| | 51 | 0 | 16 | 76 |
| | 52 | 0 | 12 | 52 |
| | 53 | 0 | 8 | 28 |
| | 54 | 0 | 4 | 4 |
| | 55 | 0 | 0 | 80 |
| | 56 | 0 | 16 | 56 |
| | 57 | 0 | 12 | 32 |
| | 58 | 0 | 8 | 8 |
| | 59 | 0 | 4 | 84 |
| | 60 | 0 | 0 | 60 |
| | 61 | 0 | 16 | 36 |
| | 62 | 0 | 12 | 12 |
| | 63 | 0 | 8 | 88 |
| | 64 | 0 | 4 | 64 |
| | 65 | 0 | 0 | 40 |
| | 66 | 0 | 16 | 16 |
| | 67 | 0 | 12 | 92 |
| | 68 | 0 | 8 | 68 |
| | 69 | 0 | 4 | 44 |
| | 70 | 0 | 0 | 20 |
| | 71 | 0 | 16 | 96 |
| | 72 | 0 | 12 | 72 |
| | 73 | 0 | 8 | 48 |
| | 74 | 0 | 4 | 24 |
| | 75 | 0 | 0 | 0 |
| | 76 | 0 | 16 | 76 |
| | 77 | 0 | 12 | 52 |
| | 78 | 0 | 8 | 28 |
| | 79 | 0 | 4 | 4 |
| | 80 | 0 | 0 | 80 |
| | 81 | 0 | 16 | 56 |
| | 82 | 0 | 12 | 32 |
| | 83 | 0 | 8 | 8 |
| | 84 | 0 | 4 | 84 |
| | 85 | 0 | 0 | 60 |
| | 86 | 0 | 16 | 36 |
| | 87 | 0 | 12 | 12 |
| | 88 | 0 | 8 | 88 |
| | 89 | 0 | 4 | 64 |
| | 90 | 0 | 0 | 40 |
| | 91 | 0 | 16 | 16 |
| | 92 | 0 | 12 | 92 |
| | 93 | 0 | 8 | 68 |
| | 94 | 0 | 4 | 44 |
| | 95 | 0 | 0 | 20 |
| | 96 | 0 | 16 | 96 |
| | 97 | 0 | 12 | 72 |
| | 98 | 0 | 8 | 48 |
| | 99 | 0 | 4 | 24 |
| | 100 | 0 | 0 | 0 |

TABLE 5

| 2 SLSS SF | | 10112 Bit-map length candidates | | |
|---|---|---|---|---|
| | | 16 | 20 | 100 |
| H_max | 1 | 0 | 12 | 12 |
| | 2 | 0 | 4 | 24 |

TABLE 5-continued

| 2 SLSS SF | 10112 Bit-map length candidates | | |
|---|---|---|---|
| | 16 | 20 | 100 |
| 3 | 0 | 16 | 36 |
| 4 | 0 | 8 | 48 |
| 5 | 0 | 0 | 60 |
| 6 | 0 | 12 | 72 |
| 7 | 0 | 4 | 84 |
| 8 | 0 | 16 | 96 |
| 9 | 0 | 8 | 8 |
| 10 | 0 | 0 | 20 |
| 11 | 0 | 12 | 32 |
| 12 | 0 | 4 | 44 |
| 13 | 0 | 16 | 56 |
| 14 | 0 | 8 | 68 |
| 15 | 0 | 0 | 80 |
| 16 | 0 | 12 | 92 |
| 17 | 0 | 4 | 4 |
| 18 | 0 | 16 | 16 |
| 19 | 0 | 8 | 28 |
| 20 | 0 | 0 | 40 |
| 21 | 0 | 12 | 52 |
| 22 | 0 | 4 | 64 |
| 23 | 0 | 16 | 76 |
| 24 | 0 | 8 | 88 |
| 25 | 0 | 0 | 0 |
| 26 | 0 | 12 | 12 |
| 27 | 0 | 4 | 24 |
| 28 | 0 | 16 | 36 |
| 29 | 0 | 8 | 48 |
| 30 | 0 | 0 | 60 |
| 31 | 0 | 12 | 72 |
| 32 | 0 | 4 | 84 |
| 33 | 0 | 16 | 96 |
| 34 | 0 | 8 | 8 |
| 35 | 0 | 0 | 20 |
| 36 | 0 | 12 | 32 |
| 37 | 0 | 4 | 44 |
| 38 | 0 | 16 | 56 |
| 39 | 0 | 8 | 68 |
| 40 | 0 | 0 | 80 |
| 41 | 0 | 12 | 92 |
| 42 | 0 | 4 | 4 |
| 43 | 0 | 16 | 16 |
| 44 | 0 | 8 | 28 |
| 45 | 0 | 0 | 40 |
| 46 | 0 | 12 | 52 |
| 47 | 0 | 4 | 64 |
| 48 | 0 | 16 | 76 |
| 49 | 0 | 8 | 88 |
| 50 | 0 | 0 | 0 |
| 51 | 0 | 12 | 12 |
| 52 | 0 | 4 | 24 |
| 53 | 0 | 16 | 36 |
| 54 | 0 | 8 | 48 |
| 55 | 0 | 0 | 60 |
| 56 | 0 | 12 | 72 |
| 57 | 0 | 4 | 84 |
| 58 | 0 | 16 | 96 |
| 59 | 0 | 8 | 8 |
| 60 | 0 | 0 | 20 |
| 61 | 0 | 12 | 32 |
| 62 | 0 | 4 | 44 |
| 63 | 0 | 16 | 56 |
| 64 | 0 | 8 | 68 |
| 65 | 0 | 0 | 80 |
| 66 | 0 | 12 | 92 |
| 67 | 0 | 4 | 4 |
| 68 | 0 | 16 | 16 |
| 69 | 0 | 8 | 28 |
| 70 | 0 | 0 | 40 |
| 71 | 0 | 12 | 52 |
| 72 | 0 | 4 | 64 |
| 73 | 0 | 16 | 76 |
| 74 | 0 | 8 | 88 |
| 75 | 0 | 0 | 0 |
| 76 | 0 | 12 | 12 |
| 77 | 0 | 4 | 24 |
| 78 | 0 | 16 | 36 |
| 79 | 0 | 8 | 48 |
| 80 | 0 | 0 | 60 |
| 81 | 0 | 12 | 72 |
| 82 | 0 | 4 | 84 |
| 83 | 0 | 16 | 96 |
| 84 | 0 | 8 | 8 |
| 85 | 0 | 0 | 20 |
| 86 | 0 | 12 | 32 |
| 87 | 0 | 4 | 44 |
| 88 | 0 | 16 | 56 |
| 89 | 0 | 8 | 68 |
| 90 | 0 | 0 | 80 |
| 91 | 0 | 12 | 92 |
| 92 | 0 | 4 | 4 |
| 93 | 0 | 16 | 16 |
| 94 | 0 | 8 | 28 |
| 95 | 0 | 0 | 40 |
| 96 | 0 | 12 | 52 |
| 97 | 0 | 4 | 64 |
| 98 | 0 | 16 | 76 |
| 99 | 0 | 8 | 88 |
| 100 | 0 | 0 | 0 |

TABLE 6

| NO SLSS SF | | 10240 Bit-map length candidates | | |
|---|---|---|---|---|
| | | 16 | 20 | 100 |
| H_max | 1 | 0 | 0 | 40 |
| | 2 | 0 | 0 | 80 |
| | 3 | 0 | 0 | 20 |
| | 4 | 0 | 0 | 60 |
| | 5 | 0 | 0 | 0 |
| | 6 | 0 | 0 | 40 |
| | 7 | 0 | 0 | 80 |
| | 8 | 0 | 0 | 20 |
| | 9 | 0 | 0 | 60 |
| | 10 | 0 | 0 | 0 |
| | 11 | 0 | 0 | 40 |
| | 12 | 0 | 0 | 80 |
| | 13 | 0 | 0 | 20 |
| | 14 | 0 | 0 | 60 |
| | 15 | 0 | 0 | 0 |
| | 16 | 0 | 0 | 40 |
| | 17 | 0 | 0 | 80 |
| | 18 | 0 | 0 | 20 |
| | 19 | 0 | 0 | 60 |
| | 20 | 0 | 0 | 0 |
| | 21 | 0 | 0 | 40 |
| | 22 | 0 | 0 | 80 |
| | 23 | 0 | 0 | 20 |
| | 24 | 0 | 0 | 60 |
| | 25 | 0 | 0 | 0 |
| | 26 | 0 | 0 | 40 |
| | 27 | 0 | 0 | 80 |
| | 28 | 0 | 0 | 20 |
| | 29 | 0 | 0 | 60 |
| | 30 | 0 | 0 | 0 |
| | 31 | 0 | 0 | 40 |
| | 32 | 0 | 0 | 80 |
| | 33 | 0 | 0 | 20 |
| | 34 | 0 | 0 | 60 |
| | 35 | 0 | 0 | 0 |
| | 36 | 0 | 0 | 40 |
| | 37 | 0 | 0 | 80 |
| | 38 | 0 | 0 | 20 |

TABLE 6-continued

| NO SLSS SF | 10240 Bit-map length candidates | | |
|---|---|---|---|
| | 16 | 20 | 100 |
| 39 | 0 | 0 | 60 |
| 40 | 0 | 0 | 0 |
| 41 | 0 | 0 | 40 |
| 42 | 0 | 0 | 80 |
| 43 | 0 | 0 | 20 |
| 44 | 0 | 0 | 60 |
| 45 | 0 | 0 | 0 |
| 46 | 0 | 0 | 40 |
| 47 | 0 | 0 | 80 |
| 48 | 0 | 0 | 20 |
| 49 | 0 | 0 | 60 |
| 50 | 0 | 0 | 0 |
| 51 | 0 | 0 | 40 |
| 52 | 0 | 0 | 80 |
| 53 | 0 | 0 | 20 |
| 54 | 0 | 0 | 60 |
| 55 | 0 | 0 | 0 |
| 56 | 0 | 0 | 40 |
| 57 | 0 | 0 | 80 |
| 58 | 0 | 0 | 20 |
| 59 | 0 | 0 | 60 |
| 60 | 0 | 0 | 0 |
| 61 | 0 | 0 | 40 |
| 62 | 0 | 0 | 80 |
| 63 | 0 | 0 | 20 |
| 64 | 0 | 0 | 60 |
| 65 | 0 | 0 | 0 |
| 66 | 0 | 0 | 40 |
| 67 | 0 | 0 | 80 |
| 68 | 0 | 0 | 20 |
| 69 | 0 | 0 | 60 |
| 70 | 0 | 0 | 0 |
| 71 | 0 | 0 | 40 |
| 72 | 0 | 0 | 80 |
| 73 | 0 | 0 | 20 |
| 74 | 0 | 0 | 60 |
| 75 | 0 | 0 | 0 |
| 76 | 0 | 0 | 40 |
| 77 | 0 | 0 | 80 |
| 78 | 0 | 0 | 20 |
| 79 | 0 | 0 | 60 |
| 80 | 0 | 0 | 0 |
| 81 | 0 | 0 | 40 |
| 82 | 0 | 0 | 80 |
| 83 | 0 | 0 | 20 |
| 84 | 0 | 0 | 60 |
| 85 | 0 | 0 | 0 |
| 86 | 0 | 0 | 40 |
| 87 | 0 | 0 | 80 |
| 88 | 0 | 0 | 20 |
| 89 | 0 | 0 | 60 |
| 90 | 0 | 0 | 0 |
| 91 | 0 | 0 | 40 |
| 92 | 0 | 0 | 80 |
| 93 | 0 | 0 | 20 |
| 94 | 0 | 0 | 60 |
| 95 | 0 | 0 | 0 |
| 96 | 0 | 0 | 40 |
| 97 | 0 | 0 | 80 |
| 98 | 0 | 0 | 20 |
| 99 | 0 | 0 | 60 |
| 100 | 0 | 0 | 0 |

As another example, (A) when a bitmap having a pre-defined (or signaled) (specific) length is applied repeatedly to designate a V2X resource pool and/or (B) when a (periodic) transmission resource(s) on the "RESOURCE RESERVATION INTERVAL" (set (or signaled) from the upper layer (of the UE)) is reserved (or selected), (part of) V2X resource designated by the (corresponding) bitmap and/or (part of) (periodic) transmission resource reserved (or selected) (by the V2X TX UE(s)) may be positioned on a WAN communication-related DL (time (or frequency)) resource (for example, "DL SF and/or "(TDD) SPECIAL SF" (and/or "DWPTS")).

Meanwhile, when the UE performs V2X message transmission on a specific carrier, the UE may not perform V2X message transmission by using all of the subframes on the carrier. In this regard, by taking into account a subframe in which the UE does not perform V2X message transmission, an example of a method for transmitting a V2X message will be described with reference to related drawings.

Figure 34:
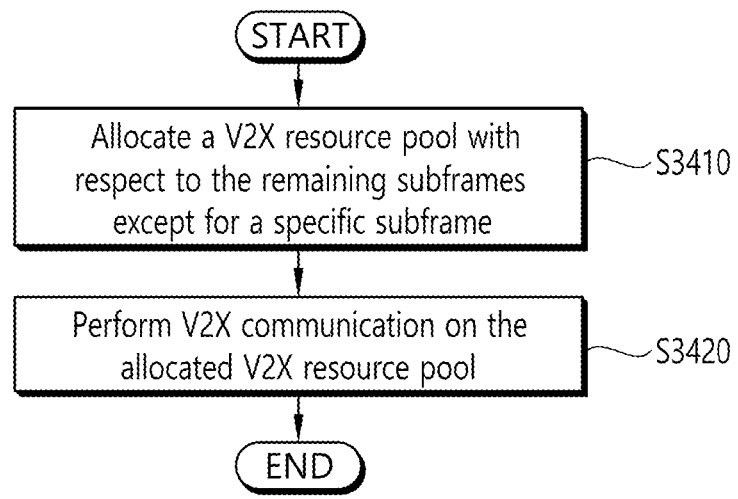
FIG. 34 is a flow diagram of a method for performing V2X communication on an allocated V2X resource pool according to one embodiment of the present invention.

FIG. 34 is a flow diagram of a method for performing V2X communication on an allocated V2X resource pool according to one embodiment of the present invention.

Referring to FIG. 34, the UE may allocate a V2X resource pool to the remaining subframes except for a specific subframe S3410. At this time, the specific subframe may represent (A) SLSS subframe, (B) DL and S (Special) subframe in the case of a TDD shared carrier, or (C) reserved subframes. In what follows, a more specific example in which a subframe excluded from V2X transmission will be described.

(A) About the SLSS Subframe

First, the UE may allocate a V2X resource pool for the remaining subframes except for the SLSS subframe.

More specifically, the SLSS subframe may be excluded from the mapping according to a (repeated) V2V pool bitmap (namely a bitmap (or information) indicating the subframes to which a V2X pool may be allocated), and at this time, the bitmap length may be 16, 20, or 100. The bitmap may define which subframe allows V2V $S_A$ and/or data transmission and/or data reception. An example in which an SLSS subframe is excluded from V2X transmission will be described as follows.

Figure 35:
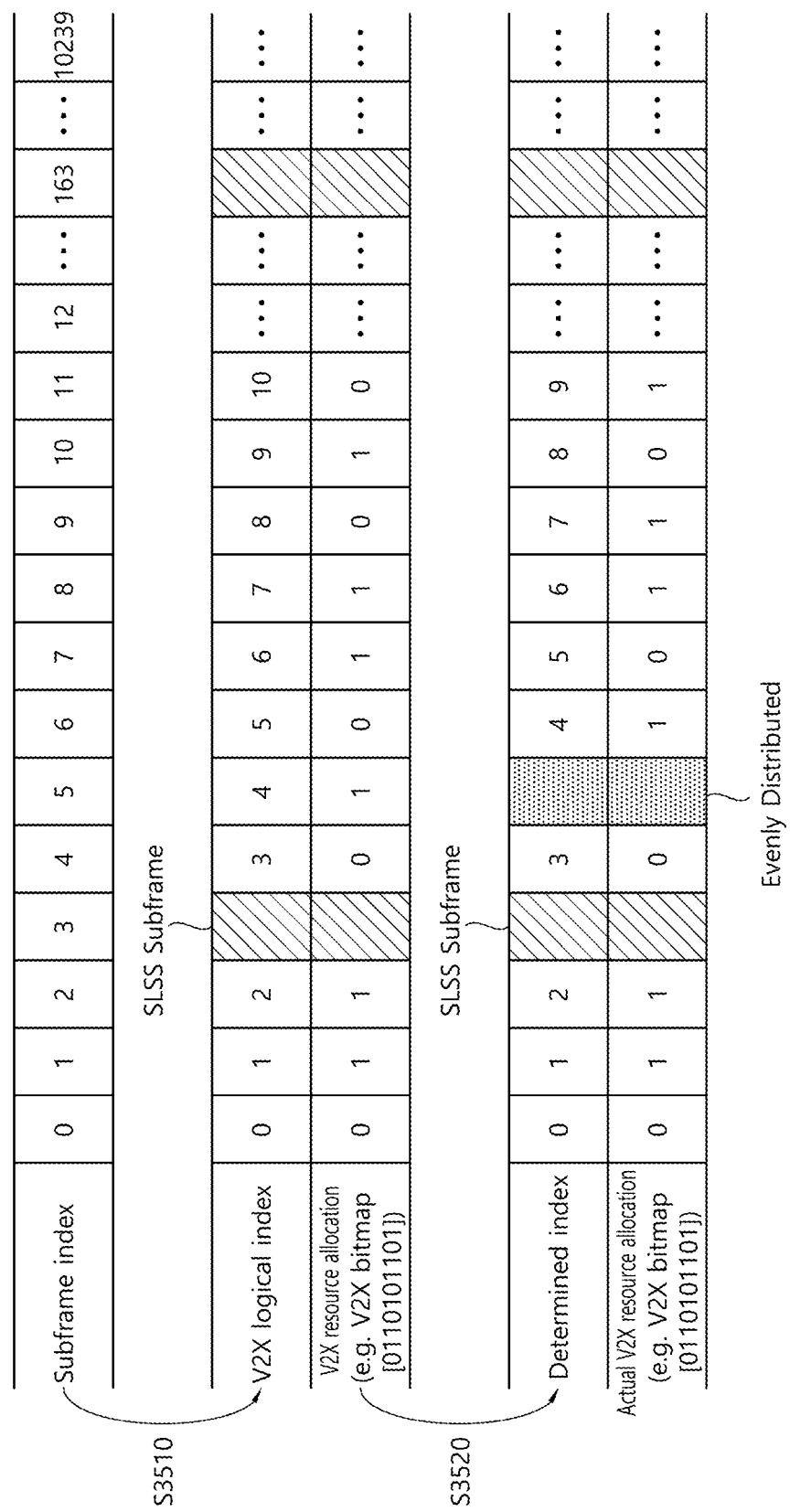
FIG. 35 illustrates an example in which an SLSS subframe is excluded from V2X transmission.

FIG. 35 illustrates an example in which an SLSS subframe is excluded from V2X transmission.

FIG. 35 assumes that the subframe number may have a value of 0, 1, . . . , 10239 (namely, a total of 10240 subframes), a V2X bitmap is repeated in units of 10 subframes, and the V2X bitmap is [0110101101].

When a V2X logical index is allocated, the UE may allocate a V2X logical index with respect to the subframes except for the SLSS subframe. For example, if it is assumed that the subframe index #3, #163, and so on correspond to the SLSS subframe (where the SLSS subframe is repeated in units of 160 subframes), the V2X UE may allocate a V2X logical index to the remaining subframes (namely the remaining subframes except for the SLSS subframe) except for the subframe index #3, #163, and so on (S3510). Here, it may be assumed that a V2X resource is allocated according to the V2X bitmap with respect to the subframe allocated by the V2X logical index.

At this time, the V2X logical index derived through the aforementioned process may not correspond to an integer multiple of the V2X bitmap. For example, when the SLSS subframe is allocated in units of 160 subframes, 64 SLSS subframes may be defined among 10240 subframes as described above, and accordingly, the V2X logical index may be allocated to 10176 subframes corresponding to 10240-10264.

As described above, when it is assumed that the V2X logical index may be allocated to the 10176 subframes, and the V2X bitmap period is 10, the logical index is not divided exactly by the V2X bitmap period. In other words, when a V2X bitmap having a period of 10 is allocated to 10176 subframes, there may be chances that bits are not allocated to 6 subframes.

Therefore, the UE may exclude as many subframes as the number of non-allocated subframes may be excluded from allocation of V2X logical index S3520. At this time, subframes not allocated may be evenly distributed.

(B) About DL and SPECIAL (S) Subframe

In the case of a TDD (shared) carrier, DL and/or SPECIAL (S) subframe may be excluded from the mapping due to a (repeated) V2V full bitmap. An example in which DL and/or SPECIAL (S) subframe is excluded from V2X transmission will be described below with reference to related drawings.

Figure 36:
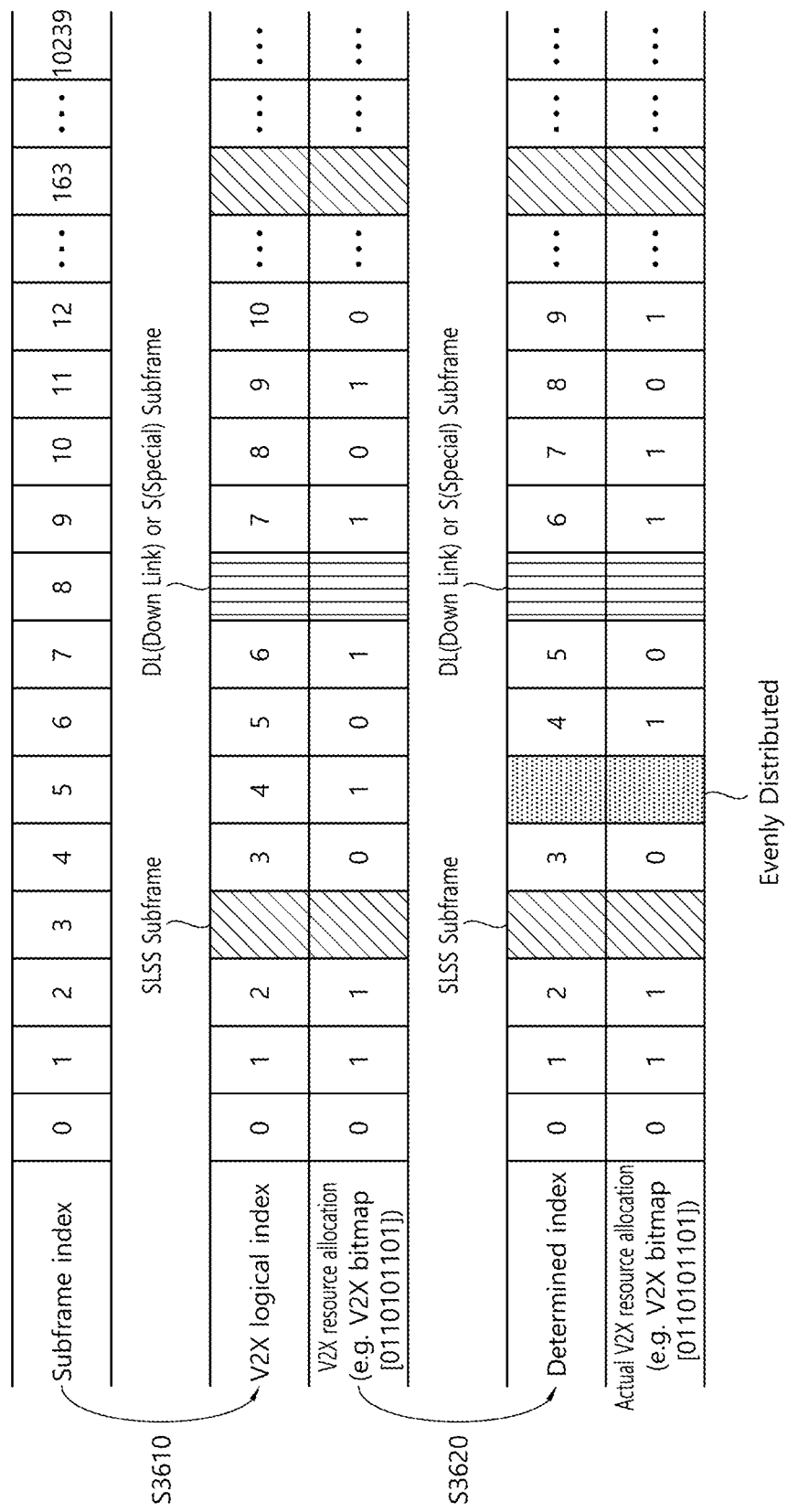
FIG. 36 illustrates an example in which DL and S subframe are excluded from V2X transmission.

FIG. 36 illustrates an example in which DL and S subframe are excluded from V2X transmission.

FIG. 36 assumes that the subframe number may have a value of 0, 1, . . . , 10239 (namely a total of 10240 subframes), the V2X bitmap is repeated in units of 10 subframes, and the V2X bitmap is [0110101101].

When the V2X logical index is allocated, the UE may allocate the V2X logical index to the subframe except for DL and/or SPECIAL (S) subframe (and/or SLSS subframe). For example, if it is assumed that the subframe index #7 (and so on) corresponds to the DL and SPECIAL (S) subframe, the V2X UE may allocated the V2X logical index to the remaining subframes except for the subframe index #7 (and so on) S3610. Here, the UE may allocate a V2X resource according to the V2X bitmap with respect to a subframe allocated by the V2X logical index.

Afterwards, the UE may exclude as many subframes as a number of non-allocated subframes additionally to the allocation of V2X logical index S3520. At this time, non-allocated subframes may be evenly distributed.

(C) The Case of a Reserved Subframe

A resource pool is composed of a plurality of reserved subframes so that the bitmap is repeated an integer number of times within a specific range (for example, D2D Frame Number (DFN) range). For example, the V2X (for example, V2V) logical subframe index may not be allocated to a reserved subframe. Moreover, the position of a reserved subframe may be marked implicitly.

To summarize, the corresponding problem occurs because the bitmap related to the V2X resource pool configuration is applied unconditionally to WAN communication-related DL/UL (time (or frequency)) resources except only for (predefined (or signaled)) V2X SYNC. SIGNAL transmission-related (time (or frequency)) resources (for example, V2X SYNCH. SUBFRAME(s)) (and/or because of the DFN WRAP AROUND problem (or phenomenon). Here, to solve the corresponding problem, the V2X TX UE(s) may be made to (A) assume that (part of) V2X resources (designated by the bitmap) on the WAN communication related DL (time (or frequency)) resources are not valid (in terms of (V2X pool-related) "LOGICAL INDEXING") and/or (B) to skip (V2X message (or TB)) transmission operation for (part of) (periodic) transmission resources reserved (or selected) (by the V2X TX UE(s)) on the WAN communication-related DL (time (or frequency)) resources (and/or instead of skipping the (V2X message (or TB)) transmission operation, the (V2X message (or TB)) transmission operation may be (re)performed on the (closest) valid (or available) V2X resource after the transmission operation. Here, in the former case, (V2X pool-related) "LOGICAL INDEXING" may be regarded as being performed by involving (or excluding) the invalid resource (for example, DL (time (or frequency)) resource) (for example, when transmission timing of a specific period is determined on the "LOGICAL INDEX", a problem in which an actual transmission period becomes (excessively) larger than an intended (target) period may be alleviated). In another example, when a bitmap having a (specific) predefined (or signaled) length is applied repeatedly, the WAN communication-related DL (time (or frequency)) resource (for example, "DL SF" and/or "(TDD) SPECIAL SF" (and/or "DWPTS")) may be (additionally) excluded (for example, it may be regarded that the (V2X pool-related) "LOGICAL INDEXING" is not performed (or applied) to the corresponding resource excluded (additionally)), and the bitmap may be made to be applied (by taking into account only the WAN communication-related UL (time (or frequency)) resource). Here, the rule may be applied limitedly only to the "IN-COVERAGE" environment (and/or TDD system).

Referring again to FIG. 34, the UE may perform V2X communication on an allocated V2X resource pool S2420. A specific example in which the UE performs V2X communication is the same as described above.

In one example, the rule may be extended to be applied to the case where (part of) V2X resources (designated by a bitmap) and/or (part of) (periodic) transmission resources reserved (or selected) (by the V2X TX UE(s)) are positioned not only on the WAN communication-related DL (time (or frequency)) resources but also on the resources with which (predefined (or signaled)) V2X communication is not performed properly (for example, (time (or frequency) resource) in addition to "UL SF" (and/or "UPPTS") (and/or a resource having a relatively higher priority (than the priority related to a V2X message to be transmitted) for which a (specific) V2X channel (or signaling) transmission (or reception) is set).

In another example, the V2X UE(s) (within coverage of an eNB) may be made to transmit an "offset value for the DFN #0 based on GNSS" signaled (or defined) previously (by a (serving) eNB) to other V2X UE(s) (outside the coverage of the eNB) through a predefined channel (for example, PSBCH).

In a yet another example, if I_VALUE (range) value and/or "RESOURCE RESERVATION INTERVAL" (range) value selectable (or allowable) on a V2X resource pool (and/or (V2X) carrier) is limited (in the form of "CARRIER (/POOL)-SPECIFIC NETWORK (PRE)CONFIGURATION"), the V2X TX UE(s) may be made, on the corresponding V2X resource pool (and/or (V2X) carrier), to perform a sensing operation (for example, STEP 5 of Table 2) (and/or energy measurement operation (for example, STEP 8 of Table 2)) on the basis of (A) a period value that may be derived (or calculated) from the minimum value (I_MINVAL) of I_VALUE (or maximum value) (or a (specific) I_VALUE predefined (or signaled)) (for example, "I_MINVAL*P_STEP") and/or (B) the minimum (or maximum) period value of "RESOURCE RESERVATION INTERVAL" (or predefined (or signaled)) (specific) "RESOURCE RESERVATION INTERVAL" value). Here, when a specific V2X resource pool is set (or allowed) only for a P-UE(s) performing V2X message transmission with a relatively long period (for example, "500 ms") (compared with the V-UE(s)) and the aforementioned rule is applied, the P-UE(s) performs a sensing operation (and/or energy measurement operation) based on the (corresponding) period (for example, "500 ms").

Meanwhile, as described above, the UE may select a random value from an interval between 5 and 15 in the case of a relatively long resource reservation period (for example, a resource reservation period longer than 100 ms) (which is called "L_PER") and reserve as many resources as the selected value multiplied by 10. However, applying the resource reservation method described above to the case of using a relatively short resource reservation period (for example, 20 ms or 50 ms (shorter than 100 ms)) (which is called "S_PER") may be inappropriate for an L_PER UE existing in the same resource pool to sense an S_PER UE.

In this regard, if a (relatively) "SHORTER RESOURCE RESERVATION PERIOD (or INTERVAL)" (for example, "20 ms") is employed in order for a UE to support transmission of a V2X message (or traffic) having a (relatively) short period, (part of) the following parameters may be set (or signaled) differently (or independently) (when compared with transmission of a V2X message (or traffic) performed with a (relatively) long period (or a predefined (or signaled) (threshold) period) (for example, "100 ms"). In one example, it may be interpreted that (part of) the following parameters are applied to (A) the case where SHORTP_UE(s) performs a sensing operation and/or (B) the case where LONGP_UE(s) performs a sensing operation (with respect to the SHORTP_UE(s)) (when a V2X UE(s) having a "SHORTER RESOURCE RESERVATION PERIOD (or INTERVAL)" (and/or a V2X UE(s) performing transmission of a V2X message (or traffic) having a (relatively) short period) (SHORTP_UE(s)) and a V2X UE(s) having a "(RELATIVELY) LONGER RESOURCE RESERVATION PERIOD (or INTERVAL)" (and/or a V2X UE(s) performing transmission of a V2X message (or traffic) having a (relatively) long period) (LONGP_UE(s)) co-exist on a predefined (or signaled) (specific) resource pool). In what follows, the present method will be described with reference to related drawings.

Figure 37:
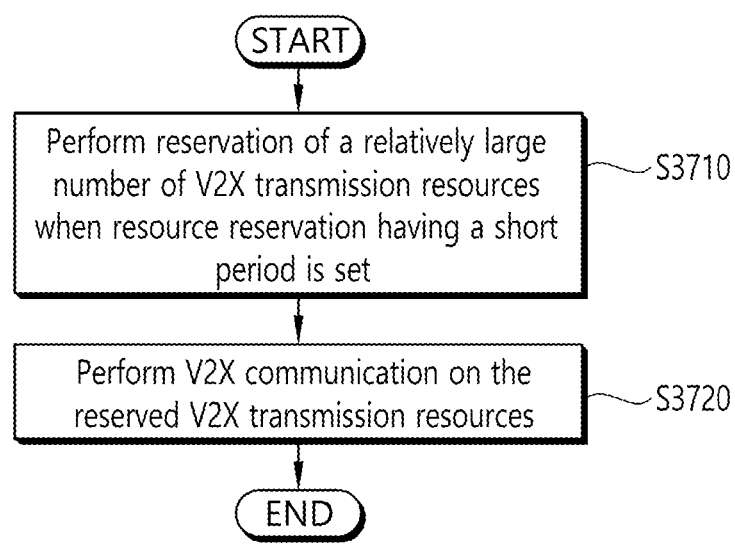
FIG. 37 is a flow diagram of a method for performing reservation of a V2X transmission resource when resource reservation is set with a relatively short period (for example, 20 ms or 50 ms (shorter than 100 ms)) according to one embodiment of the present invention.

FIG. 37 is a flow diagram of a method for performing reservation of a V2X transmission resource when resource reservation is set with a relatively short period (for example, 20 ms or 50 ms (shorter than 100 ms)) according to one embodiment of the present invention.

Referring to FIG. 37, when resource reservation is set with a relatively short period, the UE may perform reservation of a relatively large number of V2X transmission resources S3710. Here, reserving a relatively large number of V2X transmission resources does not indicate selecting a random number from an interval between 5 and 15 and reserving as many resources as the selected value multiplied by 10 as described above, but indicates that the UE selects a random value from an interval between 5*K (where K is a positive integer larger than or equal to 2) and 15*K and reserves as many resources as the selected value multiplied by 10.

In other words, in the case of a relatively short resource reservation period (for example, 20 ms, 50 ms), the aforementioned counter value (a value of 5 or more and 15 or less) is multiplied by 5 or 2, which is further multiplied by 10. Then as many resources as the final multiplication result may be reserved.

For example, if the resource reservation period is '20 ms', the UE may select a random value from the interval of [5*5, 15*5] (in other words, 5*2 or more and 15*5 or less), and as many resources as the random number multiplied additionally by 10 may be reserved. According to the present example, the UE may reserve more than 250 and less than 750 resources.

In another example, if the resource reservation period is '50 ms', the UE may select a random value from the interval of [5*2, 15*2], and as many resources as the random number multiplied additionally by 10 may be reserved. According to the present example, the UE may reserve more than 100 and less than 300 resources.

Example #1

A finite number of subframes (having a resource reservation (interval) period assumed (or used) when transmission resource (re) reservation (or selection) is performed (and/or $C_{resel}$ value of Table 2 (for example, "[10*SL_RESOURCE_RESELECTION_COUNTER]")). Here, in the case of transmission of a V2X message (or traffic) having a (relatively) short period, the corresponding finite number of subframes (having the resource reservation (interval) period) (and/or the $C_{resel}$ value) may be set (or signaled) to have a relatively small number (which, for example, provides an effect of preventing excessive reservation (or selection) of resources from being performed (within a short time period).

Afterwards, the UE may perform V2X communication on the reserved V2X transmission resource S3720. A specific example in which the UE performs V2X communication on the reserved V2X transmission resource is the same as described above.

Figure 38:
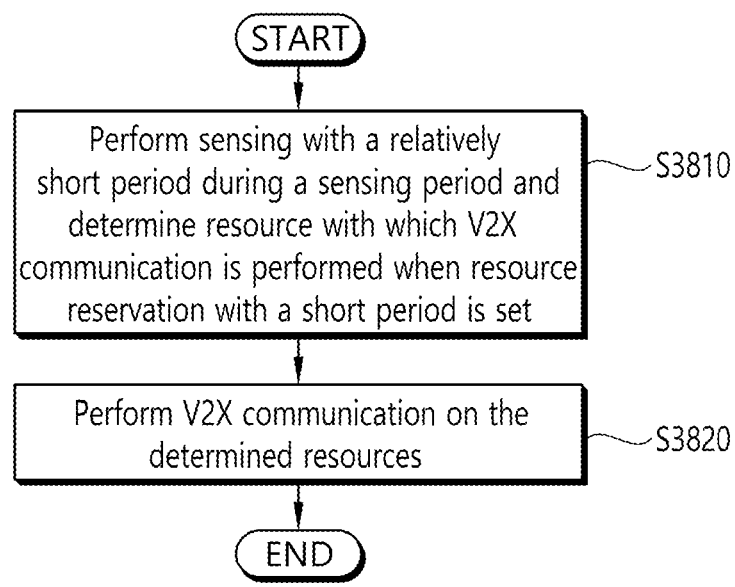
FIG. 38 is a flow diagram of a method for performing sensing with a relatively short period when resource reservation with a short period is set according to one embodiment of the present invention.

FIG. 38 is a flow diagram of a method for performing sensing with a relatively short period when resource reservation with a short period is set according to one embodiment of the present invention.

Referring to FIG. 38, if resource reservation with a short period is set, the UE performs sensing in a sensing period with a relatively short period to determine a resource with which V2X communication is performed S3810. In other words, as described above, if resource reservation with a short period is set (for example, when resource reservation is set with a period shorter than 100 ms), the sensing (namely S-RSSI measurement) period may be set as a resource reservation period used for transmission by the UE. In other words, if resource reservation is set with a short period, the UE may perform sensing according to the short period used for resource reservation. In what follows, the operation above will be described in more detail.

Example #2

The V2X message priority (which, for example, may be set (or signaled) with a relatively low (or high) priority) and/or the "PSSCH-RSRP MEASUREMENT" threshold value in the STEP 5 of Table 2 (and/or "0.2*$M_{total}$"-related coefficient (or ratio) in the STEP 6 (or 8) of Table 2 (which, for example, may be interpreted as a ratio for deriving (or determining) the minimum number of (candidate) resources that have to be remained (in the $S_A$ set) (among all of the (candidate) resources) after the STEP 5 of Table 2 is performed and/or a ratio for deriving (or determining) the (minimum) number of (candidate) resources that have to be remained in the SB set after the STEP 8 of Table 2 is performed)) may be set (or signaled) to have a different (or independent) value and/or the "PSSCH-RSRP MEASUREMENT" increase (for example, "3DB") applied when the minimum number of (candidate) resources that have to be remained within the $S_A$ set (among all of the (candidate) resources) after the STEP 5 of Table 2 is performed is not satisfied and/or the period value (and/or a period value used for energy measurement operation (for example, STEP 8 of Table 2) used for the sensing operation (for example, the STEP 5 of Table 2) (for example, in the STEP 8 of Table 2, the value of "100 ms" may be changed (to a relatively short (or long) value)) may be set (or signaled) to have a different (or independent) value.

Example #3

I_VALUE (range) selectable (or allowable) on a V2X resource pool (and/or (V2X) carrier) and/or P_STEP value

Example #4

(OPEN-LOOP) parameter (or value) related to transmission power (for example, "PO", "ALPHA") and/or V2X resource pool (or carrier)

As another example, the V2X UE(s) may be made to perform (transmission) resource (re)selection as follows.

The V2X UE may select a transmission resource by using the following method.

It is assumed that the UE operates in a mode in which the UE itself performs resource selection. In the aforementioned mode, if resource selection/reselection for V2X message transmission is triggered, the UE may perform sensing and select or reselect a resource on the basis of the sensing result. The UE may transmit scheduling assignment ($S_A$) which indicates the selected or reselected resource.

For example, at the subframe (which may also be called TTI in the following) #n, resource selection or reselection may be triggered for the UE. Then, the UE may perform sensing between the subframe #n−1 and the subframe #n−b (where a>b>0, a and b are integer numbers) and select or reselect resources for V2X message transmission on the basis of the sensing result.

The a and b may be the values set commonly to V2X UEs or the values set independently for individual V2X UEs.

When the a and b are common to V2X UEs, for example, a relationship such as 'a=1000+b' may hold. In other words, if the UE is triggered to select a resource for V2X message transmission by itself, the UE may perform a sensing operation for 1 second (1000 ms=1000 subframes=1000 TTIs).

The UE may consider all of $S_A$ transmissions decoded over the period starting from the subframe #n−a to the subframe #n−b. The decoded $S_A$ may be associated with data transmission over the period starting from the subframe #n−a to the subframe #n−b, where the decoded $S_A$ may consider the data transmitted before the subframe #n−a.

A UE which has failed to perform a sensing operation at the subframe #m may exclude subframes #(m+100*k) from resource selection or reselection (because of such a reason that a signal has to be transmitted from the subframe #m). Meanwhile, the UE may skip the subframes used for transmitting a signal without performing a sensing operation.

After performing the sensing, the UE may select a time or frequency resource for PSSCH, namely a sidelink data channel.

The UE may transmit scheduling assignment ($S_A$) from the subframe #n+c. The c is an integer larger than 0, which may be a fixed value or a variable. The UE may not be requested to transmit scheduling assignment (namely PSCCH transmission) for the subframes the c values of which are smaller than cmin. The cmin may be a fixed value or set by the network.

The scheduling assignment ($S_A$) transmitted from the subframe #n+c may indicate associated data transmitted from the subframe #n+d. d may be an integer larger than or equal to c (d≥c). Both of c and d may be a value smaller than or equal to 100.

Meanwhile, if either of the following conditions is met, reselection of a V2X resource may be triggered.

(A) the Case where the Counter Satisfies a Termination Condition

The counter decreases its value at each transmission of a transmission block and may be reset if reselection is triggered for all of semi-statically selected resource. The reset value may be randomly selected between 5 and 15, for example, with an equal probability.

(B) The Case where Transmission Blocks are not Suitable for the Current Resource Allocation Even if an Allowed Maximum Modulation and Coding Scheme (MCS) is Used (C) The Case where Reselection is Indicated by the Upper Layer Meanwhile, if all of PSCCH or PSSCH transmissions have the same priority, selection or reselection of a PSSCH resource may be performed through the following steps.

(A) Step 1:

First, it is assumed that anyhow, all of the resources are selectable.

(B) Step 2:

Specific resources are excluded on the basis of scheduling assignment decoding and additional conditions. At this time, the UE may select one of the following two options.

The first option excludes the resources indicated or reserved by decoded scheduling assignment and the resources whose DM-RS power received from data resources associated with the scheduling assignment is larger than a threshold value.

The second option excludes the resources indicated or reserved by decoded scheduling assignment and the resources whose energy measured from data resources associated with the scheduling assignment is larger than a threshold value.

(C) Step 3:

The UE may select a V2X transmission resource among the resources which has not been excluded.

For example, after measuring and ranking the remaining PSSCH resources on the basis of total received energy, the UE may select a subset. The UE may compare the energy of currently selected resources with the energy in the subset, and if the energy in the currently selected resources is larger than a threshold value with respect to the energy in the subset, select one from among the subset. The UE may randomly select one resource from among the subset.

Similarly, after measuring and ranking the remaining PSSCH resources on the basis of total received energy, the UE may select a subset. The UE may randomly select one resource from among the subset.

Similarly, after measuring and ranking the remaining PSSCH resources on the basis of total received energy, the UE may select a subset. The UE may randomly select a resource which minimizes fragmentation of frequency resources from among the subset.

In one example, when the (transmission) resource (re)selection operation is performed according to Table 2, the following (partial) rules may be applied additionally.

[Proposed Rule #10]

In one example, according to the 'LATENCY (or QoS) REQUIREMENT' (and/or 'PRIORITY' and/or 'SERVICE TYPE') of a (generated) packet (to be transmitted), it may be interpreted as '(D or C−M)' ((maximum (or minimum)) range) (which, for example, may be interpreted as 'TX RESOURCE (RE)SELECTION DURATION (or RANGE or WINDOW)') (for example, 'M' is a '(LOW LAYER) buffer' (and/or the time point at which a (generated) packet (or message) (to be transmitted) (on the 'PDCP LAYER') arrives (or is received) (or the time point at which a packet (or message) is generated); also, (here) 'D (or C)' wording may indicate that a resource (re)selection (or reservation) operation is triggered (exceptionally) differently (which, for example, may be regarded as the transmission time point of (initial) data (PSSCH) (or control information (PSCCH)) after SUBFRAME #N). In another example, the 'C' and/or 'D' ((maximum (or minimum)) range) (which, for example, may be interpreted as 'TX RESOURCE (RE)SELECTION DURATION (or RANGE or WINDOW)') has to be determined to satisfy (or by taking into account) the 'LATENCY (or QoS) REQUIREMENT' which may differ according to the 'SERVICE TYPE' (and/or 'PRIORITY LEVEL'). Here, the 'UPPER LIMIT (or LOWER BOUND)' of 'C' and/or 'D' (which, for example, may be interpreted as 'TX RESOURCE (RE)SELECTION DURATION (or RANGE or WINDOW)') may not be fixed. Here, the corresponding 'UPPER LIMIT (or LOWER BOUND)' may be set (or signaled) differently according to 'PRIORITY LEVEL' (and/or 'SERVICE TYPE' and/or 'LATENCY (or QoS) REQUIREMENT'). Here, if a currently selected 'D' value (or 'SUBFRAME #D') has a problem in satisfying the 'LATENCY (or QoS) REQUIREMENT' of a newly arrived (or generated (or received)) packet (or message), a (transmission) resource (re)selection operation may be triggered. In one example, the maximum (and/or minimum) or range (which, for example, may be interpreted as 'TX RESOURCE (RE)SELECTION DURATION (or RANGE or WINDOW)') of the 'D' (and/or 'C') value may be determined by taking into account the '(LOW LAYER) buffer' (and/or the time point at which a (generated) packet (or message) (to be transmitted) (on the 'PDCP LAYER') arrives (or is received) (or the time point at which a packet (or message) is generated) ('M') and/or the time point at which the (transmission) resource (re)selection operation is triggered (as a predefined (or signaled) condition is satisfied) ('N') and/or 'LATENCY REQUIREMENT' ('L') (for example, '100 ms') and/or 'PPPP' of a packet (or message) (for example, when a (partially) different 'PPPP' value is set (or allowed) for each packet (or message) of different 'LATENCY REQUIREMENT'). As one specific example, the maximum (and/or minimum) value of 'D' (and/or 'C') may be determined by '(L−ABS(M−N))' or 'MIN(L, (L−ABS(M−N)))' (where, for example, 'MIN(X, Y)' and 'ABS(Z)' represent a function returning the minimum value between 'X' and 'Y' and a function returning the absolute value of 'Z', respectively) or the range of 'D' (and/or 'C') may be designated by '(L−ABS(M−N))<D(/C)<100 (or 'LATENCY REQUIREMENT')' (or '(L−ABS (M−N))≤D (/C)≤100 (or 'LATENCY REQUIREMENT')'). In one example, considering retransmission of a specific (one) 'TB (or packet or message)', when the maximum value (and/or minimum value) of 'D' (and/or 'C') value is calculated (or determined), a predefined (or signaled) 'MARGIN (or OFFSET)' value ('MAG_VAL') may have to be subtracted from the 'L' value. When the corresponding rule is applied, the maximum (and/or minimum value) of 'D' (and/or 'C') value may be determined as '((L−MAG_VAL)−ABS(M−N))' or 'MIN((L−MAG_VAL), ((L−MAG_VAL)−ABS(M−N)))'. Here, the 'MAG_VAL' value may have 'DEPENDENCY' on the number of retransmissions (for example, the 'MAG_VAL' value is increased as the number of retransmissions is increased). The rule may be applied limitedly only for a case where the '(transmission) resource (re) selection operation' is triggered (according as a (predefined (or signaled)) condition is satisfied), and a (generated) packet (or message) (to be transmitted) exists on the '(LOW LAYER) buffer' (and/or 'MCP LAYER') (or when a packet (or message) is generated). In another example, when a (generated) packet (or message) (to be transmitted) does not exist on the '(LOW LAYER) buffer' (and/or 'MCP LAYER') although the '(transmission) resource (re)selection operation' is triggered (according as a (predefined (or signaled)) condition is satisfied) (or when there is no generated packet (or message)), the (transmission) resource (re)selection operation may be performed by assuming (or considering) that '(N=M)' (which, for example, may be interpreted that the time at which the (transmission) resource (re)selection option is triggered ('N') is assumed (or considered) to be the time ('M') at which a (generated) packet (or message) (to be transmitted) is received on the '(LOW LAYER) buffer' (and/or 'MCP LAYER')) or by deferring the (transmission) resource (re)selection operation until a (generated) packet (or message) (to be transmitted) arrives (or is received) actually on the 'MCP LAYER' (or until a packet (or message) is actually generated) or by assuming that a (generated) packet (or message) (to be transmitted) has arrived (or has been received) (or exists) on the 'PDCP LAYER' (previously including (or not including) the 'N' time point) (or a packet (or message) has been generated). As another example, subsequent resources including (or not including) the time point corresponding to the maximum value (for example, '(L−ABS(M−N))', '100 (or 'LATENCY REQUIREMENT')') of the (aforementioned) 'D' (and/or 'C') are assumed (or considered) as unavailable and may be made to be excluded (from (re)selectable candidate resources) (on the 'STEP 3 (or 2)'). In an additional example, resources at the time point (for example, resources before the time point including (or not including) '(C+C_MIN)' (or resources between 'N' time point and '(C+C_MIN)' time point (here, in one example, the resources corresponding to the 'N' time point and '(C+C_MIN)' time point may be included (or may not be included)))) corresponding to the minimum value (C_MIN) (for example, the 'minimum value' may be determined (for example, '4 ms') by taking into account the 'PROCESSING TIME' of the UE) of 'C' (and/or 'D') (where, for example, the time point 'C' may be interpreted as the time point at which transmission of the (first) control (or scheduling) information (PSCCH) is performed after the (transmission) resource (re)selection operation is triggered ('N')) is assumed (or considered) to be unavailable and may be made to be excluded from (re)selectable candidate resources (on 'STEP 2 (or 3)'. In a still another example, according to (part of) the proposed rule of the present invention (for example, [Proposed Rule #1] and [Proposed Rule #10]), when the 'TX RESOURCE (RE)SELECTION DURATION (or RANGE or WINDOW)' ((maximum (or minimum) range) is set (or changed) differently by taking into account 'PRIORITY LEVEL' (and/or 'SERVICE TYPE' and/or 'LATENCY (or QoS) REQUIREMENT'), the following (partial) parameters related to the sensing operation (and/or (transmission) resource (re)selection (or reservation) operation (and/or V2X message transmission)) according to whether a predefined condition is satisfied. Here, the (corresponding) condition may be defined as (A) the case in which a V2X message with the 'LATENCY REQUIREMENT' shorter (or longer) than a predefined (or signaled) threshold is transmitted (and/or the case in which a V2X message with the 'PPPP' higher (or lower) than a predefined (or signaled) threshold is transmitted), and/or (B) the case in which a number of (selectable) (candidate) resources (for example, subframes) less (or more) than a predefined (or signaled) threshold exist (or remain) within the 'TX RESOURCE (RE)SELECTION DURATION (or RANGE or WINDOW)' (and/or the case in which the minimum (or maximum) value of the 'TX RESOURCE (RE)SELECTION DURATION (or RANGE or WINDOW) is smaller (or larger) than a predefined (or signaled) threshold value.

Example #10-1

In the case of a V2X message having 'LATENCY REQUIREMENT' shorter (or longer) than the (V2X message-related) PPPP value (or range) (for example, a predefined (or signaled) threshold), the corresponding transmission may be secured by selecting a relatively high (or low) PPPP value (or range). Here, in the case of transmission based on a high (or low) PPPP value (or range), whether a resource employed by other UE for the corresponding transmission is selectable (or IDLE or BUSY) is determined on the basis of a relatively low (or high) PSSCH-RSRP threshold value (and/or in the case of a V2X message having the 'LATENCY REQUIREMENT' longer (or shorter) than predefined (or signaled) threshold, even if the 'LATENCY REQUIREMENT' has the same PPPP value (or range), by setting (or signaling) a relatively low (or high) PSSCH-RSRP threshold value, V2X message transmission having the 'LATENCY REQUIREMENT' shorter (or longer) than a predefined (or signaled) threshold value may be secured). And/or when the minimum ratio (or number) of candidate (transmission) resources that need to be remained (and/or the corresponding ratio (or number) of remaining candidate (transmission) resources) is smaller than a predefined (or signaled) threshold value after the candidate (transmission) resource exclusion operation based on a sensing operation execution interval (or period) and/or a ((maximum (or minimum)) period (or range) from which a candidate (transmission) resource may be selected (SELECTION WINDOW) and/or a range from which a random value is determined (or selected) to define a maintenance interval of a (re)selected (or reserved) resource (and/or a coefficient multiplied to the corresponding selected random value (for deriving the CRESEL value [1/2/3]) and/or resource reservation period and/or PSSCH-RSRP threshold value, when the minimum ratio (or number) of candidate (transmission) resources that needs to be remained after the candidate (transmission) resource exclusion operation based on the offset value added to the (related) PSSCH-RSRP threshold value and/or S-RSSI is smaller than a predefined (or signaled) threshold value, when a V2X message having the 'LATENCY REQUIREMENT' shorter (or longer than) a (predefined (or signaled) threshold value), for example, is transmitted, (and/or a V2X message having the 'PPPP' higher (or lower) than a predefined (or signaled) threshold value is transmitted and/or when a number of (selectable) (candidate) resources less (or more) than a predefined (or signaled) threshold exist (or remain) within the 'TX RESOURCE (RE)SELECTION DURATION (or RANGE or WINDOW)' and/or when the minimum (or maximum value) of the 'TX RESOURCE (RE)SELECTION DURATION (or RANGE or WINDOW)' is smaller (or larger) than a predefined (or signaled) threshold, when (A) the minimum ratio (or the minimum number) of candidate (transmission) resources that have to be remained after a candidate (transmission) resource exclusion operation based on the PSSCH-RSRP threshold value is performed and/or (B) the ratio (or the number) of the corresponding remaining candidate (transmission) resources is smaller than a predefined (or signaled) threshold value, the minimum ratio (or the minimum number) of candidate (transmission) resources that have to be remained after the candidate (transmission) resource exclusion operation based on the offset value added to the (related) PSSCH-RSRP threshold value and/or (C)S-RSSI is performed may be set to a relatively high value (which, for example, brings an effect of relieving the increase of probability of collision). And/or CBR threshold value used for determining whether a (sub)-channel is BUSY (or IDLE) and/or a RADIO-LAYER PARAMETER SET allowed (or restricted) (for each PPPP/CBR) (for example, maximum transmission power, the number (range) of retransmissions per TB, MCS value (or range), maximum limit (CR_LIMIT) of OCCUPANCY RATIO, and so on) [1/2/3].

[Proposed Rule #11]

In one example, the '(TIMER) EXPIRATION CONDITION' related to (transmission) resource (re)selection may be defined as a condition where (part of) the following conditions are satisfied (simultaneously). In one example, the present rule may be interpreted that only when (part of) the following conditions are satisfied simultaneously, (actually) (it is considered (or assumed) that the (transmission) resource (re)selection operation has been triggered), the V2X UE(s) is made to perform the (transmission) resource (re)selection operation.

Example #11-1

The case where the counter value (which decreases by a predefined value (for example, '1') for each TB transmission) is changed to '0' (and/or a 'negative integer value').

Example #11-2

The case where there exists a (generated (or received)) packet (or message) (to be transmitted) on the '(LOW LAYER) buffer' (and/or 'PDCP LAYER') (and/or the case where a packet (or message) is generated)

[Proposed Rule #12]

In one example, while the counter value (which decreases by a predefined value (for example, '1') for each TB transmission) satisfies the 'EXPIRATION CONDITION' (for example, the case where the counter value is changed to '0' (and/or a 'negative value')) (and/or (according as a predefined (or signaled) condition is satisfied), the '(transmission) resource (re)selection operation' is triggered), if there is no (generated (or received)) packet (or message) (to be transmitted) on the '(LOW LAYER) buffer' (and/or 'PDCP LAYER') (or if a packet (or message) has not been generated), the V2X UE(s) may be made to assume that (the most recent) packet (or message) reaches (or generates (or receives)) the 'INTERVAL (or PERIODICITY)' observed previously (or recently), and if it happens that a problem (for example, the case in which the (re)selected (transmission) resource does not satisfy the 'LATENCY (or QoS) REQUIREMENT') actually occurs (afterwards) after the (transmission) resource (re)selection is performed, to perform the (transmission) resource (re)selection operation additionally.

In one example, according to the following method (along with the rules described in Table 2), a V2X UE(s) may be made to perform (transmission) resource (re)reservation.

d may be a value less than or equal to $d_{max}$. $d_{max}$ may be determined depending on the priority such as UE, data, or service type.

The UE may inform of whether to reuse a frequency resource for a signal transmitted from the subframe #n+d for potential transmission of other transmission block at the subframe #n+e. Here e is an integer, and d<e. The UE may inform of whether to reuse the frequency resource explicitly or implicitly. The e value may be one value or a plurality of values. Also, additionally, the UE may inform that subsequent to the subframe #n+e, the frequency resource for a signal transmitted from the subframe #n+d will not be used.

A receiving UE receiving a V2X signal decodes scheduling assignment ($S_A$) transmitted by a transmitting UE transmitting a V2X signal. At this time, it may be assumed that the same frequency resource may be reserved at the subframe #n+d+P*j (j=i, 2*i, . . . , J*i) due to the scheduling assignment. The P may be a value of 100. The J value may be explicitly signaled by the scheduling assignment or a fixed value. The i value may be signaled explicitly by the scheduling assignment, or a predetermined value or a fixed value. Similarly, the i value may be an integer between 0 and 10.

[Proposed Rule #13]

In one example, since the V2X TX UE(s) is made to signal the "I" value (refer to the aforementioned I) through $S_A$ (field), the V2X RX UE(s) becomes able to figure out at which time point the V2X TX UE(s) (additionally) reserves (or uses) the same frequency resource indicated (or scheduled) through the (corresponding) $S_A$ (for example, when the V2X TX UE signals "I" value as "2", the V2X RX UE(s) assumes that the same frequency resource indicated (or scheduled) through the (corresponding) $S_A$ on the "TTI #(N+D)" and "TTI #(N+D+2*P)" has been reserved). In what follows, for the convenience of description, it is assumed that the "I" value is selected (4 bits) from a predefined (or signaled) range of "[0, 1, . . . , 10]" and/or "J" value is fixed to "1" (refer to the aforementioned J). In one example, when it is difficult for the V2X TX UE(s) to accurately predict (its) V2X MESSAGE generation period as the V2X MESSAGE generation period is changed according to the predefined parameter (for example, velocity or amount of (movement) direction change), it may not be efficient to reserve a (future) resource according to the method. As one method to solve the corresponding problem, when a specific V2X TX UE(s) signals the "I" value (on the $S_A$ field) as "2", it is assumed that the same frequency resource (HARD_RSC) indicated (or scheduled) through the (corresponding) $S_A$ on the "TTI #(N+D)" and "TTI #(N+D+2*P)" has been reserved in a "explicit (or hard)" manner, but the same frequency resource (SOFT_RSC) (indicated (or scheduled) through the (corresponding) $S_A$) at the time point (for example, "TTI #(N+D+1*P)", "TTI #(N+D+3*P)", "TTI #(N+D+4*P)", "TTI #(N+D+5*P)", "TTI #(N+D+6*P)", "TTI #(N+D+7*P)", "TTI #(N+D+8*P)", "TTI #(N+D+9*P)", "TTI #(N+D+10*P)") based on (not signaled through the $S_A$ (field)) the remaining "I" values has been reserved in a "POTENTIAL (or SOFT)" manner. Here, in one example, the corresponding rule (and/or SOFT_RSC reservation) may be applied only for a (predefined or signaled) specific RESOURCE ALLOCATION MODE (which, for example, may not be applied for RESOURCE SELECTION based on the MODE 1 and/or RANDOM RESOURCE SELECTION (or PARTIAL SENSING) of P-UE). When the corresponding rule is applied, the V2X TX UE(s) may be made to apply a predefined (or signaled) different (DM-RS POWER or ENERGY MEASUREMENT) threshold value when the HARD_RSC and SOFT_RSC of other V2X TX UE(s) (determined on the basis of $S_A$ decoding) are determined whether they are selectable candidate resources or resources to be excluded according to the "DM-RS POWER or ENERGY MEASUREMENT" value (STEP 2 of Table 2). In one example, a HARD_RSC-related threshold (HARD_TH) may be set (or signaled) to be lower (or higher) than that (SOFT_TH) of a SOFT_RSC (which, for example, may be interpreted that the HARD_RSC is protected with a relatively higher priority than the SOFT_RSC). Here, the SOFT_RSC-related threshold may be set (or signaled) in the form of an offset value (HARD_THOFF) with respect to the HARD_RSC (and/or the HARD_TH-related threshold may be set (or signaled) in the form of an offset value (SOFT_THOFF) with respect to the SOFT_RSC). Here, in one example, (A) if the HARD_THOFF is set (or signaled) to "0", other V2X TX UE(s) determines whether to exclude the HARD_RSC and SOFT_RSC (of the corresponding V2X TX UE(s)) (STEP 2 of Table 2) at the same priority according to the "DM-RS POWER/ENERGY MEASUREMENT" value (or interprets that the (corresponding) V2X TX UE(s) attempts to reserve the same frequency resource (set or scheduled through the (corresponding) $S_A$) on the time point based on all of the "I" values), (B) if the HARD_THOFF is set (or signaled) to the "infinity (or relatively large value)", other V2X TX UE(s) always (or with a very high probability) determines (STEP 2 of Table 2) the SOFT_RSC (of the corresponding V2X TX UE(s)) as a selectable candidate resource. Here, in one example, (A) V2X MESSAGE PRIORITY of other V2X TX UE(s) discovered from $S_A$ decoding (and/or V2X MESSAGE PRIORITY that the V2X TX UE(s) itself attempts to transmit) and/or (B) the (corresponding) threshold value (for example, HARD_TH and SOFT_TH) for each (measured) "CONGENSTION LEVEL" (or offset value (for example, HARD_THOFF (or SOFT_THOFF)) set (or signaled) differently) and/or (C) V2X MESSAGE PRIORITY of other V2X TX UE(s) figured out from $S_A$ decoding (and/or V2X MESSAGE PRIORITY that the V2X TX UE(s) itself attempts to transmit) and/or (D) the (corresponding) threshold (for example, HARD_TH and SOFT_TH) (or offset value (for example, HARD_THOFF (SOFT_THOFF))) may be adjusted according to the "CONGESTION LEVEL". Here, by applying a predefined (or signaled) different offset value to the "DM-RS POWER/ENERGY MEASUREMENT" value related to the HARD_RSC and SOFT_RSC of other V2X TX UE(s) (determined from $S_A$ decoding), the V2X TX UE(s) may determine whether the HARD_RSC and SOFT_RSC are selectable candidate resources or resources to be excluded (STEP 2 of Table 2). Here, the HARD_RSC related offset value (for example, it is assumed as a "negative integer") may be set (or signaled) larger (or smaller) than that of the SOFT_RSC (for example, it may be interpreted that the HARD_RSC is protected with a relatively high priority compared with the SOFT_RSC). Here, only the offset value with respect to the SOFT_RSC (or HARD_RSC)-related "DM-RS POWER/ENERGY MEASUREMENT" value may be set (or signaled). Here, in one example, (A) V2X MESSAGE PRIORITY of other V2X TX UE(s) discovered from $S_A$ decoding (and/or V2X MESSAGE PRIORITY that the V2X TX UE(s) itself attempts to transmit) and/or (B) the (corresponding) offset value set (or signaled) differently for each (measured) "CONGENSTION LEVEL" and/or (C) V2X MESSAGE PRIORITY of other V2X TX UE(s) figured out from $S_A$ decoding (and/or V2X MESSAGE PRIORITY that the V2X TX UE(s) itself attempts to transmit) and/or (D) the (corresponding) threshold may be adjusted according to the "CONGESTION LEVEL". When the V2X TX UE(s) selects (or reserves) $S_A$ TX-related resources, with respect to the $S_A$ transmission resource(s) associated with the data transmission(s) on the HARD_RSC and SOFT_RSC of other V2X TX UE(s) (determined from $S_A$ decoding), by applying a predefined (or signaled) different "DM-RS POWER/ENERGY MEASUREMENT" threshold value (in the same manner), the V2X TX UE(s) may be made to determine whether the HARD_RSC and SOFT_RSC are selectable ($S_A$) candidate resources or ($S_A$) resources to be excluded. Here, (A) the "TIME GAP" (range) between the $S_A$ transmission time and the associated data transmission time may be set (or signaled) differently according to in which resource type (for example HARD_RSC and SOFT_RSC) the corresponding data is transmitted and/or (B) data related (transmission) power value (or (transmission) power control parameter) transmitted through a different resource type (and/or (maximum allowable) MSC value) may be set (or signaled) differently (or independently). In one example, the V2X message transmission period of the PEDESTRIAN UE (P-UE) (for example, "1000 ms") may be set (or signaled) to be relatively long compared with that of a VEHICLE UE (V-UE) (for example, "100 ms") (by taking into account the relatively low movement speed and/or a need for battery saving). Here, when the P-UE transmits a V2X message, the "I" value on the $S_A$ field is made to indicate a predefined (or signaled) specific value (or "RESERVED STATE") and therefore, other V2X RX UE(s) may be made to interpret that (A) the (corresponding) $S_A$ (and/or associated data) transmission has been performed by the P-UE and/or (B) to interpret that the (scheduled) resource based on $S_A$ has been reserved with a predefined (or signaled) (different) period (relatively long (compared to the case of a V-UE).

[Proposed Rule #14]

In one example, (A) if a plurality of (SIDELINK (SL)) SPS PROCESS (or CONFIGURATION) (related to different services and/or V2X MESSAGE PRIORITY) is being operated at the same time (or being activated), the V2X TX UE(s) may be defined to exclude resources (where a resource may be interpreted as a subframe in this case) related to other previously (or already) selected (SL) SPS PROCESS (or CONFIGURATION) from (selectable) candidate resources (STEP 2 of Table 2) when a specific (SL) SPS PROCESS (or CONFIGURATION) related transmission resource is selected and/or (B) a predefined (or signaled) synchronization signal (PRIMARY SIDELINK SYNCHRONIZATION SIGNAL (PSSS)/SECONDARY SIDELINK SYNCHRONIZATION SIGNAL (SSSS)) (and/or PHYSICAL SIDELINK BROADCAST CHANNEL (PSBCH)) transmission (time (or frequency)) resource (for example, "subframe") may be defined to be excluded from (selectable) candidate resources (STEP 2 of Table 2).

[Proposed Rule #15]

In one example, if the V2X (TB) transmission operation is skipped at a specific time point according to a predefined (or signaled) "(DROPPING) PRIORITY" (for example, "WAN UL TX(s)" (and/or synchronization signal transmission (resource)") and the V2X (MESSAGE) TX(s) are overlapped (partly or completely) with each other in the time (or frequency) region, the resource reselection-related counter (Table 2) value may be defined to be decreased blindly (and/or defined to trigger a resource reselection operation). In one example, if the "SYNCHRONIZTION SOURCE" of the V2X TX UE(s) is changed, the V2X TX UE(s) may be defined so that the resource reselection operation is triggered (and/or the resource reselection operation may be defined to be triggered only when a difference between the changed "SYNCHRONIZATION SOURCE" related time (or frequency) synchronization value and the existing "SYNCHRONIZATION SOURCE" related (time (or frequency) synchronization) value is larger than a predefined (or signaled) (maximum allowable) threshold value). In one example, if the "SYNCHRONIZATION SOURCE" of the V2X TX UE(s) is changed, the V2X TX UE(s) may be defined so that the transmission resource is selected (or reserved) randomly (when the remaining "LATENCY" value is less than a predefined (or signaled) threshold) (for example, a randomly selected resource is defined to be used only for transmission of a predefined (or signaled) number of "TRANSPORT BLOCKs (TBs)", after which the "TB" transmission is performed through sensing-based selected (or reserved) resources) and/or (B) the transmission resource may be defined to be selected (or reserved) after a sensing operation is performed during a predefined (or signaled) (time) period. Here, in one example, the V2X TX UE(s) may be made to perform a sensing operation with respect to a plurality of (other) "SYNCHRONIZATION SOURCE" related communication (based on a predefined (or signaled) value) (including the current "SYNCHRONIZATION SOURCE"), and if one of the plurality of "SYNCHRONIZATION SOURCE" is changed, a transmission resource may be selected (or reserved) by using the corresponding (changed "SYNCHRONIZATION SOURCE"-related) sensing result.

[Proposed Rule #16]

In one example, the V2X UE(s) may be defined to report (independently) (A) capability of simultaneous reception (or transmission) of a few of carriers synchronized with each other (in time (or frequency)) (or whose synchronization difference (in time (or frequency)) is less than a predefined (or signaled)) threshold value) and/or to report capability of simultaneous reception (or transmission) of a few of carriers having different synchronization from each other (in time (or frequency)) (or synchronization difference (in time (or frequency)) is larger than a predefined (or signaled) threshold value). In one example, a (serving) eNB which has received the (capability) information may take into account the capability of the (corresponding) V2X UE(s) and set (or signal) an appropriate number of carriers for the purpose of V2X communication (reception (or transmission)). In one example, in the case of MODE 1 V2X communication, the (serving) eNB may signal related information (to the V2X UE(s)) so that V2X TX operation may be performed with a different MCS (range) value and/or a different number of RESOURCE BLOCKs (RBs) and/or a different number of (HARQ) retransmissions according to the absolute speed of the V2X UE(s) and/or "SYNCHRONIZATION SOURCE TYPE (for example, GNSS and ENB)". Here, in one example, the (serving) eNB may set (or signal) the "location-based pool size" information differently according to the speed (or range) to the V2X UE(s) (within the coverage of the (serving) eNB) and make the V2X UE(s) perform V2X communication by applying (or using) the "location-based pool size" information corresponding to the speed of the V2X UE(s).

[Proposed Rule #17]

In one example, (by taking into account (A) HARQ COMBINING operation with respect to reception of different REDUNDANCY VERSION (RV) (data) and/or (B) PSCCH payload size (increase) required for (time) resource position information signaling related to data (re)transmission), the V2X TX UE(s) may make a plurality (NUM_RETX) of specific (one) TB-related data (re)transmission-related time resources selected within a predefined (or signaled) window (LIM_TIMEWIN). Here, if the corresponding rule is applied, the V2X TX UE(s) may be made to perform a sensing-based resource (re)selection operation according to the (part of) the following method (for example, the STEP 2 or 3 of Table 2). Here, the LIM_TIMEWIN value may be adjusted (or set (or signaled) differently) according to (a) V2X MESSAGE PRIORITY that the V2X TX UE(s) attempts to transmit and/or (B) (measured) CONGESTION LEVEL and/or (C) V2X MESSAGE (or SERVICE)-related TARGET LATENCY (or RELIABILITY) REQUIREMENT.

Example #17-1

In one example, among (non-excluded) resources (NO-EX_RSC) derived from performing the STEP 2 (of Table 2)

(for example, OPTION 2-1), if (specific TB-related) NUM_RETX data (re)transmission-related time resources are not (all) selectable within the LIM_TIMEWIN (or the number of candidates that may be selected within the LIM_TIMEWIN is less than a predefined (or signaled) threshold), (A) (specific TB-related) NUM_RETX data (re) transmission is defined to be (all) skipped and/or (B) (specific TB-related) data (re)transmission is defined to be performed (partly) by using only (the maximum number of) time resources that may be selected within the LIM_TIMEWIN and/or (C) (specific TB-related) NUM_RETX data (re)transmission-related time resources are defined to be selected (for example, if there is no selectable candidate within the FLIM_TIMEWIN, resource selection may be skipped) within an additionally predefined (or signaled) window (FLIM_TIMEWIN) (to be used (or applied) to this particular case) (for example, "FLIM_TIMEWIN>LIM_TIMEWIN") and/or (D) the PSSCH DM-RS RSRP THRESHOLD value (related to resource exclusion) of STEP 2 (of Table 2) may be defined to be increased by a predefined (or signaled) offset value until (specific TB-related) NUM_RETX data (re)transmission-related time resources are (all) selected within the LIM_TIMEWIN (or FLIM_TIMEWIN) (or until the number of candidates that may be selected within LIM_TIMEWIN becomes larger than a predefined (or signaled) threshold). In one example, (after STEP 2 (of Table 2) is performed (according to the rule)), when (specific TB-related) NUM_RETX data (re)transmission-related time resources are selected according to a predefined rule (for example, random selection) among resources of which the PSSCH DM-RS RSRP value in the lower (or upper) X % on the STEP 3 (of Table 2) has been measured, if (part of) selected time resources do not exist within the LIM_TIMEWIN (or FLIM_TIMEWIN), it may be defined so that (A) reselection is performed (until the corresponding condition is satisfied) and/or (B) (specific TB-related) NUM_RETX data (re)transmission is (all) skipped and/or (C) (specific TB-related) data (re)transmission is performed (partly) by using only the time resources located within the LIM_TIMEWIN (or FLIM_TIMEWIN).

[Proposed Rule #18]

In one example, the PSCCH DM-RS related CYCLIC SHIFT (CS) (and/or OCC) value is fixed to a predefined (or signaled) (specific) value (for example, "CS INDEX=0", "OCC=[+1+1]"). Here, if the corresponding rule is applied, and the PSCCH transmission resources are (partly) overlapped between different V2X TX UE(s), PSCCH-related reception performance may not be guaranteed. Here, to alleviate the corresponding problem, the V2X TX UE(s) may be made to select (one) CS (and/or OCC) value according to a predefined rule (for example, random selection) within a predefined (or signaled) CS SET (and/or OCC SET). Here, the CS (INDEX) SET may be set (or signaled) to "CS INDEX 0, 3, 6, 9". Here, the V2X RX UE(s) (since it does not know exactly which value the V2X TX UE(s) has selected) performs blind detection (BD) operation with respect to the (all) CS (and/or OCC) within the corresponding CS SET (and/or OCC SET). In one example, the CS (and/or OCC) value that the V2X TX UE(s) selects within the CS SET (and/or OCC SET) may be defined to be randomized (or hopped) by a function (or equation) having an input parameter (or seed value) such as (A) (V2V) subframe (or slot) index and/or (B) V2X TX UE ID or (TARGET) V2X RX UE ID) and/or (C) (X bit) ID transmitted on the PSCCH (and/or the CS SET (and/or OCC SET) (configuration) of the V2X TX UE(s) may be defined to be randomized (or changed) by a function (or equation) having an input parameter (or seed value) such as (D) (V2V) subframe (or slot) index and/or (E) V2X TX UE ID or (TARGET) C2X RX UE ID) and/or (F) (X bit) ID transmitted on the PSCCH. Here, the CS SET (and/or OCC SET) (configuration) may be set (or signaled) differently according to the V2X MESSAGE PRIORITY (that the V2X TX UE(s) attempts to transmit) and/or (measured) CONGESTION LEVEL. In one example, (if the aforementioned rule is applied), to reduce the complexity related to (PSCCH DM-RS) CS (and/or OCC) BD operation of the V2X RX UE(s), the maximum number of BD (that the V2X RX UE(s) has to perform within one subframe) may be set (or signaled) (from a (serving) eNB). In one example, the V2X UE(s) may be made to report the maximum number of BD that the V2X UE(s) may perform within one subframe (to the (serving) eNB) through predefined signaling. In one example, the PSCCH SCRAMBLING SEQUENCE GENEATOR may be initialized according to a (predefined (or signaled)) (all) CS (and/or OCC) values within the CS SET (and/or OCC SET) (and/or predefined (or signaled) C_INIT value (for example, "510")) selected by the V2X TX UE(s). (If the corresponding rule is applied) a CS field (for example, "3 bit") may be defined on the PSCCH, and the corresponding CS field value may be designated (in the same manner) by (one) CS value (SELCS_VAL) selected according to a predefined rule (for example, random selection) within the CS SET predefined (or signaled) by the V2X TX UE(s) (and/or by using a value derived (or calculated) by a predefined (randomization (or hopping)) function having an input parameter of the SELCS_VAL value), and according to the corresponding (designated) CS field value, the PSSCH DM-RS CS value (associated with the PSCCH) may be set (or determined). Here, if the corresponding rule is applied, and interference on the PSCCH DM-RS (CS) has been relieved (or randomized), the interference on the (associated) PSSCH DM-RS (CS) may be relieved (or randomized) (in the same manner). In one example, (if the aforementioned rule is applied), the PSSCH DM-RS value (associated with PSCCH) (instead of additionally defining a CS field (for example, "3 bit") on the PSCCH) may be set (in the same manner) by (one) PSCCH DM-RS CS value (SELCS_VAL) selected according to a predefined rule (for example, random selection) within the CS SET predefined (or signaled) by the V2X TX UE(s) (and/or by using a value derived (or calculated) by a predefined (randomization (or hopping)) function having an input parameter of the SELCS_VAL value). Here, the PSCCH SCRAMBLING SEQUENCE GENEATOR may be initialized according to a CS field value (on the PSCCH) (and/or V2X TX UE ID (on the PSCCH) (or (TARGET) V2X RX UE ID (or ID of X bits)) and/or (V2V) subframe (or slot) index).

In one example, when V2V communication is performed, PSCCH and/or (associated) PSSCH-related (A) (DM-RS) SEQUENCE GENERATION RULE and/or (B) (DM-RS) CS (or OCC) INDEX SELECTION (or DETERMINATION) RULE and/or (C) GROUP or SEQUENCE HOPPING RULE may be defined as shown in Table 7 and 8. In one example, (part of) the following proposed methods describe methods for efficiently performing (DM-RS) SEQUENCE (or CS (or OCC) INDEX) (and/or interference) randomization operation when PSCCH and/or PSSCH transmission resources between different UEs are (partly or completely) overlapped with each other.

In what follows, with reference to Table 7 and 8, when V2V communication is performed, examples of PSCCH and/or (associated) PSSCH-related (A) (DM-RS)

SEQUENCE GENERATION RULE and/or (B) (DM-RS) CS(/OCC) INDEX SELECTION(/DETERMINATION) RULE and/or (C) GROUP/SEQUENCE HOPPING RULE are described. At this time, V2C WI support only normal CPs, and a destination ID may not be delivered through $S_A$. Moreover, the 16 CRC bits from $S_A$ may be used for generating a PSSCH DMRS sequence and data scrambling sequence.

TABLE 7

| Parameter | | PSCCH |
|---|---|---|
| Group hopping | | disabled |
| | u | 8 |
| Sequence hopping | $n_{cs, \lambda}$ | Disabled |
| Cyclic shift | | Chosen randomly out of {0, 3, 6, 9} by a transmitter, The chosen value is applied to a II DMRSs for SA within a subframe |
| Orthogonal sequence | $\lfloor w^\lambda(0)\ w^\lambda(1)\ w^\lambda(2)\ w^\lambda(3) \rfloor$ | [+1 +1 +1 +1] |
| Reference signal length | $M_{sc}^{RS}$ | $M_{sc}^{PSCCH}$ |
| Number of layers | $\upsilon$ | 1 |
| Number of antenna ports | P | 1 |

Here, $r_{PSSCH}^{(\lambda)}(m \cdot M_{sc}^{RS} + n) = w^{(\lambda)}(m) r_{u,v}^{(\alpha_\lambda)}(n)$, m=0, 1, 2, 3

TABLE 8

| Parameter | | PSSCH |
|---|---|---|
| Group hopping | | enabled |
| | $n_{ID}^{RS}$ | $n_X$ |
| | $n_s$ | $2n_{ss}^{PSSCH} + k$, k = 0,1 |
| | $f_{ss}$ | $\lfloor n_X/16 \rfloor \bmod 30$ |
| Sequence hopping | | disabled |
| Cyclic shift | $n_{cs, \lambda}$ | $\lfloor n_X/2 \rfloor \bmod 8$ |
| Orthogonal sequence | $\lfloor w^\lambda(0)\ w^2(1)\ w^3(2)\ w^4(3) \rfloor$ | [+1 +1 +1 +1] if $n_X \bmod 2 = 0$ [+1 -1 +1 -1] if $n_X \bmod 2 = 1$ |
| Reference signal length | $M_{sc}^{RS}$ | $M_{sc}^{PSSCH}$ |
| Number of layers | $\upsilon$ | 1 |
| Number of antenna ports | P | 1 |

Here, $r_{PSSCH}^{(\lambda)}(m \cdot M_{sc}^{RS} + n) = w^{(\lambda)}(m) r_{u,v}^{(\alpha_\lambda)}(n)$, m=0, 1, 2, 3, and $n_x$ represents X bits in $S_A$ used for generating a PSSCH DMRS sequence.

[Proposed Rule #19]

In one example, predefined (or signaled) (or randomly selected) 2 bits may be scrambled with a selected PSCCH CS index (or value) (for example, "2 bit") among bits (field) used for determining (associated) PSSCH DM-RS CS index (or value) (for example, 3 bits of "$C_{12}, C_{13}, C_{14}$" among 16 bit CRC of PSCCH ($C_0, C_1, C_{15}$)). In one example, when the aforementioned rule is applied, (A) the (final)16 bit CRC of the PSCCH may be kept (or applied) to the "$C_0, C_1, \ldots C_{15}$" value (for example, it is considered (or assumed) that only the CRC (and/or bit (field)) used for determining the (associated) PSSCH DM-RS CS index (or value) is changed by the (corresponding) SCRAMBLING operation) and/or (B) a 16 bit CRC (part of) which has been changed due to the (corresponding) SCRAMBLING operation may become the (final) CRC of the PSCCH. In one example, 2 LSB (for example, when the corresponding rule is applied, the PSSCH DM-RS OCC index (or value) may also be changed) (or MSB) bits (and/or predefined (or signaled) (or randomly selected) 2 bits at specific positions) among the 16 bit CRC ($C_0, C_1, C_{15}$) of the PSCCH may be scrambled with the selected PSCCH CS index (or value) (for example, "2 bit"). In one example, when the aforementioned rule is applied, (A) the 16 bit CRC (part of) which has been changed due to the (corresponding) scrambling operation may become the (final) CRC of the PSCCH and/or (B) the (final) 16 bit CRC of the PSCCH is kept (or applied) to the "$C_0, C_1, \ldots C_{15}$" value (for example, it is considered (or assumed) that only the CRC (and/or bit (field)) used for determining the (associated) PSSCH DM-RS CS index (or value) is changed by the (corresponding) SCRAMBLING operation). In one example, (different) 16 bits intended for scrambling are predefined (or signaled) for each PSCCH CS index (or value) (for example, "2 bit"), and the UE is made to scramble (A) the selected PSCCH CS index (or value) and associated 16 bits meant for scrambling ($S_0, S_1, \ldots, S_{15}$) and (generated) 16 bit CRC ($C_0, C_1, \ldots C_{15}$) of the PSCCH, the (corresponding) scrambling result ($W_0, w_1, \ldots W_{15}$) is made to become the final 16 bit CRC of the PSCCH and/or (B) the (final) 16 bit CRC of the PSCCH is kept (or applied) to the "$C_0, C_1, \ldots C_{15}$" value, but only the 16 bit CRC (and/or bit (field)) used for determining the (associated) PSSCH DM-RS CS index (or value) may be used (or assumed) as the "$W_0, W_1, \ldots, W_{15}$" value (and/or 3 bits of "$W_{12}, W_{13}, W_{14}$" from the "$W_0, W_1, \ldots, W_{15}$").

In one example, (A) the SCI FORMAT configuration field(s) used for the MODE 2 V2V SCHEDULING (MODE2_SCH) operation and/or (B) the DCI FORMAT configuration field(s) used for MODE 1 DYNAMIC V2V SCHEDULING (MODE1_DYN) operation may be defined as follows. In one example, in the FRA_INRETX field (similarly to the LVRB form of the existing LTE system), RESOURCE INDICATION VALUE (RIV) value may be defined to inform of the (PSSCH transmission-related) (A) start sub-channel index (or position) information (SUB_START) and/or length (or number) information about the sub-channel allocated (or positioned) continuously (in the frequency domain) (SUB_LENGTH). In one example, when two times of PSSCH transmission is set (or signaled) for specific (one) TB transmission, (A) the SUB_START value may be interpreted as the start index (or position) information (SECDATA_SUBST) of a sub-channel in which the second PSSCH transmission is performed, and/or (B) the SUB_LENGTH value may be interpreted as the sub-channel length (or number) information (SFDATA_SUBLN) used for the first and the second PSSCH transmission. Here, the start index (or position) information (FIRDATA_SUBST) of a sub-channel in which the first PSSCH transmission is performed (instead of being signaled directly through the FRA_INRETX field) may be made to be figured out implicitly by the RX UE through (one-to-one) mapping (or linkage) relationship between a predefined (or signaled) "((blindly) detected) (first) PSCCH resource index (or position) information" and "start index (or position) information of a sub-channel in which the (associated) (first) PSSCH transmission is performed".

In what follows, examples of (A) the SCI FORMAT configuration field(s) used for MODE2 SCH operation and/or (B) the DCI FORMAT configuration field(s) used for MODE1 DYN operation will be described.

SCI may include 1) PRIORITY: 3 bit, 2) resource reservation: 4 bit, 3) MCS: 5 bit, 4) CRC: 16 bit, 5) retransmission index (RETX_INDEX): 1 bit, 6) time gap (TGAP_INI- RETX) between transmission start and retransmission: 4 bit, 7) frequency resource position (FRA_INRETX) of the transmission start and retransmission: 8 bit, and 8) reserved bits (RSV_BIT): 7 bit.

DCI may include 1) CIF: 3 bit, 2) minimum index of a sub-channel allocated for transmission start (PSCCH RA): 5 bit, 3) time gap between transmission start and retransmission (as $S_A$ contents): 4 bit, and 4) frequency resource position (FRA_INRETX) of the transmission start and retransmission: 8 bit.

[Proposed Method #20]

In one example, if one-time PSSCH transmission is set (or signaled) for specific (one) TB transmission, part of the information of (the aforementioned) FRA_INRETX field becomes unnecessary (for example, "SECDATA_SUBST related information"). (In other words) in one example, the (only) information needed for the corresponding case is sub-channel length (or number) information (FDATA_SUBLN) used for the first PSSCH transmission. Here, the (corresponding) unnecessary information-related STATE (or value) and/or bits may be defined according to (part or all of) the following rules.

Example #20-1

In one example, (A) when it is assumed that a maximum of 20 sub-channels may be set (or signaled) as a (V2V) resource pool (on one subframe), the number of bits required to express FDATA_SUBLN information is "5" bit (namely "CEILING $(LOG_2(20))=5$" (here, as one example, CEILING (X) is a function which returns the least information value greater than or equal to X)) and/or (B) when it is assumed that K sub-channels are set (or signaled) as a (V2V) resource pool (on one subframe), the number of bits required to express FDATA_SUBLN information becomes "CEILING $(LOG_2(K))$". Here, in one example, when two times of PSSCH transmission is set (or signaled) for specific (one) TB transmission, and the (required) FRA_INRETX field size is assumed to be "Q" bit (for example, "Q=8"), the remaining bits of "(Q−5)" (and/or "(Q−CEILING $(LOG_2 (K))$)") may be interpreted (or considered) as unnecessary information-related bits.

Example #20-2

In one example, if two times of PSSCH transmission is set (or signaled) for specific (one) TB transmission, and the (required) FRA_INRETX field size is assumed to be "Q" bit, a plurality of (predefined (or signaled)) (part or all of) SECDATA_SUBST value which may be designated together with an (actually needed) specific (one) FDATA_SUBLN (or SFDATA_SUBLN) value may be interpreted (or considered) as unnecessary information-related STATE (or value).

Example #20-3 if one-time PSSCH transmission is set (or signaled) for specific (one) TB transmission, since the V2X RX UE(s) is capable of determining whether the (corresponding) V2X TX UE performs one or two times of PSSCH transmission (with respect to a specific (one) TB) through the TGAP_INIRETX field, the RETX_INDEX related STATE (or value) may be interpreted (or regarded) as unnecessary information. In another example, if one-time PSSCH transmission is set (or signaled) for specific (one) TB transmission, the RETX_INDEX related value (or STATE) may be designated by a predefined (or signaled) (specific) value (or STATE). Here, in one example, (RETX_INDEX related) corresponding (specific) value (or STATE) may be used for "VIRTUAL CRC" applications.

Example #20-4

In one example, part of predefined (or signaled) bits among the RSV_BIT field-related bits (for example, "7 bit") may be interpreted (or regarded) as the unnecessary information-related bits (or value).

In one example, according to (part of) the following rule, by randomizing the (aforementioned) unnecessary information-related STATE (or value) and/or bit, the PSSCH (DM-RS) SEQUENCE (or CS (or OCC) INDEX) collision problem which occurs when PSSCH transmission resources of different UEs are (partly or completely) overlapped with each other may be relieved (for example, (through the corresponding operation) the PSCCH CRC is randomized, and due to the randomization, (finally) the PSSCH (DM-RS) SEQUENCE (or CS (or OCC) INDEX) is randomized). In one example, the case in which the aforementioned unnecessary information-related STATE (or value) and/or bit is occurred (for example, the case where one-time PSSCH transmission is set (or signaled) for specific (one) TB transmission) is only an example, and (part or all of) the proposed method of the present invention may be extended to be applied for various cases (in which unnecessary information-related STATE (or value) and/or bit is occurred) (for example, (in the case of MODE1_DYN_DCI_FORMAT and/or MODE2_SCH_SCI_FORMAT), (additional) extra bits obtained as the FRA_INRETX size is changed according to the total number of sub-channels (K) comprising a (predefined (or signaled)) V2V resource pool (within one subframe) (for example, "(8−CEILING $(LOG_2 (K·(K+1)/2))$ (FRA_INRETX size))" (and/or "(8−CEILING $(LOG_2 (K·(K+1)/2))$ (FRA_INRETX size)−CEILING $(LOG_2 (K))$ (PSCCH RA size))")) (and/or with respect to a predefined (or signaled) (target) payload size (for example, the (target) payload sizes of the MODE1_DYN_FORMAT and the MODE2_SCH_SCI_FORMAT may become the (existing) DCI FORMAT 0 payload size (refer to the descriptions above) and 48 bit (refer to the descriptions above), respectively), (additional) extra bits generated as the FRA_INRETX size is changed may be regarded as the unnecessary information-related bits). In one example, through the corresponding randomization operation (of the unnecessary information-related STATE (or value) and/or bit), the 16-bit CRC of the PSSCH ($C_0, C_1, \ldots, C_{15}$) is randomized (or changed), and finally the PSSCH DM-RS CS (or SEQUENCE or OCC) (index) is also randomized (or changed) (refer to Table 7 and/or Table 8). Here, in one example, application of (part of) the following rule to the (additional) extra bits generated as (A) (the aforementioned) (Example #20-3) and/or (B) (Example #20-4) and/or (C) FRA_INRETX size are changed according to the total number of sub-channels (K) comprising a (predefined (or signaled)) V2V resource pool (within one subframe) may be limited to the case where the total number of sub-channels comprising a V2V resource pool is set below a predefined (or signaled) value (for example, "1") (which, for example, may be interpreted as a situation in which additional randomization of PSSCH DMRS (or PSCCH CRC) is difficult to be derived (through the corresponding field) as the FRA_INRETX field size is reduced (for example, "0")).

(Rule #20-1)

In one example, the TX UE may set the (aforementioned) unnecessary information-related STATE (or value) and/or bit to a randomly selected value (and/or a predefined (or signaled) value by the (serving) eNB (or network)). Here, a condition for applying this rule for each of the (aforementioned) unnecessary information-related STATE (or value) and/or bit (for example, (Example #20-1), (Example #20-2), (Example #20-3), (Example #20-4)) may be defined (or signaled) differently. Here, since the (actually used) FRA_INRETX size becomes "0" when the number of sub-channels set (or signaled) as a resource pool (for V2X communication) is "1" (and/or when one-time PSSCH transmission is set (or signaled) for specific (one) TB transmission), the rule is applied to the unnecessary information-related STATE (or value) and/or bit of (Example #20-3) (for example, RETX_INDEX-related STATE (or value)) and otherwise (for example, the case where the number of sub-channels set (or signaled) as a resource pool (for V2X communication) is not "1" (and/or larger than "1") (and/or the case where one-time PSSCH transmission is set (or signaled) for specific (one) TB transmission)), the rule may be applied to the unnecessary information-related STATE (or value) and/or bit of (Example #20-2) (for example, a plurality of (predefined (or signaled)) (part or all of) SEC-DATA_SUBST value (or STATE) which may be designated together with (actually needed) specific (one) FDATA_SU-BLN value). Here, in one example, (under a situation in which one-time PSSCH transmission is performed for specific (one) TB transmission), irrespective of the number of sub-channels set (or signaled) as a resource pool (for V2X communication), the rule is made to be applied for the unnecessary information-related STATE (or value) and/or bit of (Example #20-3) (for example, RETX_INDEX related STATE (or value)), and only for the case in which the number of sub-channels set (or signaled) as a resource pool (for V2X communication) is not "1" (and/or larger than "1"), the rule may be applied to the unnecessary information-related STATE (or value) and/or bit of (Example #20-2) (for example, a plurality of (predefined (or signaled)) (part or all of) SECDATA_SUBST value (or STATE) which may be designated together with (actually needed) specific (one) FDATA_SUBLN value).

(Rule #20-2)

In one example, the TX UE may set the (aforementioned) unnecessary information-related STATE (or value) and/or bit to (A) TX (or (target) RX) UE ID and/or (B) the value derived (or calculated) by a predefined (randomization (or hopping)) function having a selected PSCCH CS index (or value) (for example, "2 bit") as an input parameter or (C) TX (or (target) RX) UE ID and/or (D) a value derived from a selected PSCCH CS index (or value) (for example, "2 bit"). In one example, if the (aforementioned) unnecessary information-related bit is defined in the form of (Example #20-1), and "(Q-5)" (and/or "(Q-CEILING(LOG$_2$(K)))") (for example, "Q=8" and "K=20") is larger than the bit value (PC_SELSBIT) (for example, "2 bit") representing the selected PSCCH CS index (or value), (A) among "(Q-5)" (and/or "(Q-CEILING(LOG$_2$(K)))") bits, (bit) positions which have to be designated for the PC_SELCSBIT bit (or value) (or bit (or value) derived as the PC_SELCSBIT bit) are set (or signaled) and/or (B) the remaining bits (for example, "1" bit) of "(Q-5-PC_SELCSBIT)" (and/or "(Q-CEILING(LOG$_2$(K))-PC_SELCSBIT)") may be padded with zeros (or set to a predefined (or signaled) specific value).

In one example, if one-time PSSCH transmission is set (or signaled) for specific (one) TB transmission, the (aforementioned) FRA_INRETX field size may be reduced (exceptionally) (for example, "(Q-5)", "(Q-CEILING(LOG$_2$ (K)))").

In one example, (if the PSSCH (associated with PSCCH) is transmitted in the form of "FDM"), the PSCCH CRC used for determining parameters such as (DM-RS) SEQUENCE (or CS (or OCC) INDEX) related to the PSSCH transmitted at a specific time point may be defined as the PSCCH CRC transmitted at the same time point with the PSSCH (and/or PSCCH CRC transmitted (always) together for PSSCH transmission).

Since examples of the proposed methods described above may also be included as implementation methods of the present invention, it is apparent that the examples may also be regarded as a kind of proposed methods. Also, although the proposed methods above may be implemented independently, they may be implemented in the form of a combination (or merge) of part of the proposed methods. In one example, although the present invention describes the proposed methods on the basis of the 3GPP LTE system for the convenience of descriptions, the range of systems to which the proposed methods are applied may be expanded to include other systems in addition to the 3GPP LTE system. As one example, the proposed methods of the present invention may be extended to be applied for D2D communication. Here, in one example, D2D communication refers to communication performed by a UE directly to other UE using a radio channel, where in this example, the UE means a terminal of the user; however, when a network device such as an eNB transmits or receives a signal to and from a UE according to a communication method, the eNB may also be regarded as a kind of UE. Also, as one example, the proposed methods of the present invention may be applied limitedly only to the MODE 2 V2X operation (and/or MODE 1 V2X operation). Also, in one example, the proposed methods of the present invention may be applied limitedly only for a case where the '(transmission) resource (re)selection operation' is triggered (according as a (predefined (or signaled)) condition is satisfied), and a (generated) packet (or message) (to be transmitted) exists on the '(LOW LAYER) buffer' (and/or 'PDCP LAYER') (or when a packet (or message) is generated) (and/or when a (generated) packet (or message) (to be transmitted) does not exist on the '(LOW LAYER) buffer' (and/or 'PDCP LAYER') (or when a packet (or message) is not generated)). Also, in one example, the proposed methods of the present invention may be applied limitedly only for a case where the PSSCH (associated with the PSCCH) is not positioned (or positioned) at the neighboring RS(s) on the same subframe. Also, in one example, the proposed methods of the present invention may be extended to be applied not only for the V2V MODE 1 (or MODE 2) DYNAMIC SCHEDULING operation but also V2C MODE 1 (or MODE 2) SEMI-PERSISTENT SCHEDULING (SPS) operation (and/or V2X MODE 1 (or MODE 2) DYNAMIC SCHEDULING operation and/or V2X MODE 1 (or MODE 2) SPS operation). Also, in one example, "transmission resource selection" in the present invention may be (extended to be) interpreted as "transmission resource (re)reservation".

Figure 39:
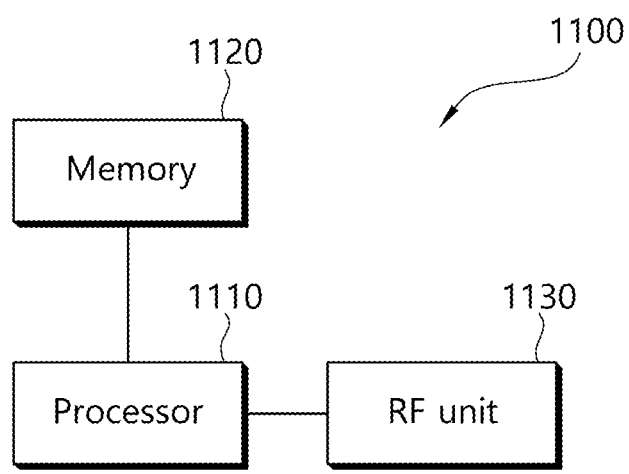
FIG. 39 is a block diagram of a UE in which an embodiment of the present invention is implemented.

FIG. 39 is a block diagram of a UE in which an embodiment of the present invention is implemented.

Referring to FIG. 39, the UE 1100 comprises a processor 1110, a memory 1120, and a Radio Frequency (RF) unit 1130.

According to one embodiment, the processor 1110 may embody the function, operation, or method of the present invention. For example, the processor 1110, performing sensing during a UE-specific sensing period, may select a resource with which to perform V2X communication and perform V2X communication on the basis of the selected resource.

For example, the processor 1110 may select a resource with which to perform V2X communication within a range satisfying the latency requirement and perform V2X communication on the basis of the selected resource.

For example, the processor 1110 may perform sensing in units of sub-channels having the size corresponding to the size of a sub-channel used for V2X message transmission, select a resource with which to perform the V2X message transmission, and perform V2X message transmission on the basis of the selected resource.

For example, the processor 1110 may perform reservation of a finite number of resources with which V2X communication is performed and perform the V2X communication on the finite number of resources.

For example, the processor 1110 determines whether a resource reselection condition is satisfied, and if the resource reselection condition is satisfied, performs reselection of a resource with which V2X (Vehicle-to-X) communication is performed, and perform the V2X communication on the basis of the selected resource.

For example, the processor 1110 may select a subframe excluding subframes related to the subframe in which transmission is performed during a sensing period from a sensing window and perform V2X communication on the basis of the selected subframe.

For example, the processor 1110 may allocate a V2X resource pool with respect to the remaining subframes except for a specific subframe and perform V2X communication on the allocated V2X resource pool.

The RF unit 1130, being connected to the processor 1110, transmits and receives a radio signal.

The processor may include Application-Specific Integrated Circuit (ASIC), other chipsets, logical circuit and/or data processing device. The memory may include Read-Only Memory (ROM), Random Access Memory (RAM), flash memory, memory card, storage medium and/or other storage device. The RF unit may include a baseband circuit to process a radio signal. When embodiments are implemented by software, the methods described above may be implemented by a module (process, function, and so on) which performs the functions described above. A module may be stored in the memory and executed by the processor. The memory may be installed inside or outside the processor and may be connected to the processor via various well-known means.

What is claimed is:

1. A method of performing a sidelink operation in a wireless communication system, the method performed by a user equipment (UE) and comprising:
   determining a sidelink resource set based on a candidate resource set and a candidate resource,
   wherein the candidate resource is excluded from the candidate resource set,
   wherein a time unit index of the candidate resource is determined based on a time unit index of a specific time unit in which the sidelink operation is performed within a sensing window of the UE; and
   performing the sidelink operation based on the sidelink resource set,
   wherein the time unit index of the candidate resource is equal to Y,
   wherein the time unit index of the specific time unit is equal to K, and
   wherein the candidate resource is determined based on Y and K satisfying a condition that:
   Y+J*P is equal to K+P_STEP*I for at least one integer value of J from 0 to a Cresel-1,
   wherein * represents multiplication,
   wherein the P is related to a resource reservation period,
   wherein the P_STEP is a positive integer,
   wherein the I is related to a network-configured parameter, and
   wherein the Cresel is a positive integer related to a resource reselection counter.

2. The method of claim 1, wherein the candidate resource is on a time unit within a selection window in which the UE selects at least one sidelink resource.

3. The method of claim 2, wherein the selection window has a duration of 100 ms.

4. The method of claim 1, wherein the Cresel is proportional to a value of the resource reselection counter, which is randomly determined by the UE.

5. The method of claim 4, wherein the value of the resource reselection counter is greater than or equal to 5 and less than or equal to 15.

6. The method of claim 1, wherein the P is equal to 100 ms.

7. The method of claim 1, wherein the sensing window has a duration of 1 s.

8. The method of claim 1, wherein the sensing window is specific to the UE.

9. The method of claim 1, wherein the P_STEP is equal to 100.

10. The method of claim 1, wherein the I is related to any one of a set of values for resource reservation periods that are allowed for the UE.

11. The method of claim 1, wherein each resource in the candidate resource set comprises both a time-domain resource component and a frequency-domain resource component.

12. The method of claim 1, wherein during the sensing window, the UE performs at least one of (i) measuring a Received Signal Strength Indicator (RSSI) in a time unit within the sensing window, or (ii) performing a decoding operation for a Physical Sidelink Control Channel (PSCCH) in the time unit within the sensing window.

13. A User Equipment (UE) configured to perform a sidelink operation in a wireless communication system, the UE comprising:
   a transceiver;
   at least one processor; and
   at least one computer memory operably connectable to the at least one processor and storing instructions that, when executed by the at least one processor, perform operations comprising:
   determining a sidelink resource set based on a candidate resource set and a candidate resource,
   wherein the candidate resource is excluded from the candidate resource set,
   wherein a time unit index of the candidate resource is determined based on a time unit index of a specific time unit in which the sidelink operation is performed within a sensing window of the UE; and
   performing, through the transceiver, the sidelink operation based on the sidelink resource set, wherein the time unit index of the candidate resource is equal to Y, wherein the time unit index of the specific time unit is equal to K, and wherein the candidate resource is determined based on Y and K satisfying a condition that:

Y+J*P is equal to K+P_STEP*I for at least one integer value of J from 0 to a Cresel-1, wherein * represents multiplication, wherein the P is related to a resource reservation period, wherein the P_STEP is a positive integer, wherein the I is related to a network-configured parameter, and wherein the Cresel is a positive integer related to a resource reselection counter.

14. An apparatus configured to control a User Equipment (UE) to perform a sidelink operation in a wireless communication system, the apparatus comprising:

at least one processor; and at least one computer memory operably connectable to the at least one processor and storing instructions that, when executed by the at least one processor, perform operations comprising:

determining a sidelink resource set based on a candidate resource set and a candidate resource, wherein the candidate resource is excluded from the candidate resource set, wherein a time unit index of the candidate resource is determined based on a time unit index of a specific time unit in which the sidelink operation is performed within a sensing window of the UE; and performing the sidelink operation based on the sidelink resource set, wherein the time unit index of the candidate resource is equal to Y, wherein the time unit index of the specific time unit is equal K, and wherein the candidate resource is determined based on Y and K satisfying a condition that:

Y+J*P is equal to K+P_STEP*I for at least one integer value of J from 0 to a Cresel-1, wherein * represents multiplication, wherein P is related to a resource reservation period, wherein the P_STEP is a positive integer, wherein I is related to a network-configured parameter, and wherein the Cresel is a positive integer related to a resource reselection counter.

* * * * *